(12) United States Patent
Hamamatsu et al.

(10) Patent No.: US 6,845,301 B2
(45) Date of Patent: Jan. 18, 2005

(54) SYSTEM FOR PROTECTING AND CONTROLLING SUBSTATION MAIN CIRCUIT COMPONENTS

(75) Inventors: Koichi Hamamatsu, Tokyo (JP); Tokuo Ito, Tokyo (JP); Hachidai Ito, Tokyo (JP); Yoshito Sameda, Kanagawa-ken (JP); Toshiyuki Saida, Tokyo (JP); Noriyoshi Suga, Tokyo (JP); Hiromi Nagasaki, Saitama-ken (JP); Yuuji Minami, Tokyo (JP); Takashi Nakajima, Kanagawa-ken (JP); Shiro Maruyama, Kanagawa-ken (JP); Minoru Saito, Kanagawa-ken (JP); Tatsuji Tanaka, Saitama-ken (JP); Masao Takahashi, Kanagawa-ken (JP); Setsuo Tamura, Kanagawa-ken (JP); Masayuki Kosakada, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/059,089

(22) Filed: Jan. 30, 2002

(65) Prior Publication Data

US 2002/0116092 A1 Aug. 22, 2002

(30) Foreign Application Priority Data

Feb. 9, 2001 (JP) ........................................ 2001-033833
Oct. 19, 2001 (JP) ........................................ 2001-321725

(51) Int. Cl.[7] ............................................. G08B 23/00
(52) U.S. Cl. .......................... 700/292; 700/20; 700/22; 361/602
(58) Field of Search ............................... 700/19–22, 79, 700/82, 286–298; 361/601, 602, 605, 622

(56) References Cited

U.S. PATENT DOCUMENTS 3,984,737 A  *  10/1976 Okamura et al. ............. 361/80

4,428,022 A  *  1/1984 Engel et al. ................... 361/96

(List continued on next page.)

FOREIGN PATENT DOCUMENTS

| JP | 5-328455 | 12/1993 |
|----|----------|---------|
| JP | 7-312787 | 11/1995 |

(List continued on next page.)

OTHER PUBLICATIONS

The Authoritative Dictionary of IEEE Standards Terms 2000, 7th edition, Standards Information Network IEEE Press, p. 633.*

(List continued on next page.)

*Primary Examiner*—Leo Picard
*Assistant Examiner*—Sean Shechtman
(74) *Attorney, Agent, or Firm*—Oblon, Spivak, McClelland, Maier & Neustadt, P.C.

(57) ABSTRACT

The present invention relates to a system for protecting and controlling main-circuit components of an electricity transmission substation. The system includes devices for digital data output, protection-and-controlling, component controlling-and-monitoring, and communication. The digital data output devices input analogue AC electric values and output digital data. The protection-and-controlling devices input the data from the digital data output devices, and further control, monitor, and protect the substation main-circuit components. The component controlling-and-monitoring devices receive commands from the protection-and-controlling devices or from the substation controlling-and-monitoring equipment, and further control and monitor the substation main-circuit components. The devices for digital data output, the protection-and-controlling, and component controlling-and-monitoring are disposed near or within their corresponding substation main-circuit components.

15 Claims, 55 Drawing Sheets

U.S. PATENT DOCUMENTS

| | | | |
|---|---|---|---|
| 4,972,290 A | | 11/1990 | Sun et al. |
| 5,517,423 A | * | 5/1996 | Pomatto ..................... 364/492 |
| 5,559,719 A | * | 9/1996 | Johnson et al. ............. 364/483 |
| 5,926,089 A | * | 7/1999 | Sekiguchi et al. .......... 340/500 |
| 5,995,911 A | * | 11/1999 | Hart ............................ 702/64 |
| 6,285,917 B1 | * | 9/2001 | Sekiguchi et al. ........... 700/239 |
| 6,313,752 B1 | * | 11/2001 | Corrigan et al. ............ 340/657 |
| 6,512,966 B2 | * | 1/2003 | Lof et al. .................... 700/291 |
| 6,539,287 B1 | * | 3/2003 | Ashizawa ................... 700/292 |
| 2002/0107615 A1 | * | 8/2002 | Bjorklund .................. 700/286 |

FOREIGN PATENT DOCUMENTS

| | | |
|---|---|---|
| JP | 9-135242 | 5/1997 |
| JP | 9-275363 | 10/1997 |
| JP | 8-129563 | 5/1999 |
| JP | 2000-92751 | 3/2000 |
| JP | 2000-343588 | 12/2000 |
| JP | 2001-8366 | 1/2001 |
| JP | 2001-109503 | 4/2001 |
| JP | 2001-221874 | 8/2001 |

OTHER PUBLICATIONS

The Authoritative Dictionary of IEEE Standards Terms 2000, $7^{th}$ edition, Standards Information Network IEEE Press, p. 1001.*

* cited by examiner

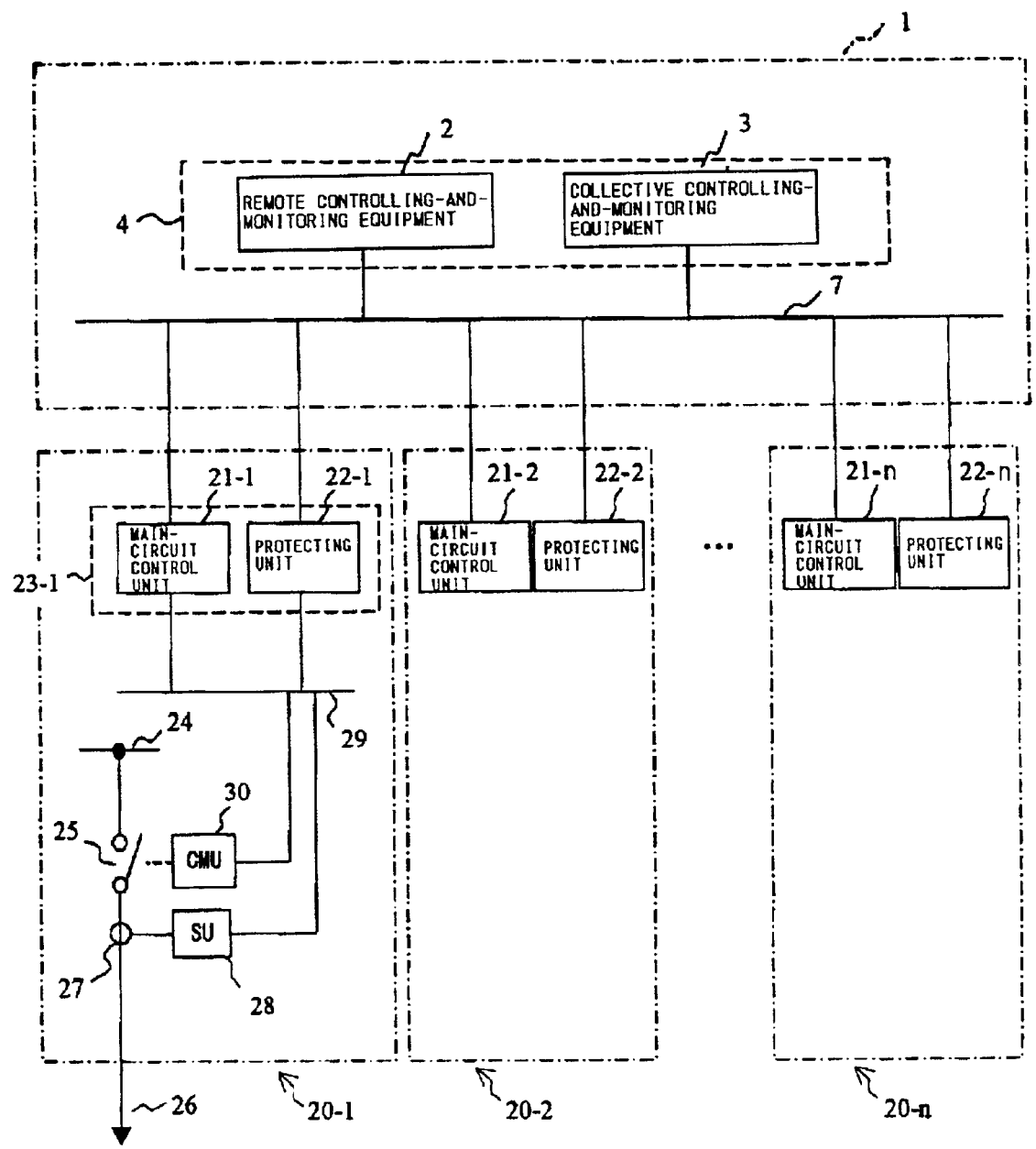
F I G. 1

|  | PCU 23 | MU 39 | SU 28 |
|---|---|---|---|
| Pattern 1 | X | AB | X |
| Pattern 2 | X | B | A |
| Pattern 3 | X | X | AB |
| Pattern 4 | B | X | A |
| Pattern 5 | B | A | X |

Notes: "X": Without sampling synchronization and time adding
"A": With sampling synchronization
"B": With time adding (adding time stamps or counter value)
"AB": With sampling synchronization and time adding

FIG. 3C

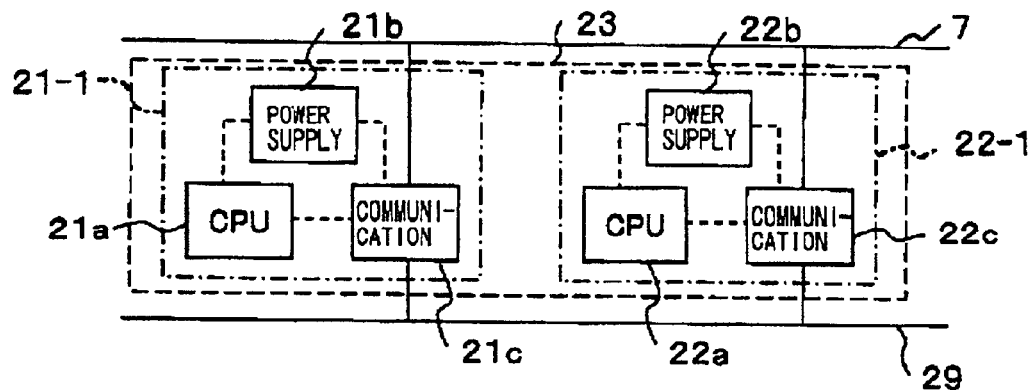
F I G. 4
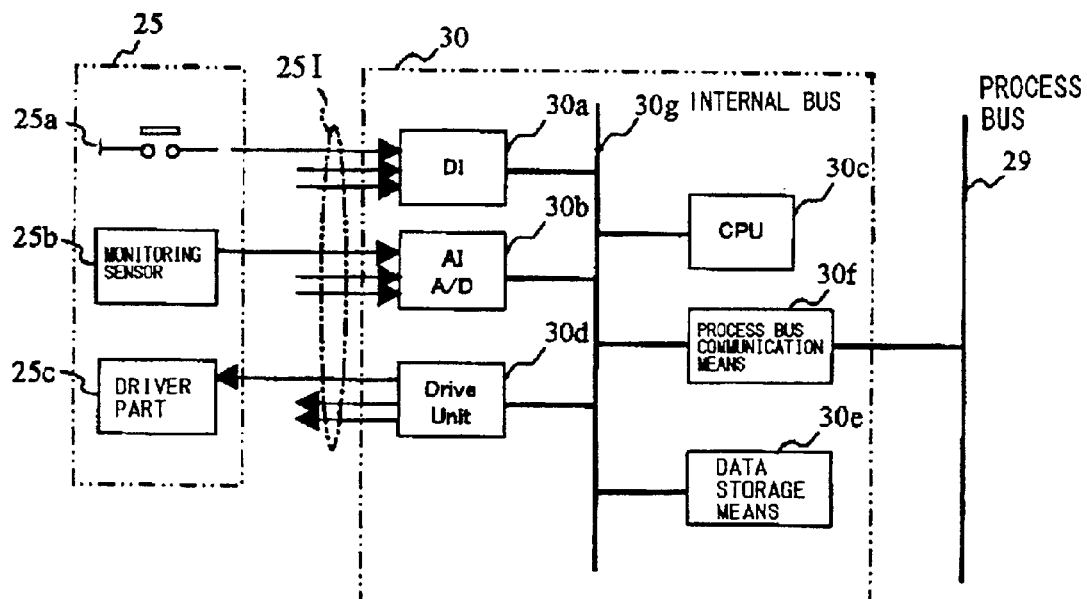
F I G. 5

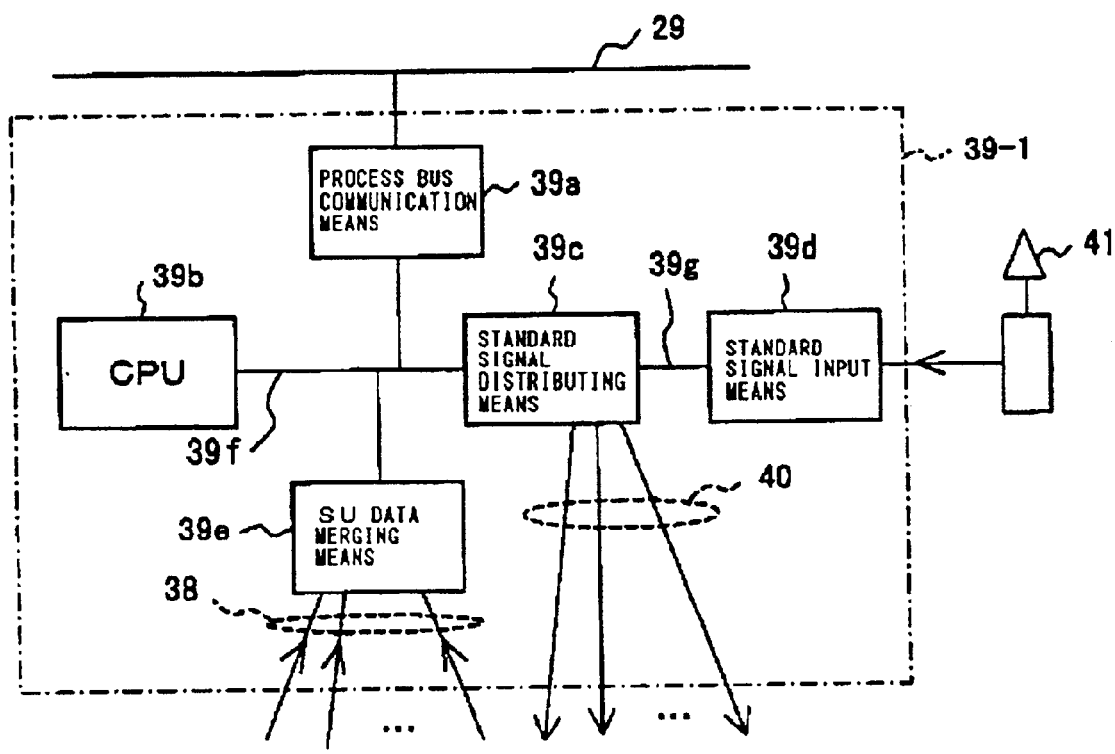
F I G. 1 8

OUTPUT DATA OF THE SENSOR UNITS

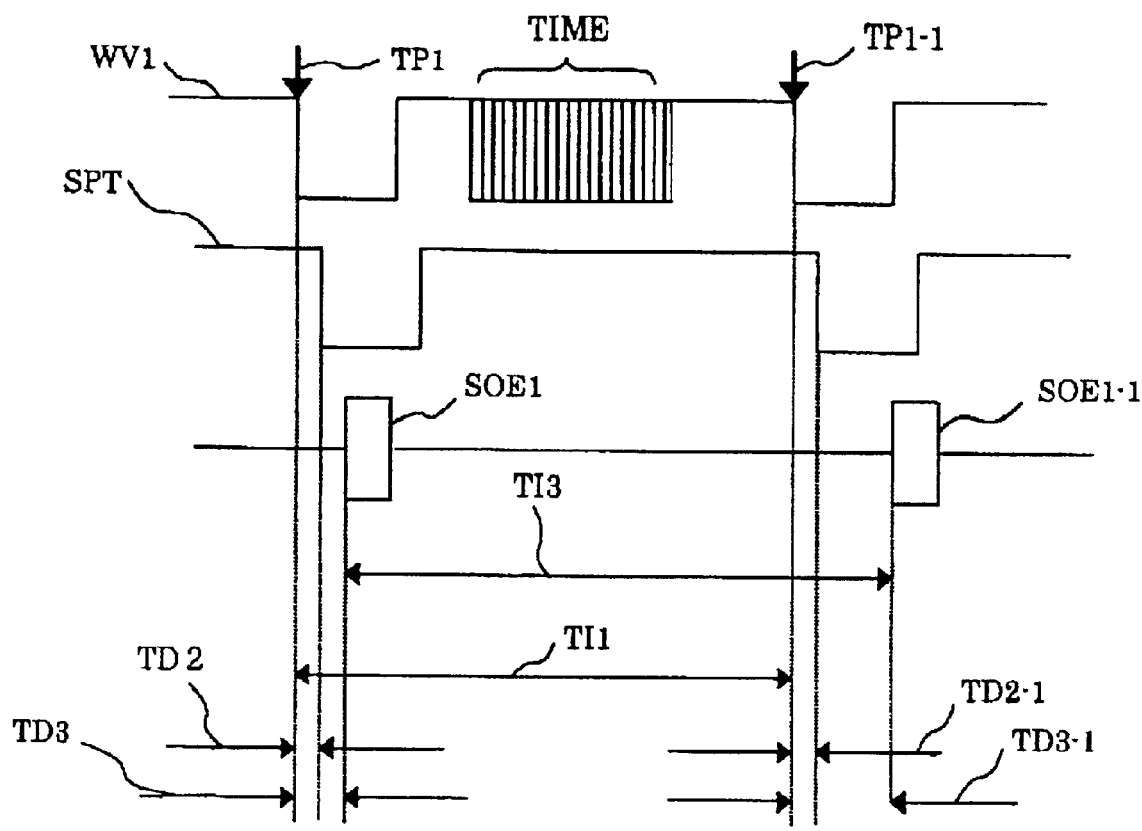
F I G. 2 8

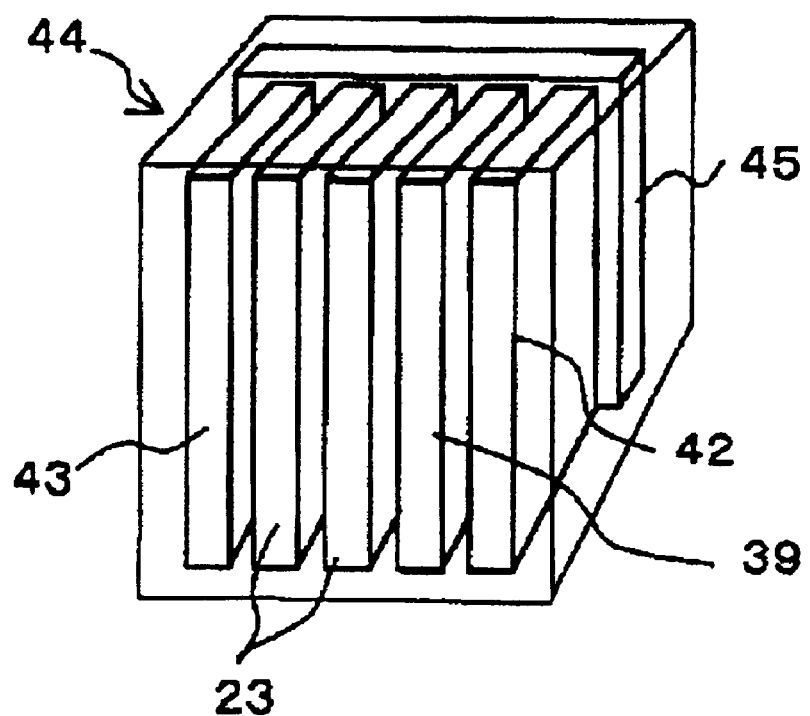
F I G. 3 1

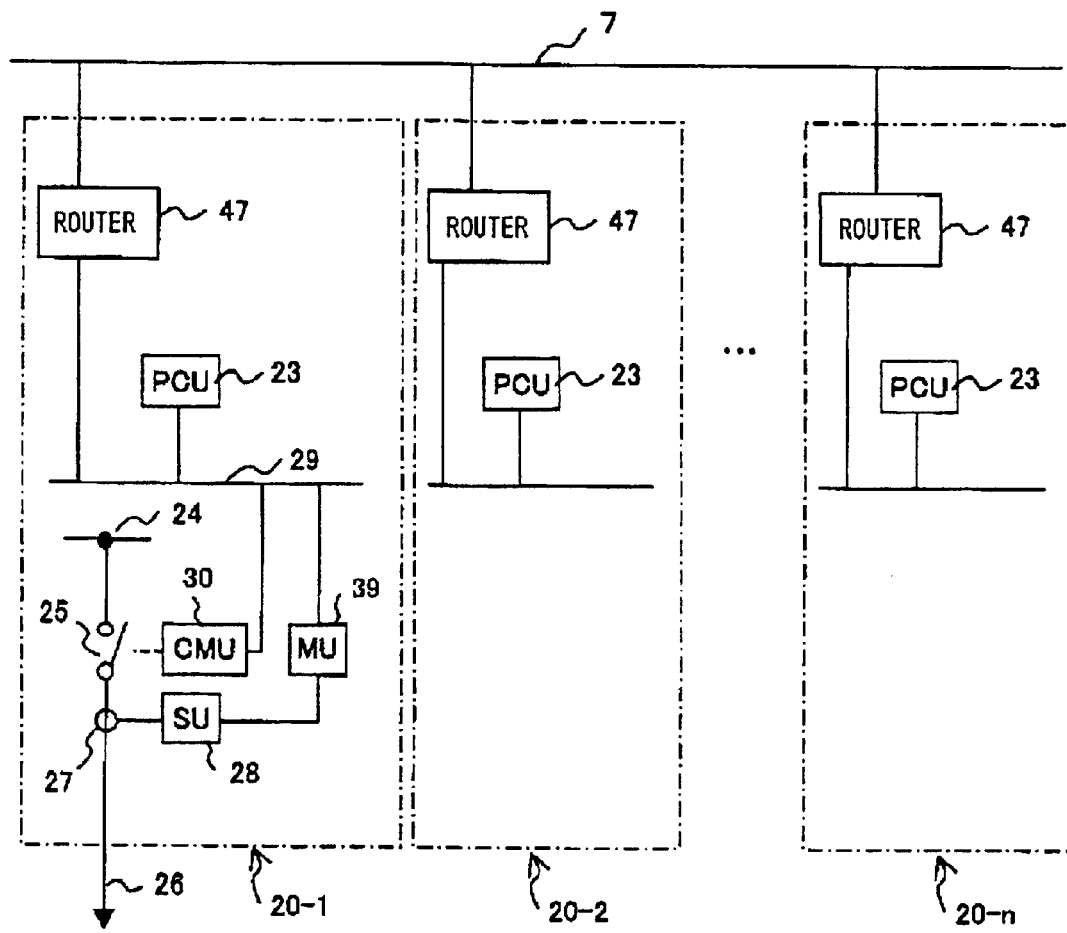
F I G. 3 5

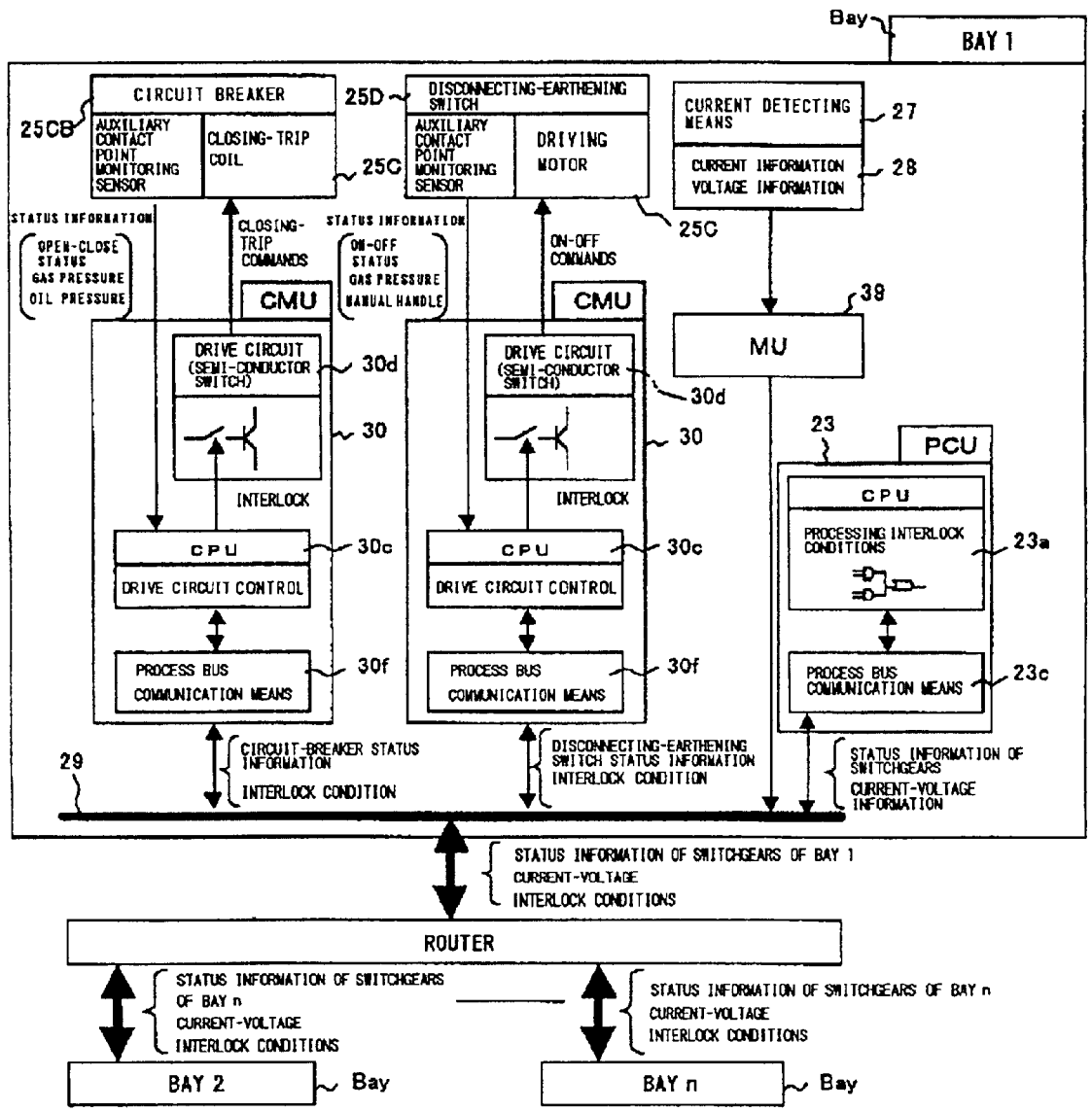
F I G. 5 0

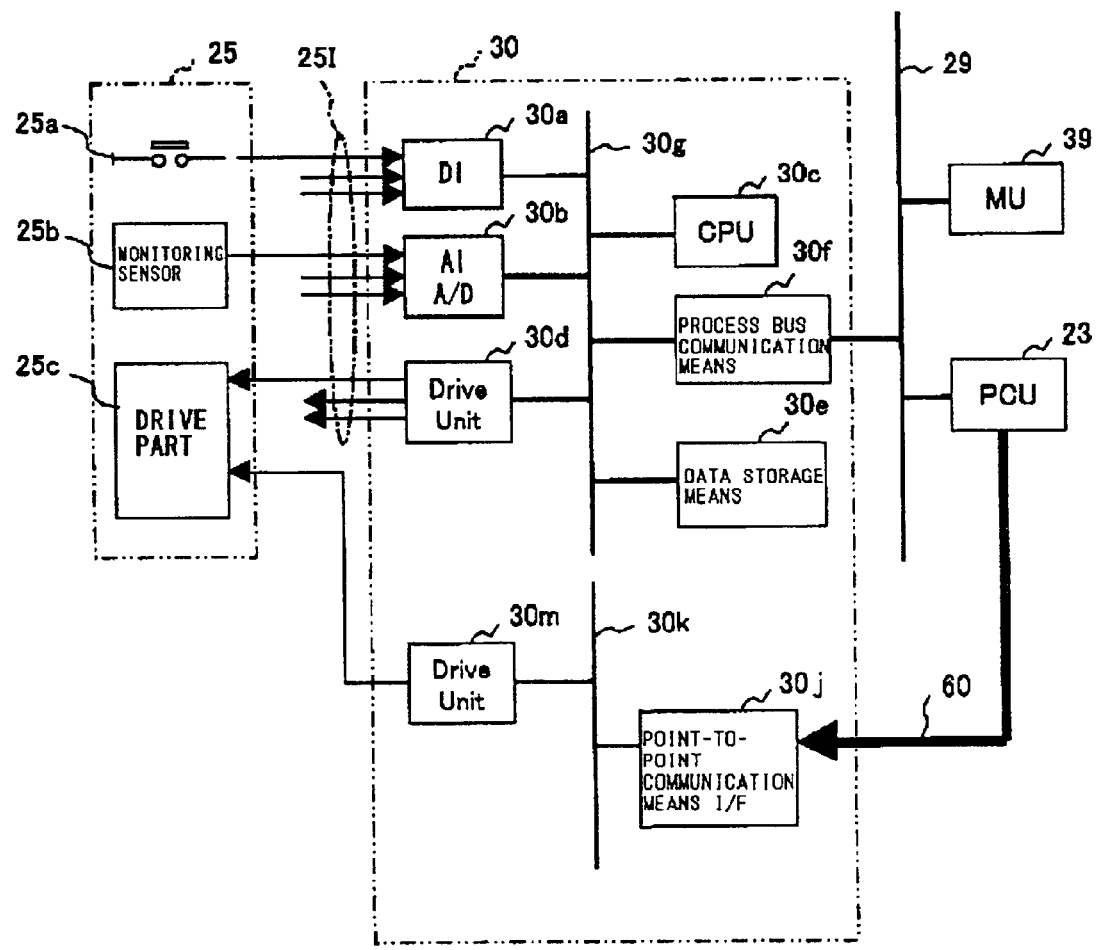
F I G. 5 2

SYSTEM FOR PROTECTING AND CONTROLLING SUBSTATION MAIN CIRCUIT COMPONENTS

CROSS-REFERENCES TO RELATED APPLICATIONS

This application is based upon and claims the benefit of priority from the prior Japanese Patent Applications No. 2001-33833, filed on Feb. 9, 2001 and No. 2001-321725 filed on Oct. 19, 2001; the entire contents of which are incorporated herein by reference.

BACKGROUND OF THE INVENTION

This invention is generally related to a system for protecting and controlling substation main-circuit components, and more particularly to a system including AC electric value sensors, analogue-to-digital converters and communication means for protecting and controlling substation main-circuit components.

Now an example of prior-art system for protecting and controlling substation main-circuit components in a substation is discussed referring to FIG. 53. The system has digital operational processors and communication means. The substation has a main control building 1 which contains substation controlling-and-monitoring equipment 4 including a remote controlling-and-monitoring equipment 2 for interfacing information to and from a remote control station (not shown), and a collective controlling-and-monitoring equipment 3 for controlling and monitoring the whole substation. The main control building 1 also contains main-circuit controllers (bay control units) 5-1 through 5-n, each corresponding to a main circuit such as a transmission line.

The remote controlling-and-monitoring unit 2, the collective controlling-and-monitoring equipment 3 and the main-circuit controllers 5-1 through 5-n are connected to each other via a station bus 7. The main control building 1 further contains protecting units 6-1 through 6-n which are connected to their respective main-circuit controllers 5-1 through 5-n via cables 17. The protecting units 6-1 through 6-n protect their respective substation main-circuit components 8-1 through 8-n as described below in detail.

The substation main-circuit components 8-1 through 8-n are connected to the main-circuit controllers 5-1 through 5-n and the protecting units 6-1 through 6-n via corresponding local controllers 9-1 through 9-n. The substation main-circuit component 8-1 includes a current transformer 10, a voltage transformer 11, a switchgear 12 such as circuit breaker or a disconnecting switch, a bus line 13 and a transmission line 14. The current transformer 10, the voltage transformer 11, the switchgear 12 and the local controller 9-1 are of analogue type. Thus, numbers of cables 15 and 16 corresponding to the volume of the information transmitted are used for the connection between the substation main-circuit component 8-1 and the main-circuit controller 5-1, and for the connection between the local controller 9-1 and the main-circuit controller 5-1 or the protecting unit 6-1.

The remote controlling-and-monitoring unit 2, the collective controlling-and-monitoring unit 3, the main-circuit controllers 5-1 through 5-n and the protecting units 6-1 through 6-n are of digital type using digital operation processors. The station bus 7 is used for information transmission between those units and controllers, except for the connections between the main-circuit controllers 5-1 through 5-n and the corresponding protecting units 6-1 through 6-n, where electric cables 17 are typically used as connection media corresponding to the volume of the information transmitted since interfaces with contact positions are typically used.

FIG. 54 shows a conventional hardware structure of one of the main-circuit controllers 5-1 through 5-n, collectively denoted as reference "5". The main-circuit controller 5 has an input converting unit 501 for inputting an AC electric value such as an electric current or a voltage, for filtering the analogue input and for transforming to a level of electric current or voltage to be directly treated by an electric circuit for analogue-to-digital conversion. The main-circuit controller 5 also has an input unit (DI) 502 loaded with a contact input circuit, and an output unit (DO) 503 loaded with a contact output circuit. The main-circuit controller 5 also has an analogue input unit (AI) 504 for processing the AC current value including analogue-to-digital conversion, a processing unit (CPU) 505 for processing for protecting, a transmission unit 506 for processing for transmission, and an electric power supply 507.

Each of the protecting units 6-1 through 6-n, similarly to the main-circuit controller 5, has an input converting unit (not shown) for inputting an AC electric value such as an electric current or a voltage, for filtering the analogue input and for transforming to a level of electric current or voltage to be directly treated by an electric circuit for analogue-to-digital conversion. The protecting unit also has an input unit (DI) loaded with a contact input circuit, and an output unit (DO) loaded with a contact output circuit. The protecting unit also has an analogue input unit (AI) for processing the AC current value including analogue-to-digital conversion, a processing unit (CPU) for processing for controlling, a transmission unit for processing for transmission, and an electric power supply.

The input units and the output units can be loaded with required numbers of units corresponding to the numbers of inputs and outputs. Thus, typically, major parts of the main-circuit controllers 5-1 through 5-n and the protecting units 6-1 through 6-n are occupied by the input units and the output units.

The protecting and controlling units in the art have been partly digitized. Thus, the units have become more compact and less expensive. Furthermore, the units requires less manpower for maintenance due to loaded self-diagnostic function, and reduction of electric cables has been achieved by applying communication means for transmitting information between the units.

However, there are following problems left to be solved because analogue techniques are still used in the circuits for driving the substation main-circuit components and in the electric current and voltage transformer circuits:

(1) Electric cables and analogue information have been used in the substation main-circuit components and in the information transmission between the protecting-and-controlling units for protecting and controlling the substation main-circuit components. Therefore, the protecting-and-controlling units require as input and output circuits, contact input circuits and contact output circuits which can accommodate higher voltage and larger current compared to digital circuits. In addition, all the protecting-and-controlling units require input conversion units for transforming the currents and voltages into certain easily-handled levels, and analogue input circuits for converting the analogue values to digital values. Those requirements resulted in the protecting-and-controlling units of relatively large size and less cost-effectiveness.

(2) Although processing parts for protecting and controlling in the protecting-and-controlling units have become more compact due to the digitalization, the volumes of the hardware constituting the input and output circuits are still larger for isolation from the substation main-circuit components due to the cause described in (1) above, and large space is required for large volume of electric cables. Therefore, each one of the protecting unit and controlling unit for each main circuit must be contained in a separate chassis and must be independent, which has resulted in wider space required for installation.

(3) Since parallel connections for analogue information have been used between the main-circuit components and the protecting-and-controlling units, large volume of cables are required corresponding to the number of signals transmitted. Thus, cost of cables, of construction for cable pits and of cable installation have been enhanced, resulting in higher cost of the substation construction.

(4) Since the driving circuits for the substation main-circuit components and the transformer circuits for current and voltage measurement have had analogue technique, hardware sizes have been large, which has caused the sizes of the substation main-circuit components larger. Besides, work for assembling and connecting the circuits in the manufacturing factories and on the substation construction sites have required large manpower.

(5) Because of the reasons similar to those described in (4) above, real-time monitoring and automatic diagnosis of the substation main-circuit components have been difficult, which have resulted in insufficient information about the maintenance, and which have been an obstacle for manpower reduction.

(6) Since all the circuits and components have not been digitized and all the devices have not been connected by communication means, the volume of the information has been limited and it has been difficult to add new functions. In addition, optimum system construction has been difficult utilizing the data each component has.

BRIEF SUMMARY OF THE INVENTION

Accordingly, it is an object of the present invention to provide an improved system for protecting and controlling substation main-circuit components in a substation, wherein all or almost all of the circuits and components including the driving circuits and transformer circuits for measuring current and voltage are digitized, and the volume of the electric cables for communicating them is reduced compared to those using analogue technique.

There has been provided, in accordance with a first aspect of the present invention, a system for protecting and controlling at least one substation main-circuit component disposed in an electric power installation; the system including: at least one unit for protecting, controlling and monitoring the substation main-circuit component; and at least one substation controlling-and-monitoring equipment disposed in the electric power installation for controlling and monitoring the electric power installation as a whole including the substation main-circuit component and for communicating with at least one remote control station; the system comprising: at least one digital data output means for inputting a plurality of analogue AC electric values of main circuit of the substation main-circuit component and outputting digital data corresponding to the analogue AC electric values; at least one protection-and-controlling means for inputting the digital data from the digital data output means, and for controlling, monitoring and protecting the substation main-circuit component; at least one component controlling-and-monitoring means for receiving commands from the protection-and-controlling means or the substation controlling-and-monitoring equipment, and for controlling and monitoring the substation main-circuit component; and communication means for transmitting information between the digital data output means, the protection-and-controlling means, the component controlling-and-monitoring means and the substation controlling-and-monitoring equipment; wherein at least part of the digital data output means, the protection-and-controlling means and the component controlling-and-monitoring means are disposed near their corresponding substation main-circuit component, or built in their corresponding substation main-circuit component.

There has been provided, in accordance with a second aspect of the present invention, a system for protecting and controlling substation main-circuit components disposed in an electric power installation; the system comprising: at least one substation controlling-and-monitoring equipment for controlling and monitoring the electric power installation as a whole including at least one substation main-circuit component and for communicating with at least one remote control station; at least one digital data output means for inputting analogue AC electric values of main circuit of the substation main-circuit component and outputting digital data corresponding to the analogue AC electric values; at least one protection-and-controlling means for inputting the digital data from the digital data output means, and for controlling, monitoring and protecting the substation main-circuit component; at least one component controlling-and-monitoring means for receiving commands from the protection-and-controlling means or the substation controlling-and-monitoring equipment, and controlling and monitoring the substation main-circuit component; and communication means for transmitting information between the digital data output means, the protection-and-controlling means, the component controlling-and-monitoring means and the substation controlling-and-monitoring equipment; wherein at least part of followings are connected each other by parallel transmitting medium: the digital data output means; the protection-and-controlling means; component controlling-and-monitoring communication means for sending component controlling-and-monitoring data from the component controlling-and-monitoring means to the protection-and-controlling means, and for sending controlling signals from the protection-and-controlling means to the component controlling-and-monitoring means; and process-bus communication means including serial transmitting medium for sending and receiving data between a process bus and the protection-and-controlling means or the component controlling-and-monitoring means.

BRIEF DESCRIPTION OF THE DRAWINGS

The above and other features and advantages of the present invention will become apparent from the discussion hereinbelow of specific, illustrative embodiments thereof presented in conjunction with the accompanying drawings, in which:

FIG. 1 is a schematic block diagram of a first embodiment of a system for protecting and controlling substation main-circuit components according to the present invention;

FIG. 3C is a table of patterns of shearing two functions of sampling synchronization and adding time data by units;

FIG. 4 is a schematic block diagram of a protecting-and-controlling unit shown in FIG. 1;

FIG. 5 is a schematic block diagram of a component controlling-and-monitoring unit shown in FIG. 1;

FIG. 18 is a schematic block diagram of the merging unit shown in FIG. 17;

FIG. 28 is a time chart of standard signals for time synchronization used in the embodiments of the present invention;

FIG. 31 is a perspective view of the collective box shown in FIG. 30;

FIG. 35 is a schematic block diagram of a main part of a sixteenth embodiment of a system for protecting and controlling substation main-circuit components according to the present invention;

FIG. 50 is a schematic block diagram showing alternative interlock conditions of the switchgears shown in FIGS. 46 through 48;

FIG. 52 is a detailed schematic block diagram of a main part of the system shown in FIG. 51;

DETAILED DESCRIPTION OF THE INVENTION

Figure 2:
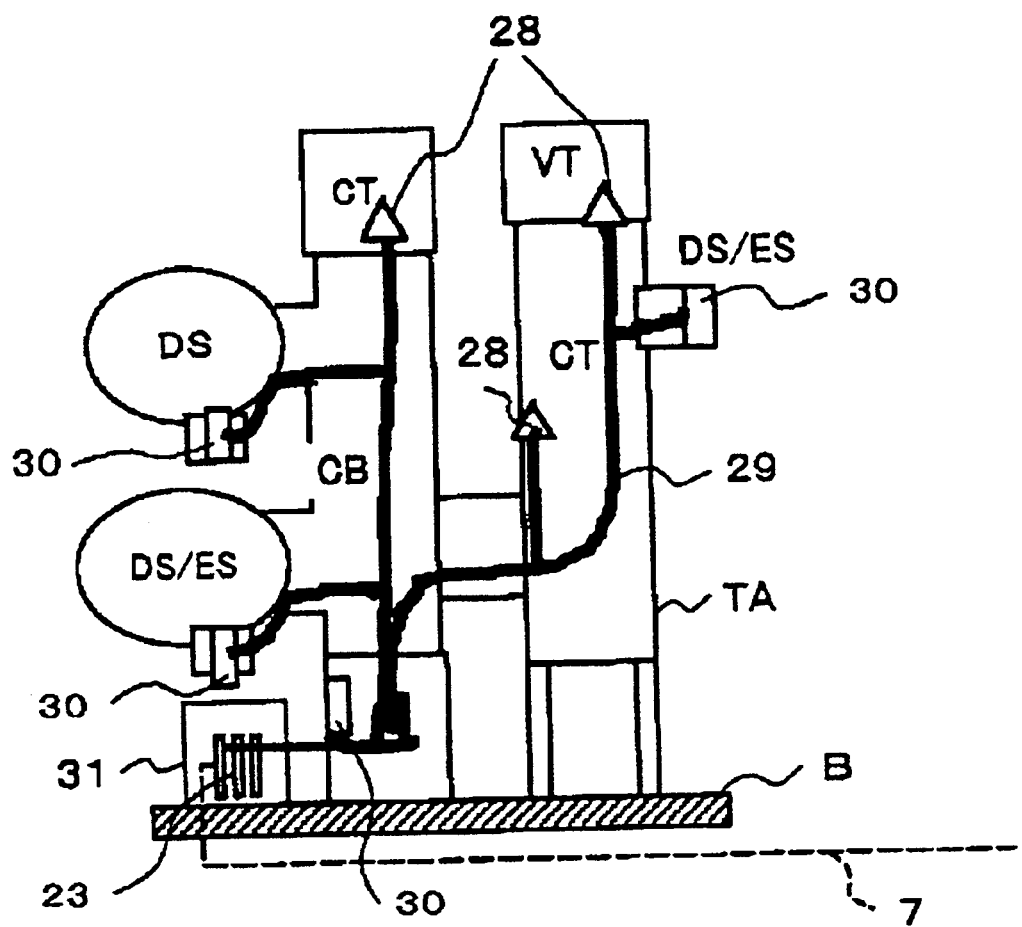
FIG. 2 is a schematic elevational view of the substation main-circuit components shown in FIG. 1.

In the following description and also in the above description of background of the invention, like reference numerals represent like elements, and repetitive description may be omitted.

First Embodiment

A first embodiment of a system for protecting and controlling substation main-circuit components according to the present invention is now described with reference to FIGS. 1 through 5. As shown in FIG. 1, an electric power installation such as a substation has a main control building 1. The main control building 1 contains a substation controlling-and-monitoring equipment including a remote controlling-and-monitoring equipment 2 for linking with remote control stations (not shown) and a collective substation controlling-and-monitoring equipment 3.

The remote controlling-and-monitoring equipment 2 and the collective substation controlling-and-monitoring equipment 3 are connected each other by a station bus 7 and they are connected to protecting-and-controlling units (PCUs) 23-1 through 23-n disposed in main-circuit units 20-1 through 20-n. The main-circuit units 20-1 has a main-circuit control unit (also called "a bay control unit") 21-1 and a protecting unit 22-1. The main-circuit control unit 21-1 and the protecting unit 22-1 are connected to the station bus 7.

The main-circuit units 20-1 through 20-n are connected to power transmission lines, bus coupler bays, bus section bays, or primary, secondary and tertiary of electric transformers (not shown). Each of the main-circuit units 20-1 through 20-n comprises a main-circuit unit main body (also called "a main-circuit component"), transformers for measuring electric values and other elements.

In this embodiment, the main-circuit unit is a power transmission line of a gas-insulated switchgear (GIS). Since all the main-circuit units are similar, a typical one of the main-circuit units 20-1 is described here, and the other main-circuit units are not described.

The main-circuit unit has a bus line 24, a switchgear 25 such as a circuit breaker, a disconnecting/earthening switch, and a power transmission line 26. The AC currents flowing through the main-circuit units and the AC voltages applied to the main-circuit units are detected by instrument transformers (or electric value sensor units) 27. The detected analogue electric values are inputted to a sensor unit (SU) 28, where the analogue values are converted and outputted into a digital data.

The digital data outputted from the sensor unit 28 are sent to a component unit communication bus (also called "a process bus") 29 directly or via a merging unit 39 (See FIG. 16) described later. The digital data are then inputted to the main-circuit control unit 21-1 and the protecting unit 22-1, where the digital data are processed for controlling, monitoring and protecting the substation main-circuit components. In this embodiment, means for inputting analogue electric values from the electric detectors 27 of the substation main-circuit components and for outputting digital data directly or indirectly to the process bus 29 is called "digital data output means".

Control commands (downward information) from the main-circuit control unit 21-1 and the protecting unit 22-1 or collective controlling-and-monitoring equipment 3 in the control main building 1 to the substation main-circuit components, and monitoring information (upward information) from the substation main-circuit components are exchanged through the process bus 29 and the component controlling-and-monitoring unit (CMU) 30. The component controlling-and-monitoring unit 30 controls and monitors the main-circuit units and sends out commands such as a command for circuit trip to the switchgear 25.

FIG. 2 shows an example of layout of substation main-circuit components of a GIS. FIG. 2 also shows layout of the sensor units 28, the component controlling-and-monitoring units 30 and the protecting-and-controlling unit 23, and it also shows connections between those units and the process bus 29 and the station bus 7.

As shown in FIG. 2, main-circuit components such as a circuit breaker (CB), a disconnecting switch (DS), an earthening switch (ES) and a busbar are encapsulated in a metal container or tank (TA) with insulation gas, which is disposed on a base B. Instrument transformers (not shown) are also encapsulated in the tank TA as analogue electric value detecting means of main-circuit, and the analogue output signals are digitized in the sensor units 28 (VT and CT shown in FIG. 2) which are disposed on the outer surface of the tank TA near the respective analogue electric value detecting means.

Likewise, "open-close" status information of the circuit breaker (CB), the disconnecting switch (DS) and the earthening switch (ES), and other data such as gas density and oil pressure are converted to signals which are easy to be digitized by the other component controlling-and-monitoring unit 30.

The output terminals of the sensor units 28 are connected to the merging unit (MU) described in detail later. Then, the merging unit 39 is connected to the protecting-and-controlling unit (PCU) 23 and the component controlling-and-monitoring unit 30 via the process bus 29. Then, the protecting-and-controlling unit 23 is connected to the station bus 7 disposed in the main control building 1.

In an embodiment where merging unit is not used, the output terminals of the sensor units 28 are connected directly to the process bus 29.

The process control box 31 is disposed on the base B on which the tank TA of the GIS is also disposed integrally in the embodiment shown in FIG. 2. However, the process control box 31 can be alternatively attached directly to the outer surface of the tank TA. Such arrangement of the process control box 31 disposed on the base B of the GIS or on the tank TA is called of integration (or built-in) type.

On the other hand, the process control box 31 can be alternatively disposed outside of the base B of the GIS, but adjacent to the substation main-circuit component and not in the control building as in the prior art, according to the present invention. This arrangement is called of adjacent type. The present invention can be applied to the integration type and the adjacent type. Furthermore, the substation main-circuit component can be a GIS as well as an electric transformer with taps or other electric power components.

In this embodiment, the local control unit 9 (See FIG. 53) has been eliminated, and the functions which were loaded on the local control unit have been distributed to the other components such as the main-circuit control unit 21-1, sensor unit 28 and component controlling-and-monitoring unit 30.

Figure 3A:
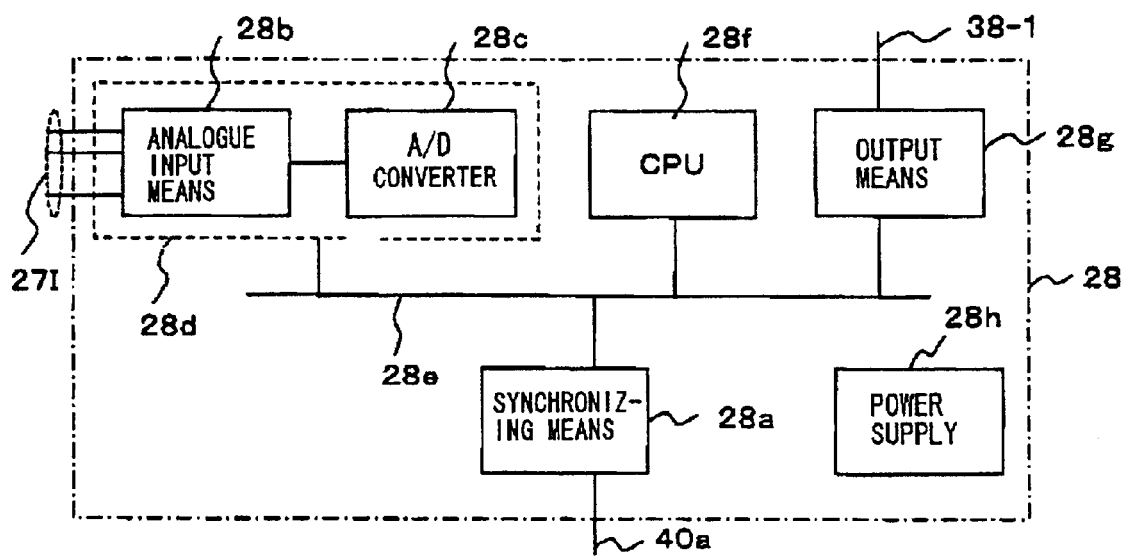
FIG. 3A is a schematic block diagram of a sensor unit shown in FIG. 1.
Figure 3B:
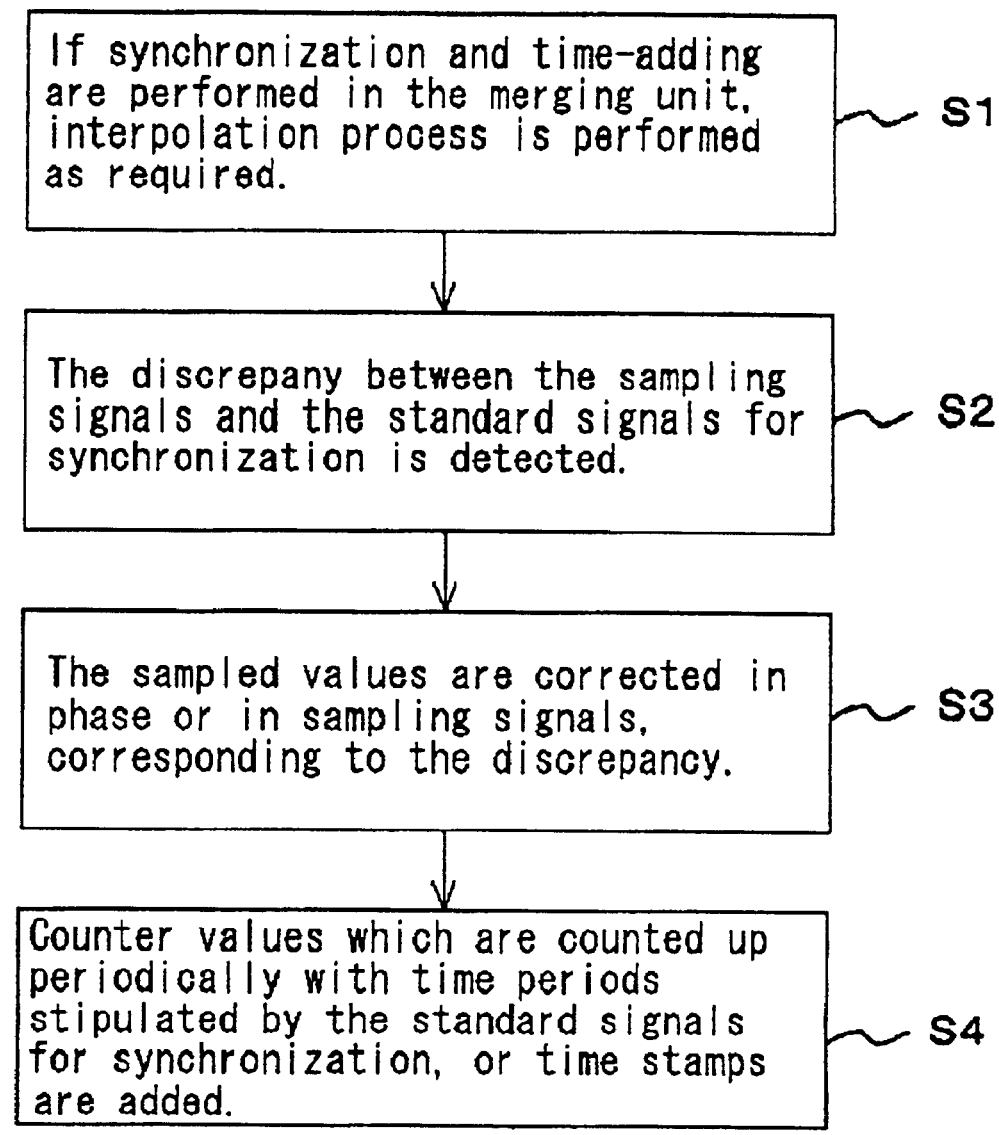
FIG. 3B is a flow chart of sampling and time data adding by the sensor unit shown in FIG. 3A.

FIGS. 3A and 3B show an example of the sensor unit (SU) 28. FIG. 3A shows an example of the hardware construction of the sensor unit (SU) 28, while FIG. 3B shows a flow chart of an example of processing sequence of synchronization and time data adding in the sensor unit (SU) 28.

Referring to FIG. 3A, an analogue input means 28b receives analogue electric values of AC current or AC voltage of the substation main-circuit components. The analogue input means 28b consists of analogue filters (not shown) which cut off harmonics before the analogue-to-digital conversion to reduce overlapping alias error, and analogue multiplexers (not shown) which switch one of the multiple analogue inputs to common output in turn by turns. The output of the analogue input means 28b is converted into digital data by an analogue-to-digital converter 28c.

The analogue-to-digital converter 28c and the analogue input means 28b constitutes a sampling synchronization input circuit 28d. The digital data corresponding to the electric values of the main-circuit components are sent to the internal bus 28e by the sampling synchronization input circuit 28d.

The sensor unit 28 has a synchronizing means 28a. The synchronizing means 28a receives a standard signal for synchronization and standard time data for time synchronization from individual transmission paths (or point-to-point paths) 40a, and adjusts the discrepancy between sampling time and the standard signal for synchronization. The sensor unit 28 also has an output means 28g. The output means 28g sends the digital data of the electric value, which has been synchronized and time stamped, to the point-to-point communication paths 38-1.

The sensor unit 28 also has a processing unit (CPU) 28f, which controls the sampling synchronization input circuit 28d, the synchronizing means 28a and the output means 28g through the internal bus 28e. The sensor unit 28 also has an electric power supply 28h for supplying electric power to the circuits and means in the sensor unit 28.

Now the flow of synchronization and time data adding is described referring to FIG. 3B. In this embodiment, the synchronization and time data adding are performed in the sensor units 28, and Step S1 is skipped.

The reason for skipping Step S1 is that interpolation is not needed because the plurality of sensor units 28 take samples using common sampling signals. "Interpolation" is a process of adjusting asynchronized sampled data by interpolation. When sampling has been performed using common sampling signals, the samples are synchronized and interpolation is not needed.

First, sampling signals of analogue electric values which have been frequency-divided based on a clock oscillator disposed in the sensor unit 28, and the discrepancy is detected (Step S2). The signals are then adjusted by phase-sifting the electric values using the phase corresponding to the discrepancy so that the discrepancy may be reduced to zero. Alternatively, the sampled signals may be adjusted to cancel the discrepancy (Step S3).

A counter is activated within periods precisely stipulated by the standard signals for synchronization, and time information is added to the electric values by the standard time (once per second, for example) and the number counted by the counter. Optionally, time is calculated from the counted number and added to the standard time, and the time stamp is added to the data (Step S4).

The protecting-and-controlling unit 23 is connected to the merging unit 39 via the process bus 29, and receives the synchronized electric values in digital forms with time data. Then, the protecting-and-controlling unit 23 monitors, controls and protects the substation main-circuit components.

The flow chart of FIG. 3B shows a sequence of sampling synchronization and adding time information to the sampled data. However, the two functions that are sampling synchronization and adding time information to the sampled data can be performed by separate units as described below.

FIG. 3C shows five patterns of shearing the two functions by units. In Pattern 1, both sampling synchronization and adding time information are performed by the merging unit 39. In Pattern 2, sampling synchronization is performed by the sensor units 28, while adding time information is performed by the merging unit 39. In Pattern 3, both sampling synchronization and adding time information are performed by the sensor units 28. In Pattern 4, sampling synchronization is performed by the sensor units 28, while adding time information is performed by the protecting-and-controlling unit 23. In Pattern 5, sampling synchronization is performed by the merging unit 39, while adding time information is performed by the protecting-and-controlling unit 23.

Pattern 1 corresponds to the ninth embodiment described later, Pattern 2 corresponds to the modification of the seventh embodiment described later, and Pattern 3 corresponds to the seventh embodiment described later.

Pattern 4 can be performed by modifying Pattern 2 by moving the function of adding time information from the merging unit 39 to the protecting-and-controlling unit 23.

Likewise, Pattern 5 can be performed by modifying Pattern 1 by moving the function of adding time information from the merging unit 39 to the protecting-and-controlling unit 23.

Now Patterns 4 and 5 are explained in detail. The sampled data are sent from the sensor units 28 to the protecting-and-controlling unit 23 via the merging unit 39 by the communication means. Therefore, time discrepancy is caused between the sampling time and the added time data due to the time for transmission. Patterns 4 and 5 can be used, if the discrepancy is within an allowable range. The allowable range depends upon the accuracy of the time data adding on the measurement data and variable data, and the protecting accuracy (especially in case of PCM relay protecting type requiring sampling-synchronization between the corresponding terminals).

Referring to FIG. 3A again, CPU 28f may be optional. In cases of Patterns 1, 2, 4 and 5 of the table shown in FIG. 3C, the sensor units 28 have neither the sampling synchronization function nor the time data adding function, or have only the sampling synchronization function. Therefore, the circuit control of the sensor units 28 may be made by only logic circuits. In such a case, the CPU 28f can be eliminated.

FIG. 4 shows an example of hardware structure of the protecting-and-controlling unit 23. The main-circuit control unit 21-1 has a digital processor unit (CPU) 21a, an electric power supply unit 21b and a communication unit 21c. Likewise, the protecting unit 22-1 has a digital processor unit (CPU) 22a, an electric power supply unit 22b and a communication unit 22c.

FIG. 5 shows an example of hardware structure of the component controlling-and-monitoring unit 30. The component controlling-and-monitoring unit 30 has a digital input means 30a, an analogue input means 30b including an analogue input circuit and an analogue-to-digital converter circuit. The component controlling-and-monitoring unit 30 also has a digital processor unit (CPU) 30c, and driving circuit 30d including a semi-conductor switch. The component controlling-and-monitoring unit 30 also has data storage means 30e for storing controlling-and-monitoring data in the component controlling-and-monitoring unit 30, and a process bus communication means 30f. Those elements of the component controlling-and-monitoring unit 30 are connected by the internal bus 30g.

The outputs of pallet contacts 25a and monitoring sensor units 25b are received by the digital input means 30a and the analogue input means 30b, respectively, via the signal lines 25I. The outputs of pallet contacts 25a may include, for a circuit breaker, for example, contact information about the open-close condition and oil pressure switches and the gas density switches of the circuit breaker.

The outputs of the driving circuit 30d of the component controlling-and-monitoring unit 30 are received by a driver part 25c of the switchgear 25. The input signal for the driver part 25c may include, for a circuit breaker, for example, driver signals for the circuit trip coil, the closing coil and the hydraulic pump motor.

If the circuits shown in FIGS. 3, 4 and 5 are formed in custom LSIs, the unit volumes may be further reduced.

Now the operation is described. In this embodiment, the analogue AC electric values detected at various places on the GIS are converted to digital by the sensor units 28, and the digitized information supplied to the main-circuit control units 21-1 through 21-n and the protecting units 22-1 through 22-n via the process bus 29. The controlling commands to the substation main-circuit components are sent from the main-circuit control units 21-1 through 21-n and the protecting units 22-1 through 22-n to the component controlling-and-monitoring unit 30 via the process bus 29. The monitoring information of the substation main-circuit components are sent from the component controlling-and-monitoring unit 30 to the main-circuit control units 21-1 through 21-n and the protecting units 22-1 through 22-n via the process bus 29. Thus, the information from the sensor units 28 can be shared by the main-circuit control units 21-1 through 21-n and the protecting units 22-1 through 22-n.

Therefore, in the main-circuit control units 21-1 through 21-n and the protecting units 22-1 through 22-n, the analogue input circuits and the electric cables for large current can be eliminated, and the hardware size can be remarkably reduced.

Thus, by this embodiment of the present invention, the driver circuits for the switchgear 25, the part for converting analogue AC electric values to digital values, and the protecting-and-controlling part can be integrated in the substation main-circuit components. Thus, the volume of the cables and the space of the control main building can be reduced, the substation main-circuit components can be made more compact, the area required for installing the substation can be reduced, the period for constructing the substation can be shortened, and then, the cost for constructing the substation can be reduced. In addition, since the units are digitized or have digital processors, the units and the substation main-circuit components can have functions of self-diagnosis.

Second Embodiment

A second embodiment of a system for protecting and controlling substation main-circuit components according to the present invention is now described with reference to FIGS. 6 through 8. In this embodiment, part of the wired communication means of the first embodiment has been replaced with wireless communication means. The embodiment shown in FIG. 8 is a partial modification of that shown in FIG. 6.

Figure 6:
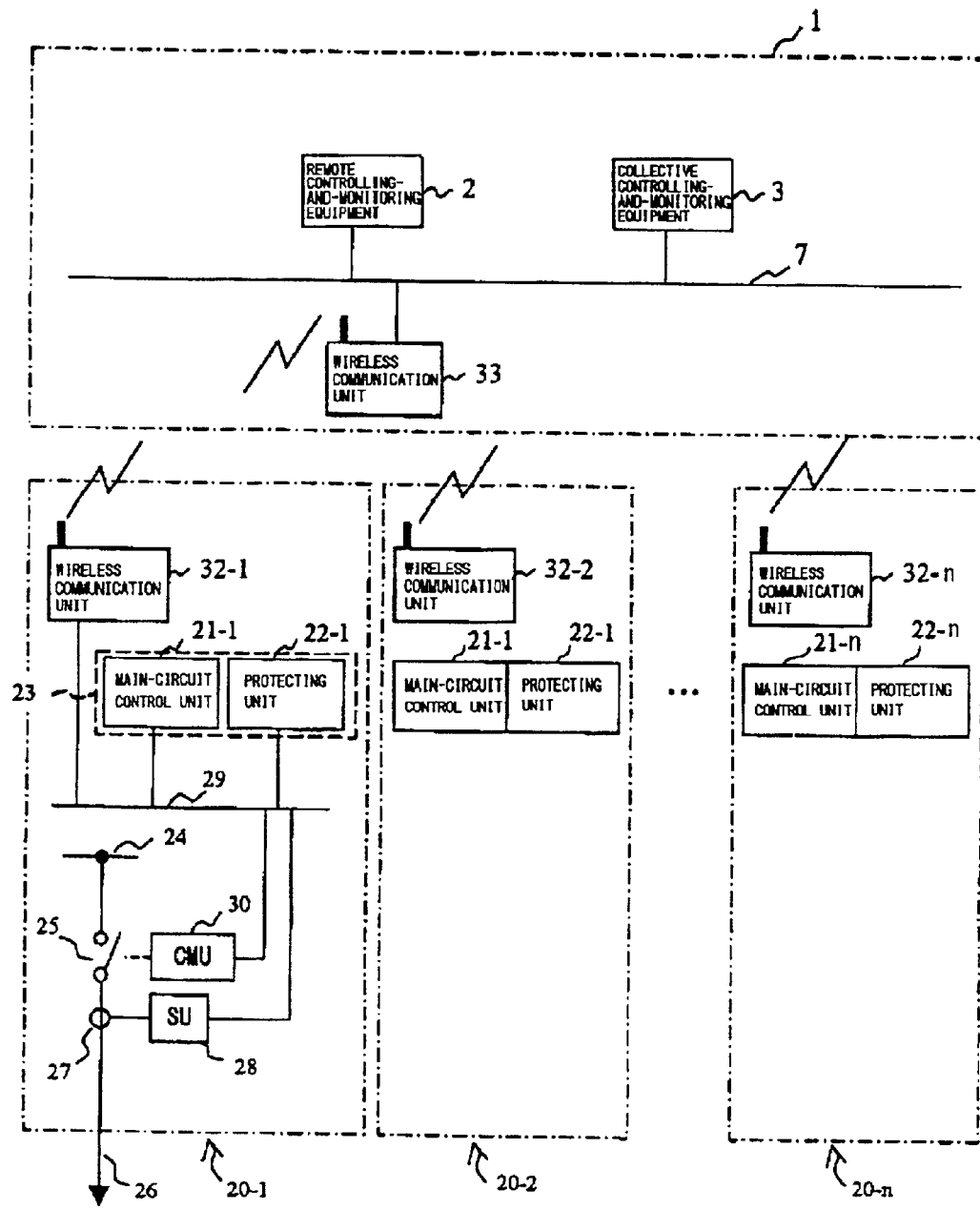
FIG. 6 is a schematic block diagram of a second embodiment of a system for protecting and controlling substation main-circuit components according to the present invention.

In the embodiment shown in FIG. 6, the process bus and the station bus 7, which are similar to their corresponding components shown in FIG. 1, are connected with wireless communication units. As shown in FIG. 6, a wireless communication unit 33 is connected to the station bus 7, and wireless communication units 32-1 through 32-n are connected to the process buses 29 of the main-circuit units 20-1 through 20-n. The digital data corresponding to the currents and the voltages from the sensor units 28 are sent to the process buses 29, and the main-circuit control units 21-1 through 21-n and the protecting units 22-1 through 22-n receive required data from the process buses 29 and send signals such as circuit trip command to the component controlling-and-monitoring units 30 via the process buses 29.

Thus, the information is exchanged between the main-circuit units 20-1 through 20-n, and the remote controlling-and-monitoring equipment 2 and the collective controlling-and-monitoring equipment 3 via the wireless communication units 32-1 through 32-n, the wireless communication unit 33 and the station bus 7. Likewise, the information may also be exchanged between the main-circuit units 20-1 through 20-n each other through wireless communication.

Since the main-circuit control units 21-1, the protecting unit 22-1, the sensor unit 28 and the component controlling-and-monitoring unit 30 are integrated in the substation main-circuit component, the internal process bus 29 can be relatively short and may be wired. However, the long distance communication between the substation main-circuit components and the main control building, and between the substation main-circuit components each other is performed by wireless transmission.

Figure 7:
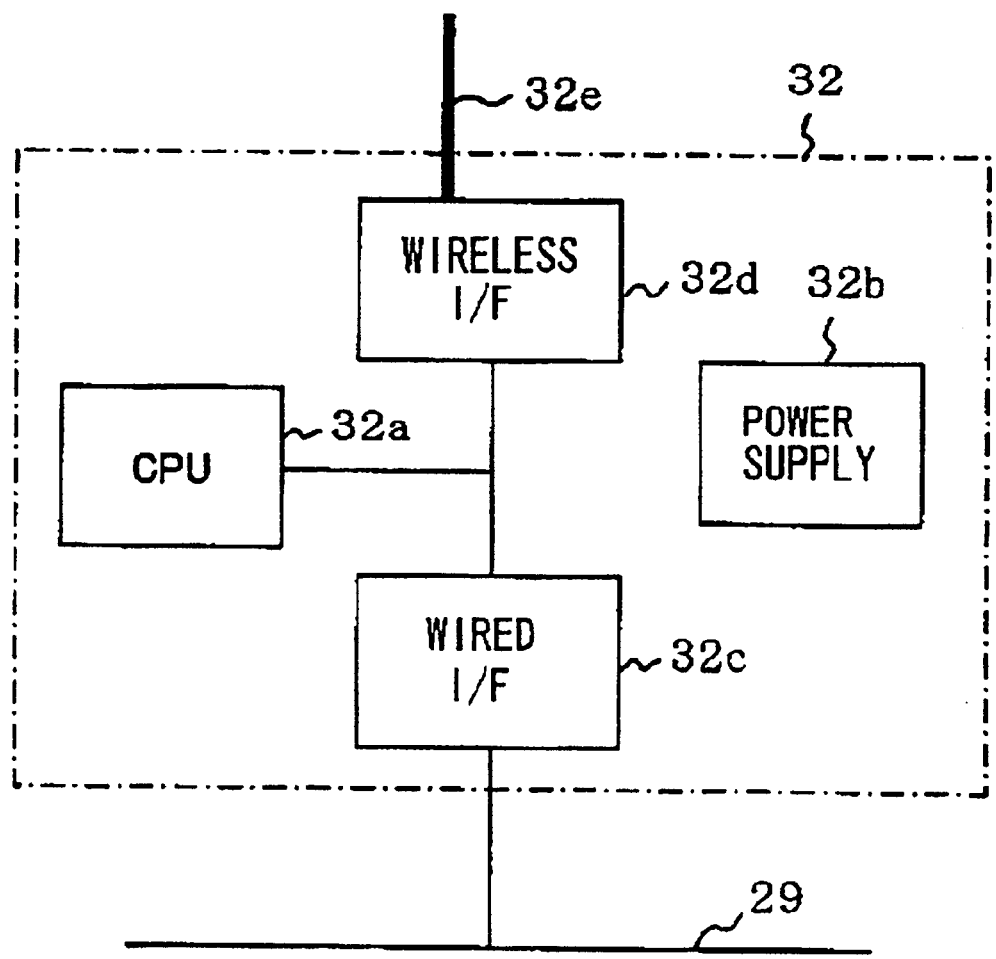
FIG. 7 is a schematic block diagram of a wireless communication unit shown in FIG. 6.
Figure 8:
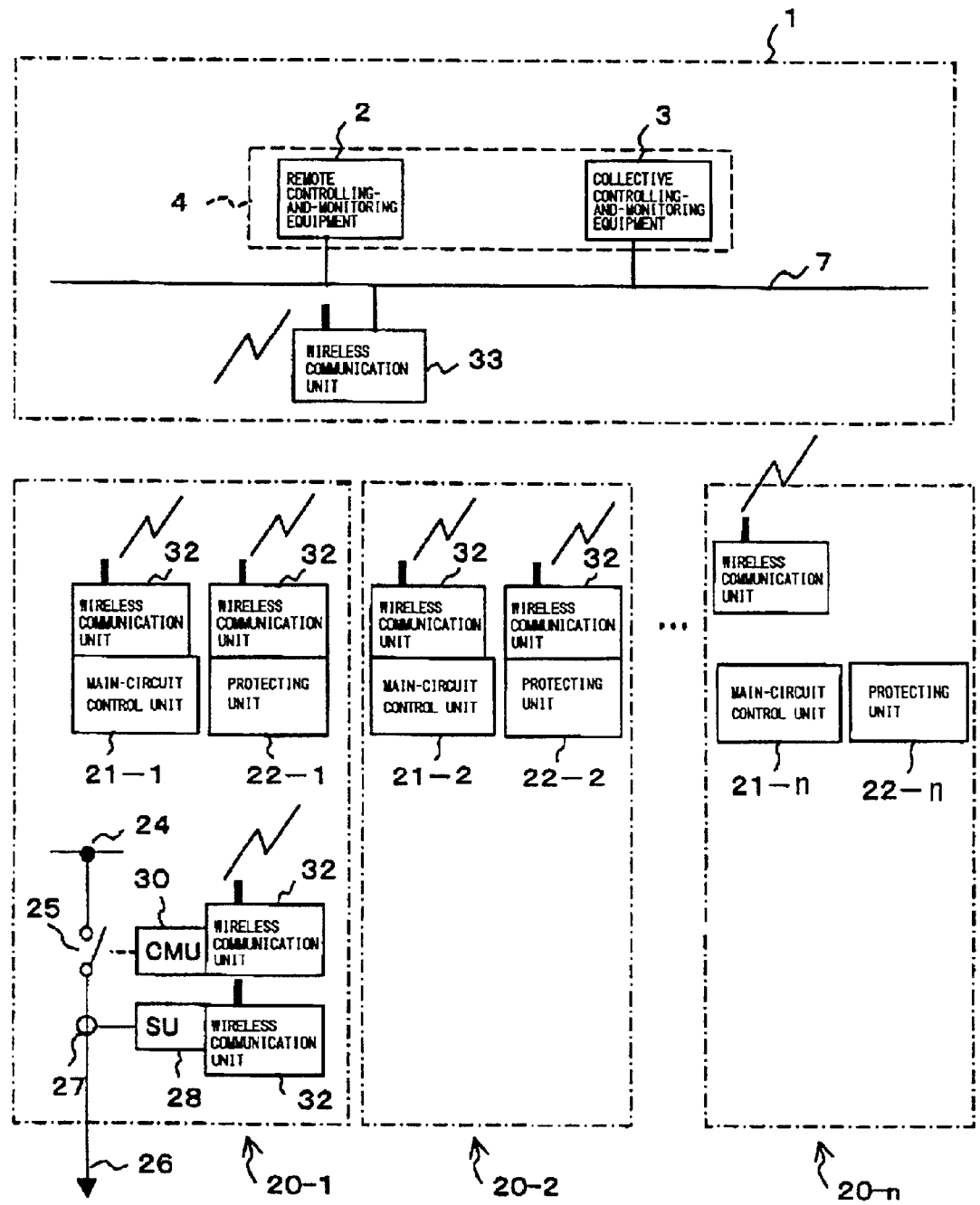
FIG. 8 is a schematic block diagram of a modification of the second embodiment shown in FIG. 6.

FIG. 7 is a block diagram of the wireless communication unit 32, which has a digital processor 32a, an electric power supply 32b, a wired-communication interface (I/F) 32c, a wireless communication interface (I/F) 32d and an antenna 32e. The information on the process bus 29 is sent on the wireless medium by the wireless communication interface (I/F) 32d to the station bus 7 through the wireless communication unit 33 (See FIG. 6). On the other hand, the information from the station bus 7 sent from the wireless communication unit 33 is received by the wireless communication unit 32 and is sent to the process bus 29.

The wireless communication unit 33 is similar to the wireless communication unit 32, and detailed description is omitted here.

FIG. 8 shows an embodiment partially modified from the embodiment shown in FIG. 6. In this embodiment, the wired process bus 29 shown in FIG. 6 has been eliminated, and the sensor unit 28, the component controlling-and-monitoring unit 30, the main-circuit control unit 21 and the protecting unit 22 are directly connected to their respective wireless communication units 32. Thus, those units can be communicated with each other and with the control main building 1 on wireless basis. Each of the wireless communication units 32 in this embodiment is similar to the wireless communication unit 32 shown in FIG. 7.

Wireless communication is advantageous especially when the distances between the sensor unit 28, the component controlling-and-monitoring unit 30, the main-circuit control unit 21 and the protecting unit 22 are long, because the effect of reduction of the communication cables is large. Such cases may include the cases where the substation main components are large, where the substation main components are separated for phases (for example, in case of GIS and air-insulated switchgear where components for Phases A, B and C are separated).

As described above, according to the second embodiment (including the modification) shown in FIGS. 6 through 8, installation of the communication lines between the substation main-circuit components and the control main building 1, and installation of the process buses in the substation main-circuit components can be eliminated.

Applying the wireless communication system of this embodiment may make it easy to add a process bus to an existing substation main-circuit component.

Third Embodiment

Figure 9:
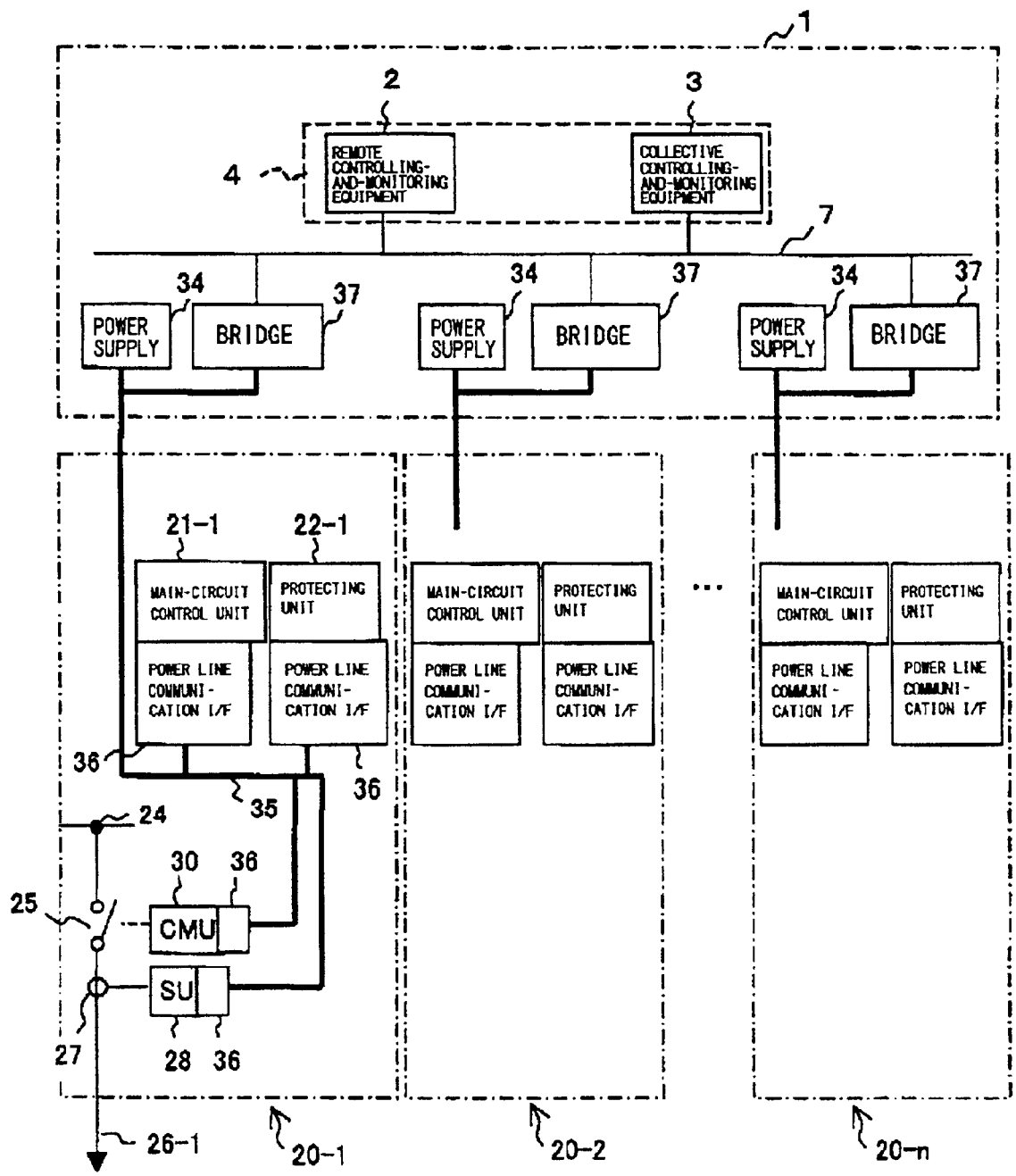
FIG. 9 is a schematic block diagram of a third embodiment of a system for protecting and controlling substation main-circuit components according to the present invention.

A third embodiment of a system for protecting and controlling substation main-circuit components according to the present invention is now described with reference to FIG. 9. In this embodiment, electric power is supplied from the controller electric power supply 34 to the sensor unit 28, the component controlling-and-monitoring unit 30, the main-circuit control unit 21 and the protecting unit 22 via an electric power supply line 35. The electric power supply line 35 is also used for data communication.

The sensor unit 28, the component controlling-and-monitoring unit 30, the main-circuit control unit 21 and the protecting unit 22 are connected to their respective electric-power-supply-line communication interfaces (I/Fs) 36. Each of the electric-power-supply-line communication interfaces (I/Fs) 36 are connected to each other through the electric power supply line 35. The controller electric power supply 34 is connected to the electric power supply line 35 in the control main building 1. An "electric power supply line to station bus bridge" 37 is connected to the electric power supply line 35 in the control main building 1 for allowing only information pass there through.

Thus, the sensor unit 28 sends the current and the voltage data through the electric power supply line 35. The main-circuit control unit 21 and the protecting unit 22 receive the required data from the electric power supply line 35, and they send signals such as circuit trip commands to the component controlling-and-monitoring unit 30 via the electric power supply line 35.

Required information is exchanged between the station bus 7 connected to the collective controlling-and-monitoring equipment 3 and the process bus 29 in the substation main-circuit component by the "electric power supply line to station bus bridge" 37, the electric power supply line 35 and the electric-power-supply-line communication interfaces (I/Fs) 36. Likewise, the information among the main-circuit units 20-1 through 20-n are exchanged through the electric power supply line 35 and the station bus 7.

According to the third embodiment described above, the electric power supply line 35 between the main-circuit units 20-1 through 20-n and the substation controlling-and-monitoring equipment 4 are used for communication, and needs for dedicated communication lines can be eliminated.

Fourth Embodiment

Figure 10:
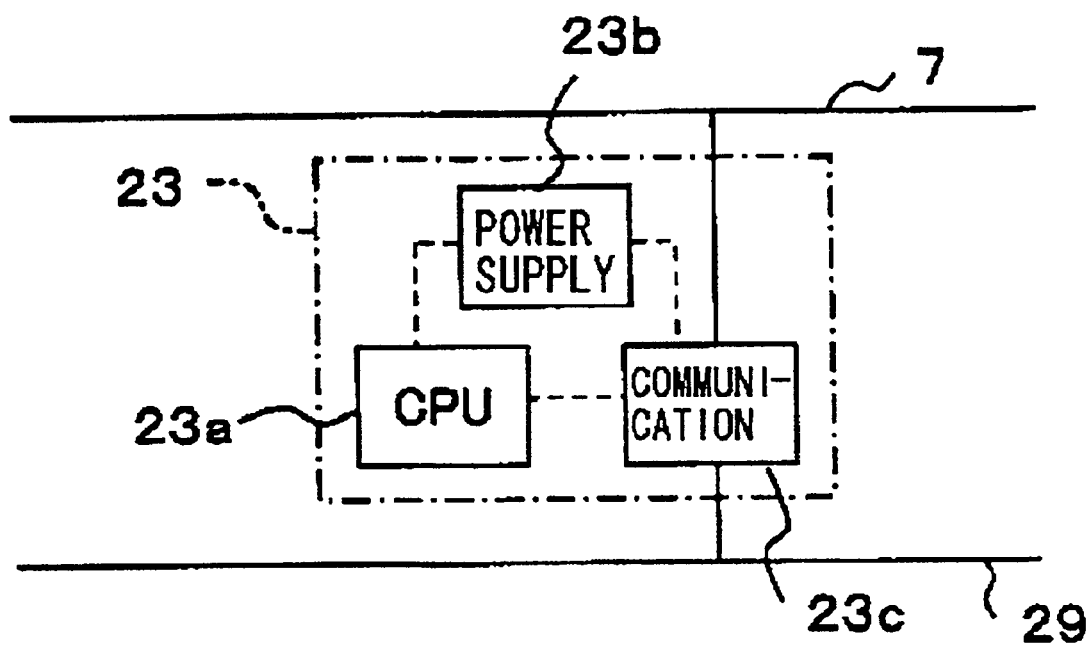
FIG. 10 is a schematic block diagram of a protecting-and-controlling unit of a fourth embodiment of a system for protecting and controlling substation main-circuit components according to the present invention.

A fourth embodiment of a system for protecting and controlling substation main-circuit components according to the present invention is now described with reference to FIG. 10. FIG. 10 shows a hardware construction of a protecting-and-controlling unit 23 of this embodiment.

In this embodiment, the main-circuit control unit 21 and the protecting unit 22 are integrated in a single hardware unit of protecting-and-controlling unit 23. The main-circuit control unit 21-1 and the protecting unit 22-1 shown in FIG. 4 are similar or identical in their hardware construction, although their functions realized by their software are different—the former is controlling and the latter is protection. In this embodiment, the functions of controlling and protection are realized by a common hardware installed with application software for controlling and protection.

Such a structure can be realized by using a digital processing means (CPU) which has the ability to process both of the protection and the controlling functions. Such a digital processing means may be easily realized with one or more LSIs. By using the digital processing means (the common CPU) 23a which processes both of the protection and the controlling functions with one or more LSIs, separate pieces of hardware for protection and the controlling are not needed. Likewise, the communication means for controlling 21c and the communication means for protection 22c can be replaced by a single communication means (common communication means) 23c which can process both of the communications for controlling and for protection.

When the common CPU 23a and the common communication means 23c are used in the protecting-and-controlling unit 23, the electric power supplies can be replaced by a single electric power supply (a common electric power supply) 23b.

Thus, the main-circuit control unit 21 and the protecting unit 22 can be integrated into a single unit, because both of protecting and controlling can be processed by a single CPU 23a due to enhanced performance of hardware including CPUs. Another important cause for realization of integration of the protecting and controlling is that this embodiment is applied to a system for protecting and controlling substation main-circuit components which uses a process bus.

In a conventional protecting and controlling unit, AC electric values of main circuits of substation main-circuit components are inputted, and a voltage of AC 163.84 V is transformed to a voltage of about 7 V, and a current of about AC 163.84 A is transformed to a current of about 47 mA, for example, at input transformers. Then, the electric values are filtered by an analogue input circuit, and converted to digital values by sampling with a regulated sampling periods. Then, controlling and monitoring of the substation main-circuit components and diagnoses of internal fault or external fault of protective zone of the substation are performed by a controlling-and-monitoring processor based on the digital values. Then, circuit breaker trip signals are sent to a controller of a circuit breaker by auxiliary contacts, for example.

In the conventional protecting and controlling units, the control and protecting units are separated, and the controlling unit communicates with a control center, and exchanges controlling-and-monitoring information and information of the protecting unit.

In the conventional protecting and controlling units, the protecting unit may use a unique protocol for communication with the controlling unit, while the controlling unit may use a telecommunication unit and another unique protocol for communication with the control center. Thus the conventional protecting and controlling units may often use different interfaces for communicating with the upstream system.

In the conventional protecting and controlling units, the information is exchanged through individual point-to-point contact position connections, when the controller of the substation main-circuit component is operated by the controlling unit or when a trip signal is sent from the protecting unit to the controller of the substation main-circuit component.

In this embodiment of the present invention using the process bus, the analogue input circuit are replaced by a sensor unit, for example. The component controlling-and-monitoring unit 30 sends controlling commands to the substation main-circuit component, and sends commands for the circuit-breaker to trip. The protecting unit described above is the protecting unit 22 of the protecting-and-controlling unit 23, and the controlling unit described above is the controlling unit 21 of the protecting-and-controlling unit 23.

Those units are connected to the process bus 29, and they are communicated using a common communication protocol. The controlling unit 21 and the protecting unit 22 connected to the station bus 7 of the upstream system are communicated using a common communication protocol.

By using a process bus, the controlling unit 21 and the protecting unit 22 in the protecting-and-controlling unit 23 can communicate with the station bus 7 using the common communication protocol, and also can communicate with the process bus 29 using the common communication protocol. Further, the conventional point-to-point contact position information transmissions which were separated for protection and for control can be performed using the same communication protocol by commonly using the process bus 29.

Thus, communication means are standardized, and the communication means 22c for the protecting unit 22 and the communication means 21c for the controlling unit 21 are made commonly used single means. Then, the CPU and the electric power supply can also be used for both functions, respectively. Thus, each one of the communication means, the CPU and the electric power supply can be commonly served and be integrated into a single unit for both of protecting and controlling purposes.

As described above, the protecting-and-controlling unit 23 of this embodiment comprises a common CPU 23a for processing for monitoring, controlling and protecting. The protecting-and-controlling unit 23 also comprises a common communication means 23c for communicating with the station bus 7 and the process bus 29, and a common electric power supply 23b for supplying power to the common CPU 23a and the common communication means 23c. The protecting-and-controlling unit 23 performs processes of protecting and controlling periodically with a predetermined time periods.

The protecting-and-controlling unit 23 receives digital electric values which have been processed by the sensor unit 28 through the process bus 29. The digital electric values are AC electric values of the main-circuit component, and they are synchronized and have time data. Therefore, the data receiving time may not be guaranteed depending on the ability of the process bus 29. In such a case, an optimum time period for CPU processing may be determined considering the fluctuation of data receiving time, maximum delay, allowable time from the detection of a power system fault to the trip of the substation main-circuit.

By this embodiment of the present invention, the protecting-and-controlling unit is integrated into a single unit, the volume of hardware is reduced and the protecting-and-controlling unit becomes more compact, the cost of the unit production becomes less compared to the conventional separated construction of the protecting unit and the controlling unit.

If the integration of the protecting unit and the controlling unit results in unacceptable reliabilty, the protecting-and-controlling unit of this embodiment may be duplicated. In such a case, production cost may be remained similar to the conventional protecting-and-controlling units. However, the system reliability would become higher because the additional protecting-and-controlling unit may back up both of the protecting and controlling functions.

Modification of the Fourth Embodiment

Figure 11:
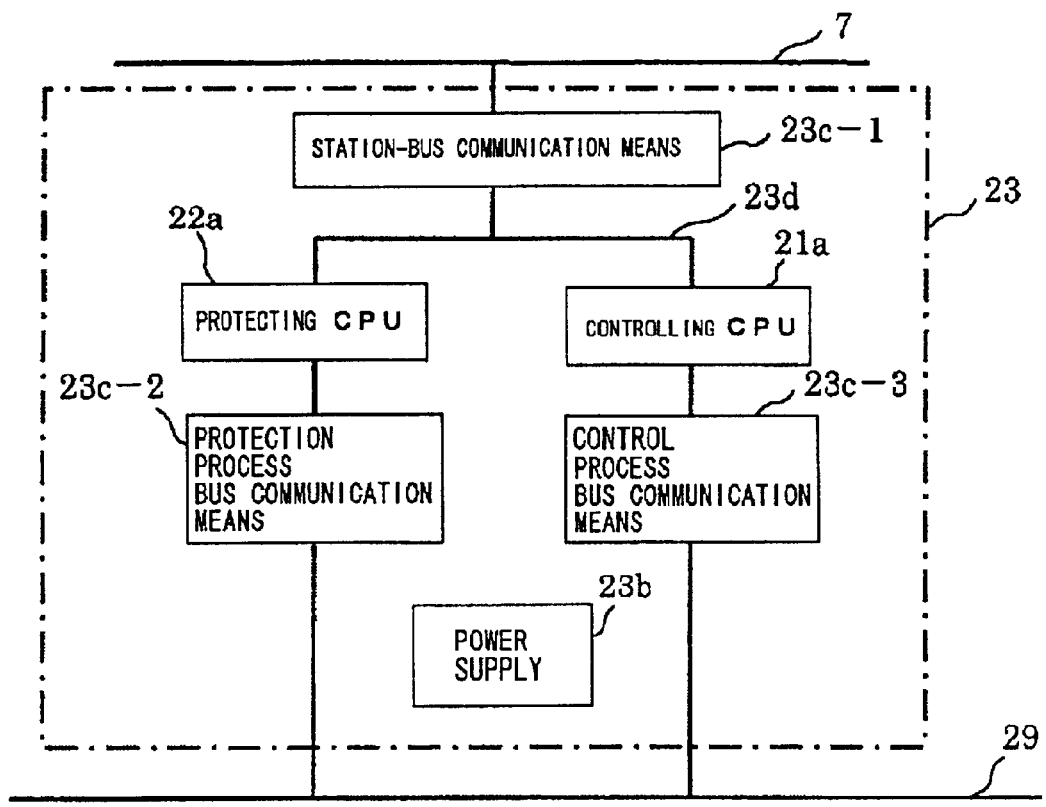
FIG. 11 is a schematic block diagram of a modification of the protecting-and-controlling unit shown in FIG. 10.

A modification of the fourth embodiment of a system for protecting and controlling substation main-circuit components according to the present invention is now described with reference to FIG. 11. FIG. 11 shows a hardware construction of a protecting-and-controlling unit 23 of this embodiment. The functions of CPU, communication means and electric power supply of the protecting-and-controlling unit 23 are similar to those of the fourth embodiment described above.

In this embodiment, the hardware construction of the CPU is divided into a controlling CPU 21a for controlling and monitoring the substation main-circuit component and a protecting CPU 22a for processing of protection for detecting internal faults or external faults of protective zone of the substation. The protecting-and-controlling unit 23 also has a station bus communication means 23c-1 for communicating with the station bus 7, and a process bus communication means for controlling 23c-3 and a process bus communication means for protecting 23c-2, both for communication with the process bus 29. The protecting-and-controlling unit 23 also has a common electric power supply 23b for both of the protecting CPU 22a and the controlling CPU 21a. It is to be understood that the protecting-and-controlling unit 23 also has peripheral circuits (not shown) other than the electric power supply and the communication means.

In the embodiment shown in FIG. 11, the station bus communication means 23c-1 and the electric power supply 23b are common hardware for both of controlling and protecting, while the CPUs 21a and 22a, and the process bus communication means 23c-2 and 23c-3 are separate hardware construction, respectively.

The purpose of separating the protecting CPU 22a and the controlling CPU 21a is to avoid a case when a CPU has failure, and both the protecting and controlling functions are lost, so that high reliability may be obtained.

Figure 34:
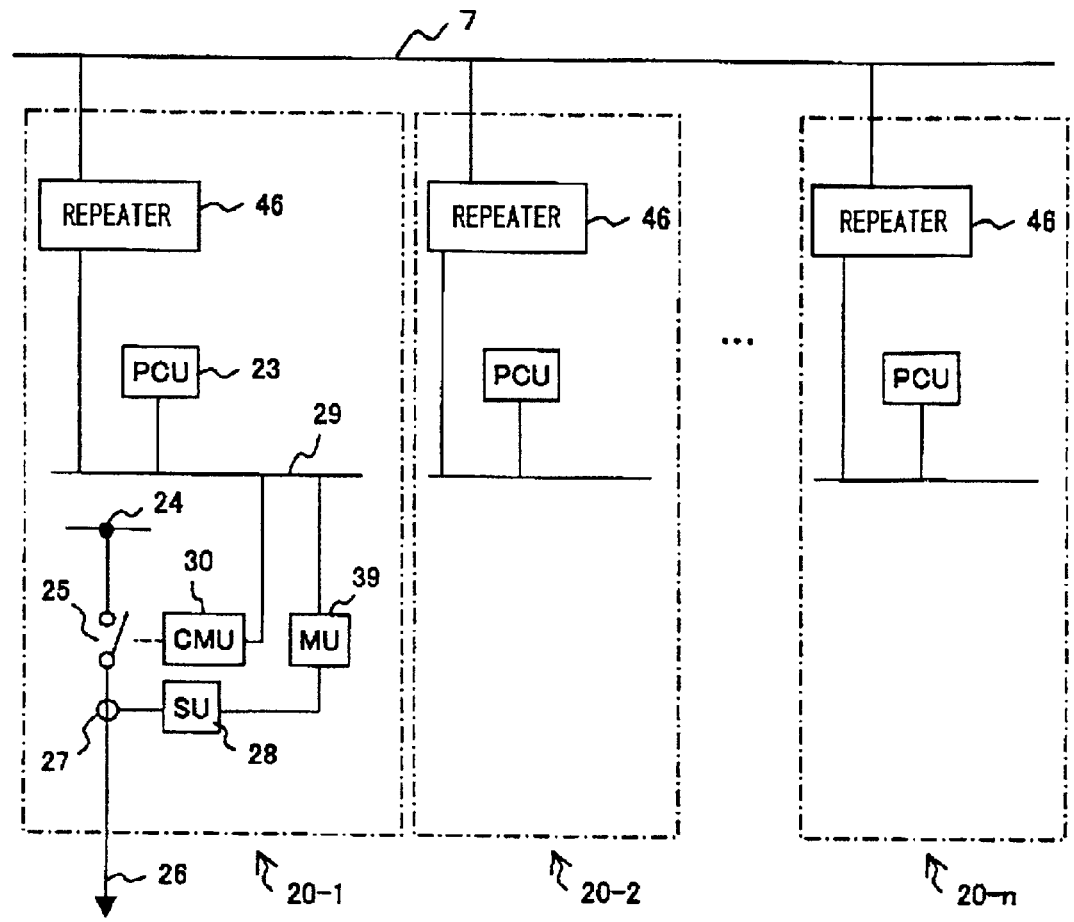
FIG. 34 is a schematic block diagram of a main part of a fifteenth embodiment of a system for protecting and controlling substation main-circuit components according to the present invention.

The purpose of separating the process bus communication means 23c-2 for protecting and the process bus communication means 23c-3 for controlling is to avoid a case when a process bus communication means has failure, and communication with the CMU 30 shown in FIGS. 1 and 34 (described later), sensor unit 28 or the merging unit 39 is lost. In such a case, neither controlling nor protecting of the substation main-circuit component might be performed.

In this embodiment, such a case of loss of functions of protecting and controlling can be avoided if double failures might not occur, since the process bus communication means for protecting and for controlling are separated.

The station bus communication does not have a function of controlling substation main-circuit components from the upstream system but does not lose protection function when a failure occurs, in comparison to the CPU and the process bus communication. In the station bus communication, the controlling CPU 21a and the protecting CPU 22a may be optionally replaced by a single CPU for cost-down.

If the hardware of electric power supplies for protecting and for controlling are separated, the reliability is enhanced. That is because either protecting or controlling can be performed even if one of the electric power supplies has a failure. However, an electric power supply for common-use is advantageous for thermal environment-proof and for compactness. The electric power supply for common-use may be utilized when the thermal environment-proof and compactness have priority.

In operation of the modification of the fourth embodiment described above, the station bus communication means 23c-1 may be used as a communication master, and the controlling CPU 21a and the protecting CPU 22a may be used as communication slaves in a master-slave communication system.

In the master-slave communication system in this case, data may be transmitted between the master and the slaves with memories. The slaves may have memories, and the master may occupy the transmission lines between the master and the slaves. Then, the master may read/write-access the memories of the slaves. In such a case, the memories are preferably of dual-port memories which can be accessible from the slaves and from the master, and such system would not require arbitration for controlling the sending and receiving.

In the embodiment shown in FIG. 11, the station bus communication means 23c-1, the controlling CPU 21a and the protecting CPU 22a are communicated via a bus-type communication medium 23d. By applying master-slave communication system, arbitration of bus occupation right is not needed among the controlling CPU 21a, the protecting CPU 22a and the station bus communication means 23c-1, so that the communication process may be simplified. In addition, when one of the CPUs has a failure, the failed CPU does not unnecessarily occupy the bus 23d, so that the other CPU is not interfered for communication.

The embodiment shown in FIG. 11 is an example of communication system using common hardware portions for protecting and controlling, but the bus-type communication may not be essential for this invention. FIG. 11 shows the structure of functions but does not show the physical structure. The physical structure may comprise, for example, protecting function portion (a printed circuit board loaded with the protecting CPU 22a and the process bus communication means for protecting 23c-2), and controlling function portion (a printed circuit board loaded with the controlling CPU 21a and the process bus communication means for controlling 23c-3). The physical structure may also comprise a station bus communication portion (a printed circuit board loaded with the station bus communication means), a common electric power supply portion (a printed circuit board or a unit loaded with the common electric power supply) and the bus portion 23d (backplane or cables, etc.). Those portions are separately constructed and connected each other.

It is to be understood that, if the present embodiment is applied to the twelfth embodiment described later, the process bus communication means for controlling 23c-3 and the process bus communication means for protecting 23c-2 would not be connected to the process bus 29, but to a parallel bus (internal bus) 45 (See FIG. 30) where the hardware is separated for protection and for controlling.

Fifth Embodiment

Figure 12:
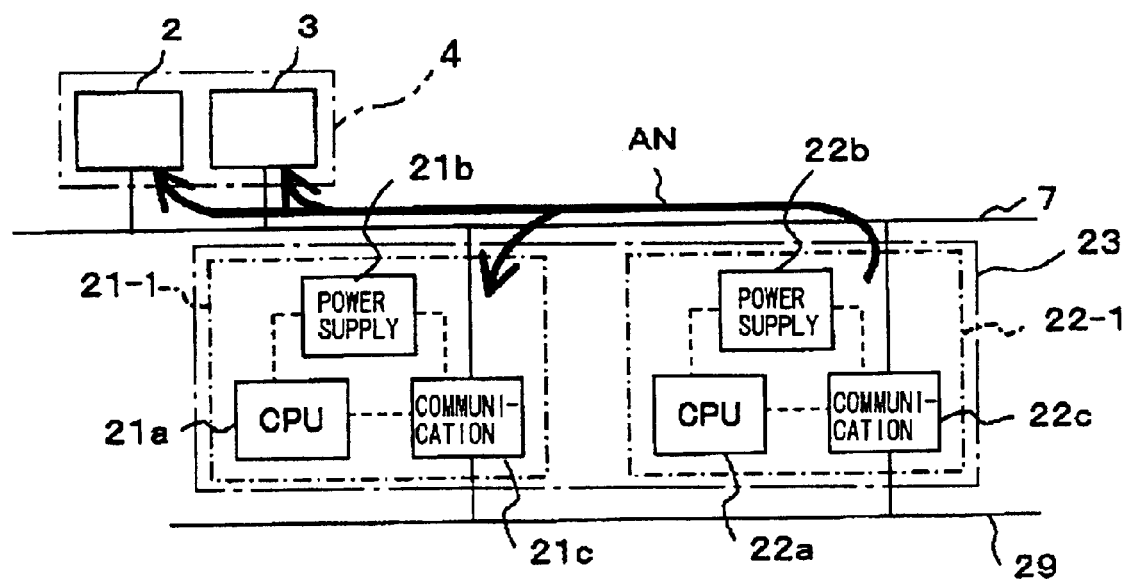
FIG. 12 is a schematic block diagram showing the structure and operation of a protecting-and-controlling unit of a fifth embodiment of a system for protecting and controlling substation main-circuit components according to the present invention.

A fifth embodiment of a system for protecting and controlling substation main-circuit components according to the present invention is now described with reference to FIGS. 12 through 15. FIGS. 12 and 14 show a hardware construction and a function of a protecting-and-controlling unit of this embodiment.

In this embodiment, a protecting-and-controlling unit 23 has a main-circuit control unit 21-1 and a protecting unit 22-1 as separate hardware units. Each unit is installed with software so that the unit can perform the other unit's function as well as its own function. Thus, when one of the units has a failure, the other unit may perform the failed unit's function.

FIG. 12 shows a case when the protecting unit 22-1 has a failure and the main-circuit control unit 21-1 backs up the protecting unit 22-1, while FIG. 14 shows a case when the main-circuit control unit 21-1 has a failure and the protecting unit 22-1 backs up the main-circuit control unit 21-1.

Referring to FIG. 12, the case when the protecting unit 22-1 has a failure is now explained in detail. The protecting-and-controlling unit 23 has a controlling unit 21 (or 21-1) and a protecting unit 22 (or 22-1). The controlling unit 21 (or 21-1) has a main-circuit controlling CPU 21a for monitoring and controlling the substation main-circuit components, a controlling communication means 21c for communicating with the station bus 7 and the process bus 29, and a controlling electric power supply 21b. The protecting unit 22 (or 22-1) has a main-circuit controlling CPU 22a for protecting the substation main-circuit components, a protecting communication means 22c for communicating with the station bus 7 and the process bus 29, and a protecting electric power supply 22b.

When the protecting unit 22 (or 22-1) has a failure (including a case when the protecting unit 22 (or 22-1) does not operate normally and the unwanted operation of protection and a failure to operation of protection), a failure alarm "AN" is sent to the controlling unit 21-1. The controlling unit 21-1 performs the protecting function in response to the alarm AN.

If the protecting unit 22-1 can detect its own failure and it can communicate to the station bus 7, the protecting unit 22-1 may send a failure alarm AN to the station bus 7. The failure alarm AN may be sent directly to the controlling unit 21-1, or may be sent to the collective controlling-and-monitoring equipment 3, and then, the alarm may be sent back from the collective controlling-and-monitoring equipment 3 to the controlling unit 21-1 via the station bus 7. Either one or both of the two routes may be used for sending the failure alarm. When both routes are used, communication reliability may be enhanced. The failure alarm may be sent by a broadcast communication where all the devices connected to the network must receive the signals.

The operation check of the protecting unit 22-1 can be performed by the other units on the station bus 7. Thus, a failure on the protecting unit 22-1 can be detected by the other units if the protecting unit 22-1 cannot detect its own failure (in case of a stopping of the protecting unit, for example). For example, the controlling unit 21-1 and the protecting unit 22-1 may have a mutual checking function between them for checking the operation of each other through the station bus 7 periodically. Then, the stopping of the protecting unit 22-1 can be detected by the controlling unit 21-1, for example.

In such a case, the failure alarm is not required to be sent because the controlling unit 21-1 has detected the failure by itself. Alternatively, the protecting unit 22-1 may send the operation checking signals to the collective controlling-and-monitoring equipment 3 via the station bus 7 periodically. Then, a failure of the protecting unit 22-1 can be diagnosed when the operation checking signals has stopped. When the collective controlling-and-monitoring equipment 3 detects the failure, it sends the failure alarm AN to the controlling unit 21-1 via the station bus 7.

Figure 13A:
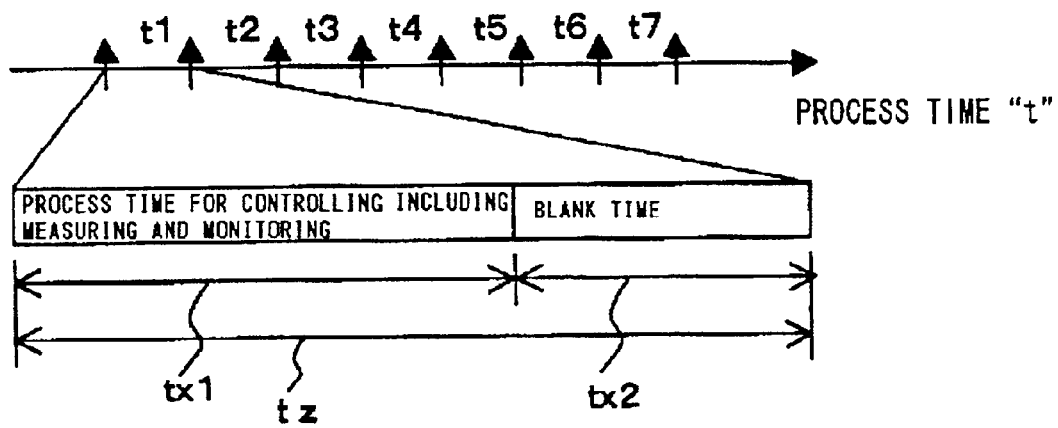
FIG. 13 is a time chart showing the operation of the protecting-and-controlling unit shown in FIG. 12.
Figure 13B:
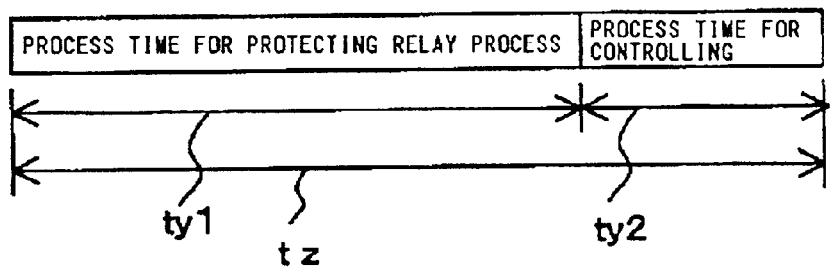
Figure 14:
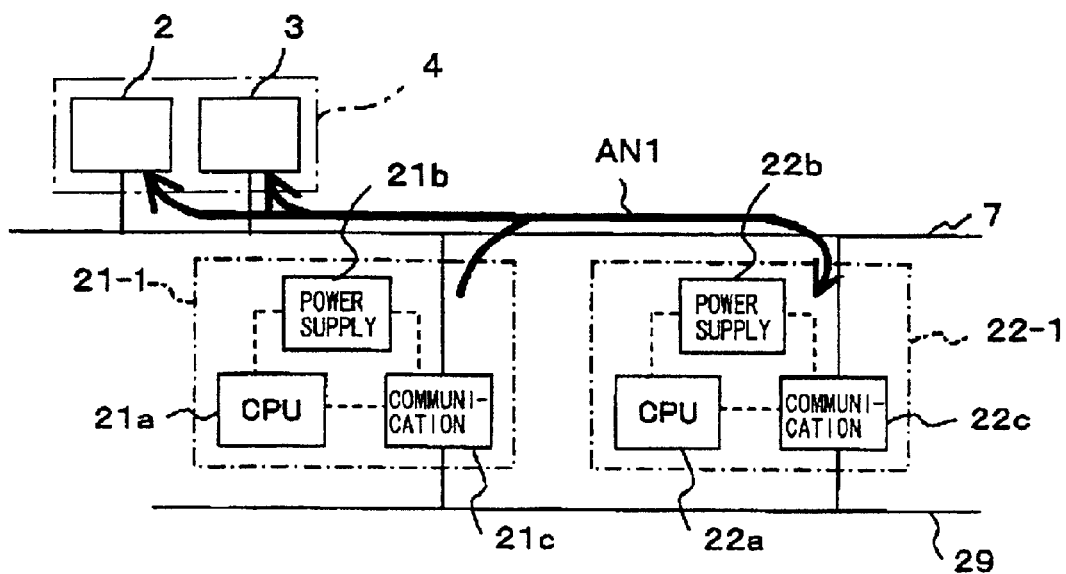
FIG. 14 is a schematic block diagram showing another operation of the protecting-and-controlling unit shown in FIG. 12.

When the controlling unit 21-1 has received the failure alarm AN or has detected a failure by itself, the controlling unit 21-1 may suspend temporarily part of its controlling and monitoring function to spare some time for the controlling CPU 21a to perform protecting function as shown in FIGS. 13A and 13B.

FIG. 13A shows constant processing time intervals t1 though t7 on a processing time axis 17 of the controlling CPU 21a. The time span tz of each time interval is a sum of a controlling processing time tx1 for measuring and monitoring etc. and a blank time tx2. When the protecting function is performed by the controlling CPU 21a, the controlling processing time ty2 (Ty2<Tx1) is shortened by reducing the controlling function as shown in FIG. 13B. Thus, the protecting relay processing time ty1 can be spared. It is to be understood that, if the protecting function can be performed within the blank time tx2, the controlling processing is not needed to be suspended or shortened.

When the controlling unit 21-1 performs protecting function, and cannot perform all the protecting function because of delay in the suspended or shortened controlling processing, each task of the controlling process and of the protecting process is assigned a priority, and the tasks are performed in order of the priority. If a higher-priority task has emerged while a lower-priority task is being performed, the lower-priority task is interrupted by the higher-priority task. The protecting processing tasks may be generally assigned higher priority than the controlling processing tasks. Thus, the protecting process may not be interfered by a delay in the controlling process.

In the description above, when the controlling process is "suspended or shortened", less important process may be interrupted within the controlling process. Alternatively, protecting function may be assigned higher priority than the controlling function, the controlling function may comprise tasks of various priorities. Then, the controlling CPU 21a may perform the controlling functions in order of the priority. This method is called "task priority management".

FIG. 14 shows the case when the main-circuit control unit 21-1 has a failure and the protecting unit 22-1 backs up the main-circuit control unit 21-1. When the main-circuit control unit 21-1 has a failure, the main-circuit control unit 21-1 itself may detect the failure and the failure alarm AN is sent to the protecting unit 22-1 or the protecting unit 22-1 itself may detect the failure. Then, the protecting unit 22-1 may perform the controlling function for the main-circuit control unit 21-1.

The methods for sending the alarm and for detecting the failure may be similar to those shown in FIG. 12 and detailed description is omitted here.

When the protecting unit 22-1 has received the failure alarm AN1 or has detected the failure, the protecting CPU 22a performs the main-circuit controlling and monitoring functions using the blank time of the protecting CPU 22a. It may also use the spared time resulting from the suspension or shortening of the protecting function if required.

Figure 15A:
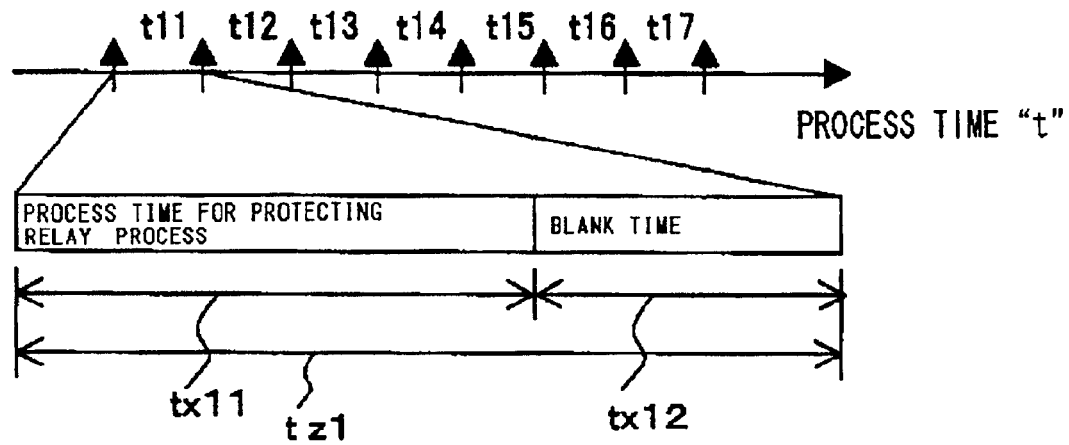
FIG. 15 is a time chart showing the operation of the protecting-and-controlling unit shown in FIG. 14.

FIG. 15 shows an example of assigning process time of the protecting CPU 22a. FIG. 15A shows constant processing time intervals t11 though t17 on a processing time axis t of the protecting CPU 22a. The time span tz1 of each time interval is a sum of a processing time for protecting relay tx11 and a blank time tx12.

Figure 15B:
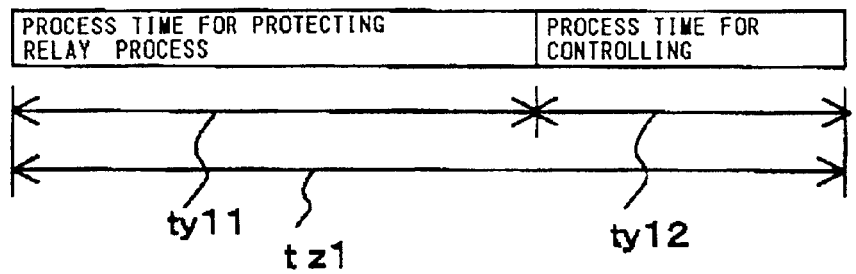

When the protecting CPU 22a performs controlling as well as protecting, it uses the blank time tx12 for controlling as shown in FIG. 15B. In the example shown in FIGS. 15A and 15B, tx12 equals to ty12.

If the line controlling function cannot be performed due to delay of protecting process when the protecting unit 22 performs line controlling function, the line controlling process and the protecting process may be assigned priority. The line controlling process may be assigned higher priority compared to some of the protecting process. Thus, even if protecting process has delay, important controlling process would not be delayed.

According to this embodiment, when either the controlling unit for controlling and monitoring the substation main-circuit component or the protecting unit has a failure, the other unit may perform relatively important functions of controlling and monitoring. Then, controlling and monitoring of the electric power system are maintained, and highly reliable control can be established.

A reason for enabling the back up system of this embodiment is that the communication means is standardized by the process bus compared to conventional system where control signals and protection command signals (such as circuit breaker trip command signals) are sent via a point-to-point contact position information exchange system.

In the case of point-to-point system, hardware must have some modification to have the contact position structures of the protecting unit side modified for allowing it to have controlling function, which would result in higher cost, more complex structure and higher failure rate. On the contrary, in the process bus structure of this embodiment, performing the functions of the other unit can be realized by merely modifying the information of the data addresses sent to the process bus and the process itself through some software process. Special hardware modification is not required. Therefore, the temporary function replacement can be performed easily and efficiently.

Sixth Embodiment

Figure 16:
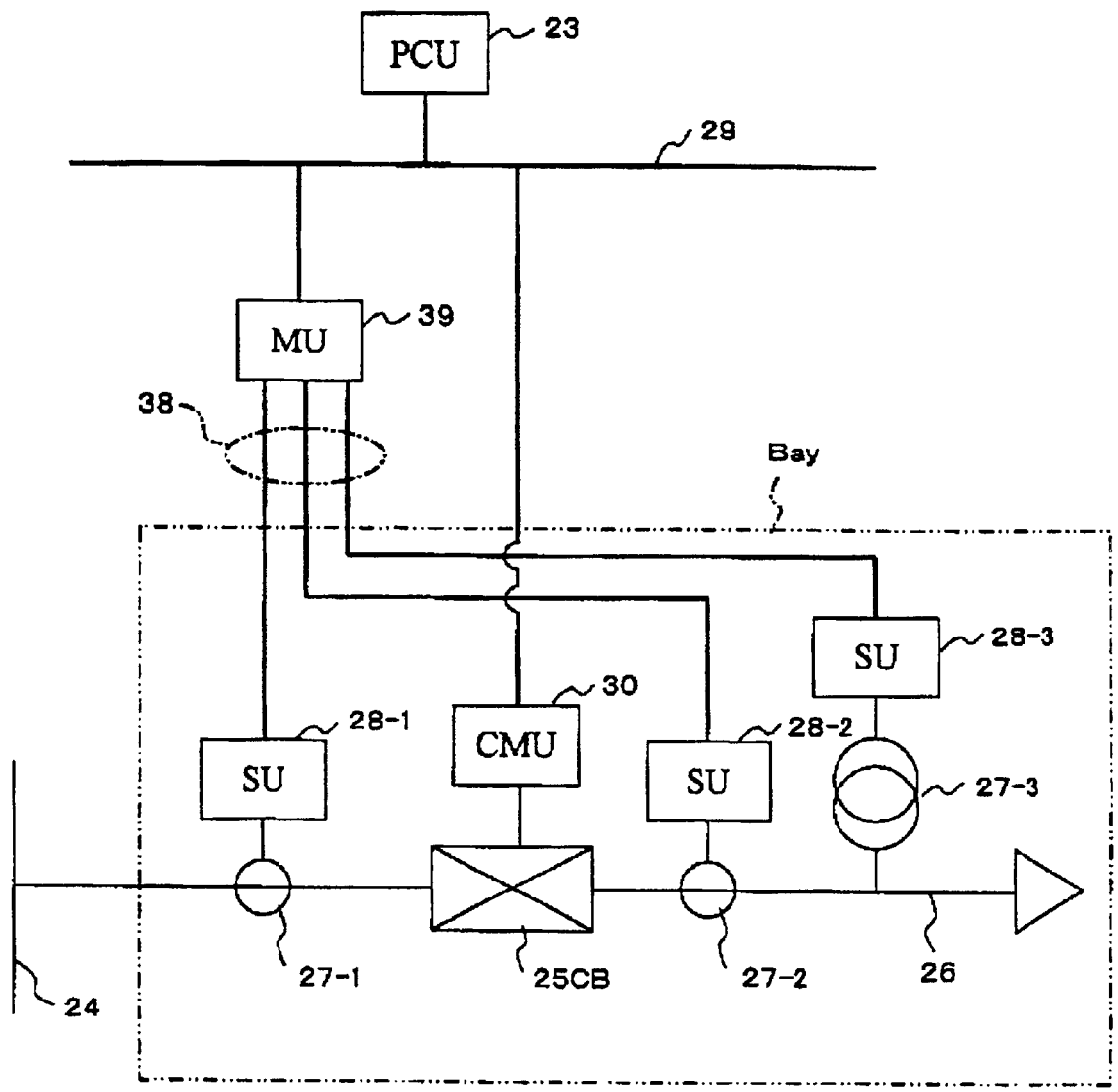
FIG. 16 is a schematic block diagram of a main part of a sixth embodiment of a system for protecting and controlling substation main-circuit components according to the present invention.

A sixth embodiment of a system for protecting and controlling substation main-circuit components according to the present invention is now described with reference to FIG. 16. FIG. 16 is a single line diagram and shows connections between a merging unit and sensor units with a "bay-zone" of protection and control within a certain electric power installation.

Figure 55:
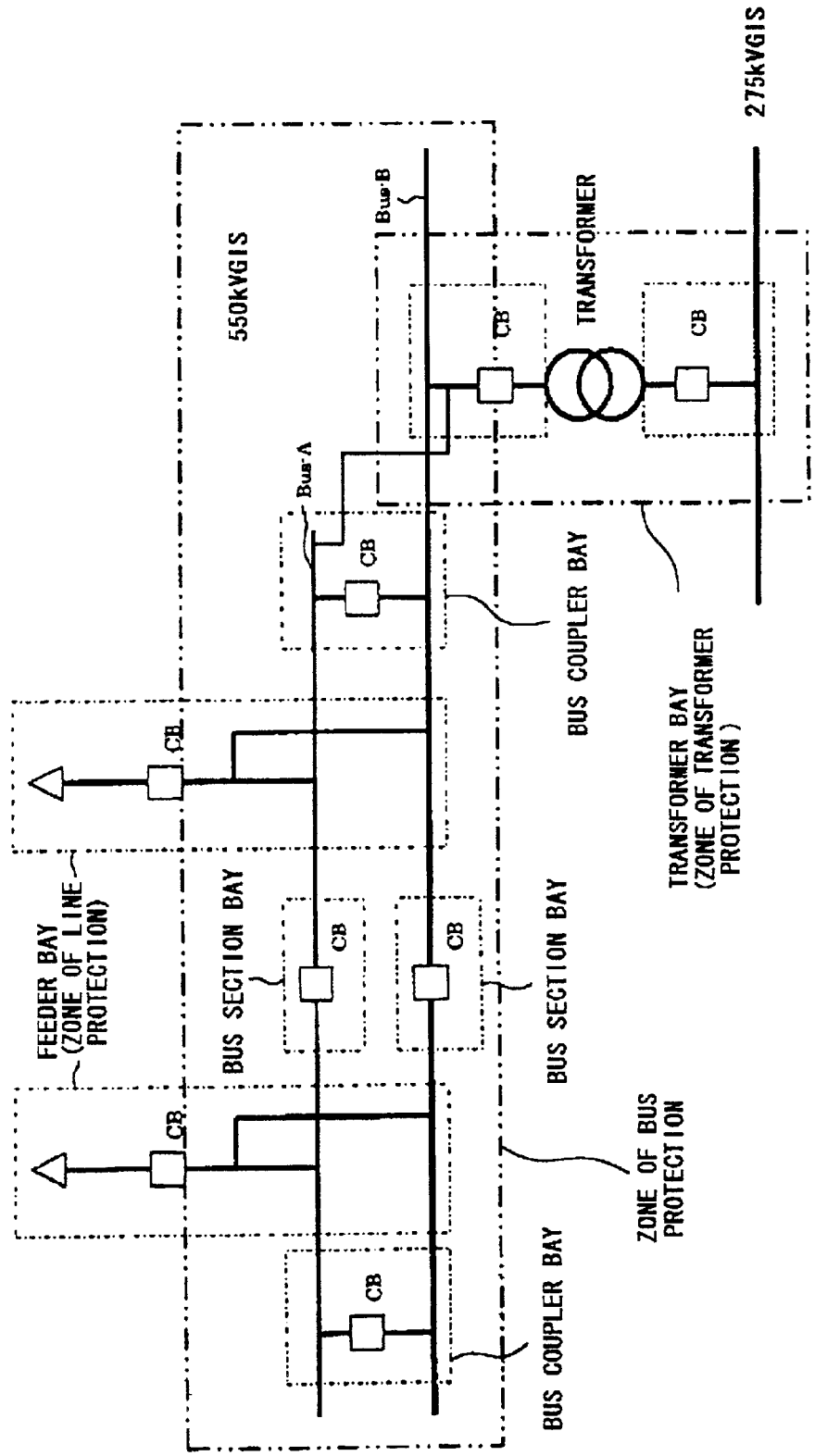
FIG. 55 is a schematic block diagram of a typical switchgear with "bays" of protection and control.

FIG. 55 shows typical "bays" or "bay-zones" for a switchgear. A "bay" or a "bay-zone" is a zone of protection and control within a certain electric power installation. Now back to FIG. 16, an electric power transmission line 26 is branched from a bus line 24. At terminals of the power transmission line 26, main-circuit components, such as a circuit breaker 25CB, a disconnecting/earthening switch (not shown), are connected. In addition, current detecting means (CTs) 27-1 and 27-2 are disposed on the bus line 24 side and on the power transmission line 26 side, respectively, of the circuit breaker 25CB. Furthermore, a voltage detecting means (VT) 27-3 is disposed on the power transmission line 26 side.

The current detecting means (CTs) 27-1 and 27-2 may include current transformers utilizing Rogowski coils or iron-core coils, or optic conversion type electric current sensors utilizing Faraday's effect, for example.

The voltage detecting means 27-3 may include an instrument voltage transformer utilizing capacitor voltage divider or iron-core coils, or an optic conversion type electric field sensor utilizing Pockels effect, for example. It is to be understood that the analogue input portions of the sensor units 28 may be modified depending on the installed detectors of the current detecting means and the voltage detecting means.

The sensor units 28 are disposed on the outer surface of the GIS tank, for example, near their respective current detecting means or the voltage detecting means, as shown in FIG. 2. The output terminals of the sensor units 28 are connected to the merging unit (MU) 39 via the point-to-point communication means 38. The merging unit (MU) 39 is contained in the process control box 31 shown in FIG. 2 with the protecting-and-controlling unit 23.

The sensor units are disposed near the current or voltage detecting means, so that the electric wires connecting the current or voltage detecting means and the sensor units may be as short as possible.

The cases containing the current or voltage detecting means, the cases containing the sensor units and the cases containing the substation main-circuit components are arranged so as to make the electric wires connecting those detecting means, the sensor units and the components shortest as far as those cases may not interfere each other.

Figure 20:
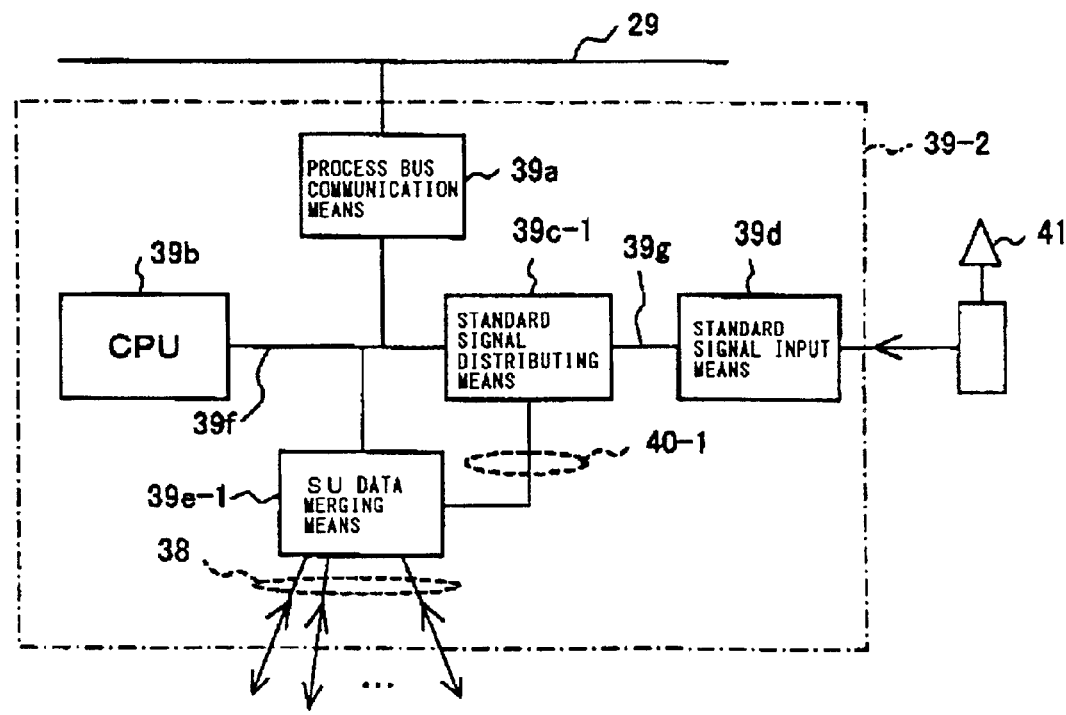
FIG. 20 is a schematic block diagram of the merging unit shown in FIG. 19.
Figure 24:
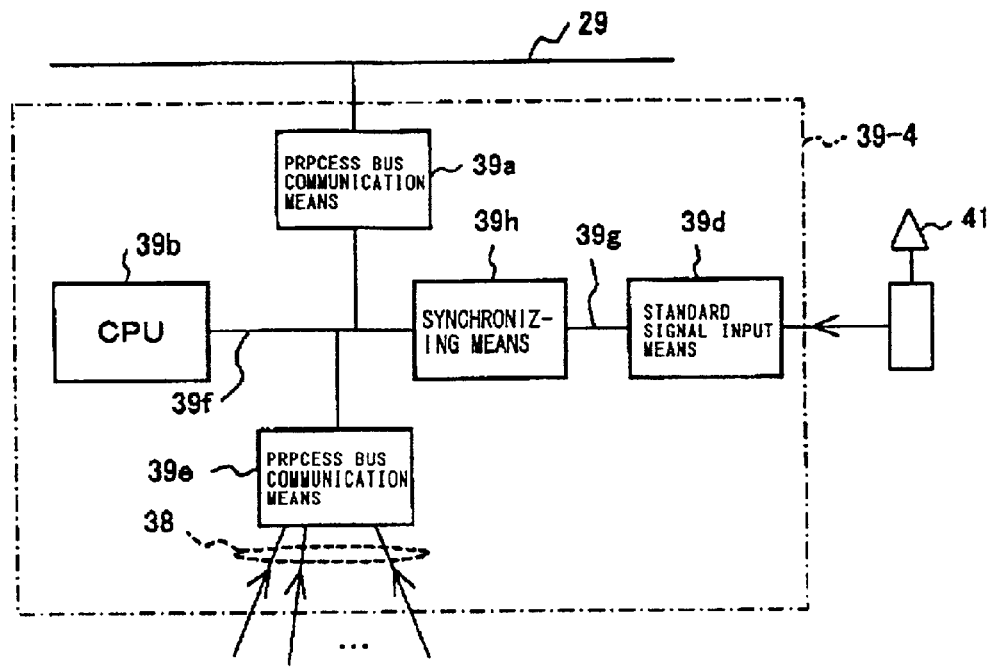
FIG. 24 is a schematic block diagram of the merging unit shown in FIG. 23.

The merging unit (MU) 39 has a CPU as shown in FIGS. 18, 20 and 24 as described later in detail. The merging unit 39 may merge the digital signals of the current data and the voltage data sent from the sensor units 28-1 through 28-3 into a transmission frame of a bay zone of protection and control within a certain electric power installation, for example. The merging unit 39 may further add time data to the digital signals, and then transmit the data to the protecting-and-controlling unit 23 and the substation controlling-and-monitoring equipment 4 via the process bus 29. In addition, the merging unit 39 may further adjust sensitivities and phases of the digital signals.

Alternatively, the merging unit 39 may merge the digital signals of currents and voltages in any combination covering different bay zones of protection and control within an electric power installation, instead of a single bay zone of protection and control, into a single transmission frame.

Furthermore, the merging unit 39 may merge the digital signals of a single bay zone of protection and control within an electric power installation into a plurality of transmission frames instead of a single transmission frame.

For example, in a transformer circuit, one bay zone of protection and control usually include the higher and the lower voltage sides, although the switchgears of the higher and the lower voltage sides are not necessarily disposed close to each other. In such a case, it may be advantageous that the digital signals of current and voltage at the higher voltage side are merged into a first transmission frame, and the digital signals of current and voltage at the lower voltage side are merged into a second transmission frame. Those transmission frames may be sent to the process bus.

It is to be understood that the explanation of merging of digital signals of electric currents and voltages using a merging unit (MU) can be applied to any merging of any embodiments described in this specification.

The communication means 38 are hardly influenced by noises because they are digital communication lines, but they are preferably optic fibers to further enhance noise resistance. The merging unit 39, the protecting-and-controlling unit 23 and the component controlling-and-monitoring unit 30 are connected by the process bus 29. The operation of the component controlling-and-monitoring unit 30 is similar to that of the first embodiment.

Operation of the sixth embodiment is as follows:

A typical bay has a plurality of current detecting means, voltage detecting means and their corresponding sensor units. The outputs of the sensor units must be connected to the protecting-and-controlling units and the component controlling-and-monitoring units. The merging unit merges the signals into required minimum number of transmission frames, instead of sending the outputs of the sensor units directly to the process bus. Thus, the number of nodes of the process bus can be minimized, and the plurality of electric values in the bay can be transmitted in a minimum number of transmission frames, which results in an efficient process bus utilization.

In addition, the sensor units are disposed adjacent to the current or the voltage detecting means, and the electric values are digitized near the current or the voltage detecting means. Therefore, high-quality electric values can be sent to the component controlling-and-monitoring unit and the protecting-and-controlling unit, even if the secondary outputs of the current or the voltage detecting means are low level.

When the switchgear to be protected in a bay is of three-phase-encapsulated type GIS, the three sensor units 28-1 corresponding to the three current detecting means 27-1 for three phases may be a single sensor unit commonly used for the three phases. Likewise, a single sensor unit corresponding to the current detecting means 27-2 and another single sensor unit corresponding to the voltage detecting means 27-3 may be commonly used for three phases.

It is to be understood that each one of the sensors has at least three input terminals, converts AC electric values of at least three phases, merges the digitized values of the at least three phases, and sends the merged values to the merging unit 39.

Furthermore, the sensor units 28-2 and 28-3 may be merged into a single sensor unit if possible. Furthermore, when a single-phase-encapsulated GIS is used, the sensor units corresponding to the current detecting means of each phase can be designed as a sensor unit commonly used for three phases.

As described above, each one of the sensor units does not necessarily correspond to a current or a voltage detecting means. Instead, each one of the sensor units may correspond to a plurality of current and/or voltage detecting means.

Seventh Embodiment

Figure 17:
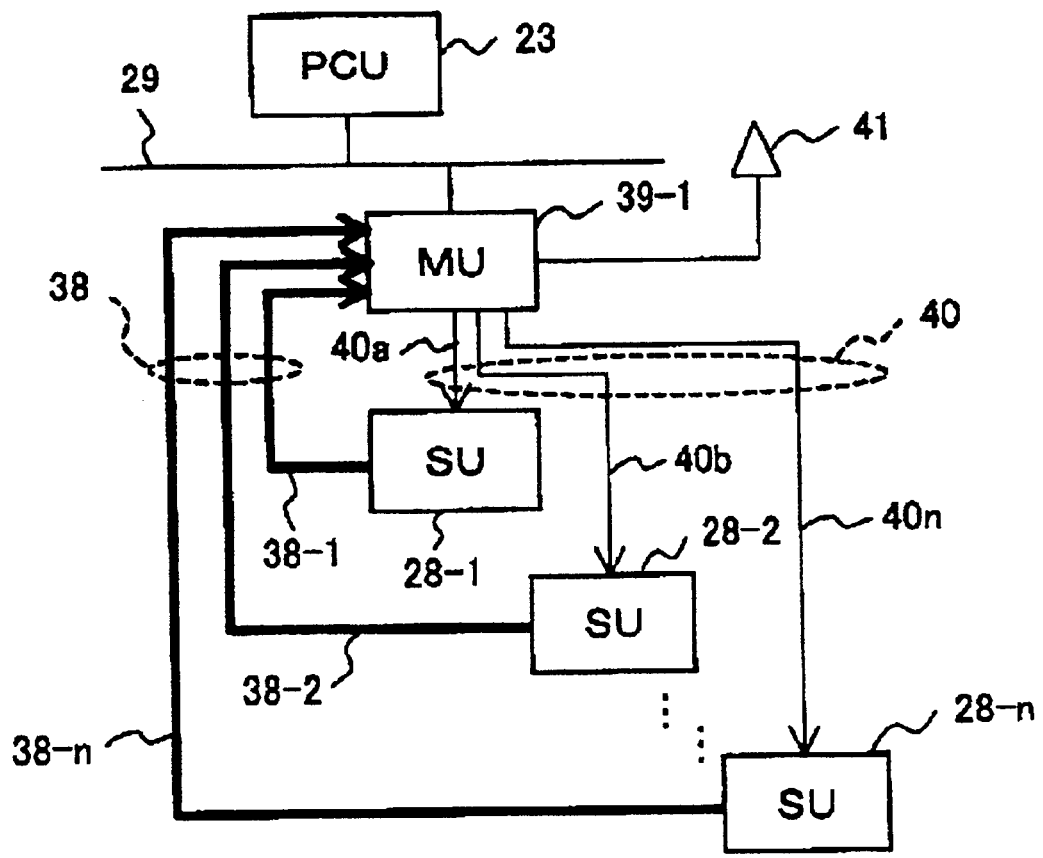
FIG. 17 is a schematic block diagram showing the structure and operation of a merging unit and sensor units of a seventh embodiment of a system for protecting and controlling substation main-circuit components according to the present invention.

A seventh embodiment of a system for protecting and controlling substation main-circuit components according to the present invention is now described with reference to FIGS. 17 and 18. FIG. 17 is a block diagram of the seventh embodiment, showing the connecting relations between the merging unit and the sensor units. The protecting-and-controlling unit 23, the merging unit (MU) 39-1 and the sensor units (SUs) 28-1 through 28-n are similar to the corresponding units of the embodiments described above.

Sampling synchronization and time data adding are now discussed in detail. This embodiment corresponds to Pattern 3 shown in FIG. 3C as noted before. As explained above, the merging unit 39-1 receives the digital data corresponding to the detected currents and voltages of the substation main-circuit components outputted from the sensor units 28-1 through 28-n via the point-to-point type communication lines 38-1 through 38-n. The merging unit 39-1 then merges the digital data of each bay-zone of protection and control within an electric power installation into a transmission frame. The merging unit 39-1 send them to the process bus.

The merging unit 39-1 of this embodiment receives global positioning system(GPS) signals from a GPS receiver 41, and picks up and generates time standard signals for synchronization and standard time data from the GPS signals.

Then, the merging unit 39-1 sends out the time standard signals for synchronization and standard time data to the sensor units 28-1 through 28-n via the point-to-point type communication lines 40. The sensor units 28-1 through 28-n perform sampling synchronization and time adding to the AC electric values detected from the substation main-circuit components based on the time standard signals for synchronization and standard time data received through the point-to-point type communication lines 40.

FIG. 18 shows an exemplary construction of the merging unit 39-1. The merging unit 39-1 has a sensor unit data merging means 39e for receiving data from the sensor units 28-1 through 28-n, and a process bus 39a for communicating with the protecting-and-controlling unit 23 which is upstream of the merging unit 39-1.

The output signals of the GPS receiver 41, an example of which is shown as a curve WV1 in FIG. 28 as described later, are inputted and processed by the standard signal input means 39d. The picked up standard time signals for synchronization (highly precise 1-second pulse signals, for example) and standard time data for every 1-second pulse, for example (absolute time), are sent to a standard signal distributing means 39c through a transmission line 39g.

The standard signal distributing means 39c distributes the standard time signals for synchronization and the standard time data for every 1-second pulse to the sensor units 28-1 through 28-n via the point-to-point type communication lines 40. The CPU 39b controls the process bus communication means 39a, the sensor unit data merging means 39e and the distributing means 39c via the internal bus 39f, and performs communication protocol conversion from the sensor units 28-1 through 28-n to the protecting-and-controlling unit 23.

Thus, in this embodiment, synchronization and time data adding of digitized electric values are performed by each one of the sensor units 28-1 through 28-n. Thus, the digital data synchronized among the whole sensor units 28-1 through 28-n accompanied by the time data are obtained. The construction of the sensor units may be the same as that shown in FIG. 3A.

Figure 19:
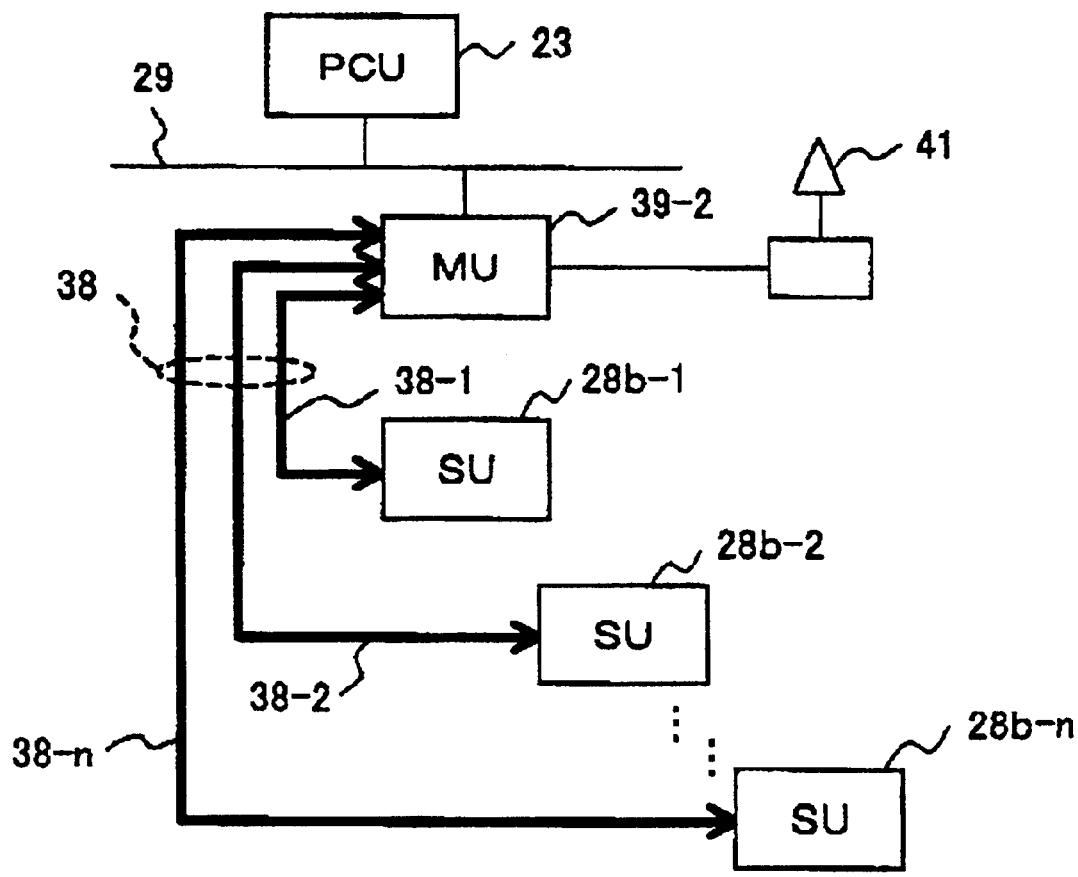
FIG. 19 is a schematic block diagram showing the structure and operation of a merging unit and sensor units of a modification of the seventh embodiment shown in FIG. 17.

A modification of the embodiment described above, with the point-to-point communication lines 40 eliminated, is shown in FIG. 19. The relation between the merging unit 39-2 and the sensor units 28b-1 through 28b-n is as follows:

The merging unit 39-2 receives digital outputs from the n sensor units 28b-1 through 28b-n via the point-to-point communication lines 38. The merging unit 39-2 has a standard signal input function for receiving the output signals (or the GPS signals) from the GPS receiver 41 and picking up the time standard signals for synchronization and the standard time data. The merging unit 39-2 sends the picked up time standard signals for synchronization and the standard time data to the sensor units 28b-1 through 28b-n via the point-to-point communication lines 38.

Thus, the sensor units 28b-1 through 28b-n perform sampling synchronization and time adding to the AC electric values of the substation main-circuit components. It is to be understood that the GPS time data is an example for standard time signals and does not limit the present invention.

Referring again to FIG. 19, the merging unit 39-2 and each one of the sensor units 28b-1 through 28b-n are communicated via only one of the communication lines 38. The other functions and operations are similar to those shown in FIG. 17.

In the embodiment shown in FIG. 19, the digital data are sent from the sensor units 28b-1 through 28b-n, and the time standard signals for synchronization and the standard time data from the merging unit 39-2 are transmitted through the same point-to-point communication lines 38. Thus, using the serial communication lines for the communication lines 38, the volume of the cables can be reduced compared to the embodiment shown in FIG. 17.

In this embodiment, the data transmission on the communication lines 38 is bilateral such as so called half-duplex communication. When serial medium is used for half-duplex communication, data communication must be arbitrated in order to evade collisions of sent and received data.

In this embodiment, the time standard signals for synchronization and the standard time data must be sent just on time without any delay from the merging unit 39-2 to the sensor units 28b-1 through 28b-n in order for the sensor units 28b-1 through 28b-n to perform sampling synchronization and adding time data to the electric values of the substation main-circuit components.

Therefore, the merging unit 39-2 must have the priority for sending and receiving on the communication lines 38. Suppose the merging unit 39-2 be a master and the sensor units 28b-1 through 28b-n be slaves, the master polls or asks the slaves if the slaves have requests for sending signals. When the master can receive signals, the master sends an allowance signal to allow the slave to send signals to the master, then the master goes into a waiting status.

When the slave has received the allowance signal, the slave has obtained the right to send signals, and the slave sends the digital values of the electric values of the substation main-circuit components to the master serially. The master can send data to the slaves at any time except when the master is in a waiting status. Thus, the merging unit 39-2 can send the time standard signals for synchronization and the standard time data to the sensor units 28b-1 through 28b-n without delay, and the merging unit 39-2 can poll the sensor units 28b-1 through 28b-n during blank times periodically to receive the digital data of the electric values of the substation main-circuit components from the sensor units 28b-1 through 28b-n.

When the GPS receiver 41 is used, the time standard signals for synchronization and the standard time data of 1 second period would be sufficient. This period would be sufficiently long compared to the sampling periods (for example, frequency of 2,400 or 2,880 Hz, or electric angle of 7.5 degrees) of the electric values of the substation main-circuit components by the sensor units 28b-1 through 28b-n, and the merging unit 39-2 can receive the digital data of the electric values without any difficulty.

Alternatively, the sensor units 28b-1 through 28b-n may have dual port memories as interfaces and may access to the memories in its own units, while the merging unit 39-2 of the master side may use the communication lines 38 exclusively and read the data on the memory. Thus, the digital data of the electric values of the substation main-circuit components may be read out.

Alternatively, the merging unit 39-2 may send the time standard signals for synchronization and the standard time data to the sensor units 28b-1 through 28b-n, and the sensor units 28b-1 through 28b-n may use the time standard signals for synchronization as interrupting signals and may process the standard time data serially.

This method can be performed by allowing the master or the merging unit 39-2 to use the communication lines exclusively for sending and receiving. The merging unit 39-2 shown in FIG. 19 can be constructed as shown in FIG. 20.

The merging unit 39-2 shown in FIG. 20 is different from that shown in FIG. 18 in the feature that the standard time distributing means 39c-1 does not have point-to-point communication lines 40 and that the time standard signals for synchronization and the standard time data are sent within the merging unit 39-2 to the sensor unit merging means 39e-1 via the transmission line 40-1. The sensor unit merging means 39e-1 may have the communication arbitration function.

Figure 21:
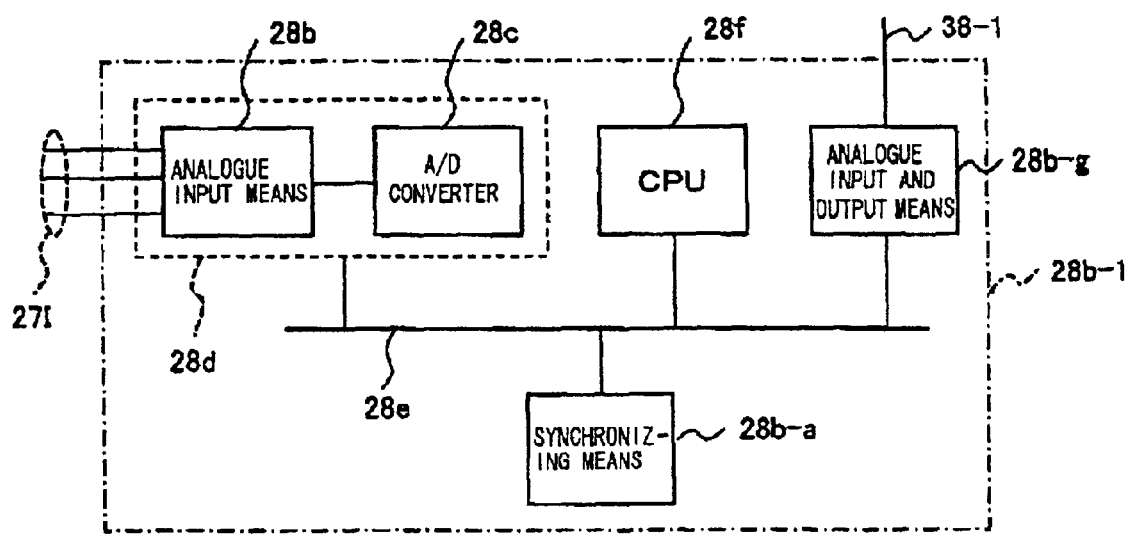
FIG. 21 is a schematic block diagram of the sensor unit shown in FIG. 19.

An example of the construction of the sensor unit 28b-1 representing the sensors 28b-1 through 28-n is shown in FIG. 21. Compared to the construction shown in FIG. 3A, in this construction, the point-to-point communication lines 40a through which the standard time signals for synchronization and the standard time data might be sent has been eliminated. Instead, input and output means 28b-g is used for half-duplex serial communication through the communication line 38-1. The electric power supply is not shown in FIG. 21. Sampling synchronization and time data adding are controlled through the internal bus 28e between the sampling synchronization input circuit 28d, the synchronizing means 28b-a and the CPU 28f.

According to the two examples of the seventh embodiment shown in FIGS. 17 and 19, analogue input can be synchronized, and protecting relay processing can be performed which requires high precision, in the present invention construction where the analogue input circuit is separated from the main-circuit control unit and the protecting unit. Besides, most stable synchronization and time adding can be performed, because synchronization and time adding are performed by the sensor units with analogue input circuits.

In addition, since the synchronized and time-added data are processed in the sensor units, time delay for a certain range would be allowed between the merging unit and the protecting-and-controlling unit. Therefore, the commonly used network such as Ethernet, where communication speed would be affected by the traffic status, can be used for the process bus 29. Thus, modification (extension, for example) of the facility on the process level or on the bay level would become easier.

By using the GPS data as a standard data in a substation or in a group of substations, the same time data and the same standard time signals can be used in the substation or substations. Thus, synchronization and time adding can be performed precisely and easily.

In this embodiment, the GPS data are used for synchronization and time adding as the common standard signals in the sixth embodiment shown in FIG. 16. It is to be understood that standard signals and a time generator can be used for common standard signals instead of the GPS data.

Furthermore, the communication lines between the merging unit and the sensor units can be alternatively common serial cables using half-duplex serial communication. In such a case, the volume of the communication cable can be reduced in half compared to the so-called full-duplex communication where sending and receiving of signals are separated. Thus, the cost and cable installation space are reduced.

It is to be understood that the way of synchronization and time adding of this embodiment described above can be applied to any other embodiments of the present invention.

Modification of the Seventh Embodiment

A modification of the seventh embodiment described above is now discussed. The system composition and merging unit compositions are similar to those of the seventh embodiment described above, except for the function distribution of the sampling synchronization and time adding of the electric values of the substation main-circuit components among the merging unit 39 and the sensor units 28-1 through 28-n.

This embodiment corresponds to Pattern 2 shown in FIG. 3C as noted before. Only standard signals for synchronization are sent from the merging unit 39 to the sensor units 28-1 through 28-n via the communication lines 40 (See FIG. 17, for example). An example of the standard signal for synchronization is a signal "SPT" shown in FIG. 28 which will be described in detail later. The signal "SPT" is based on a curve "WV1" also shown in FIG. 28 and will be described in detail later.

The sensor units 28-1 through 28-n perform only the sampling synchronization steps S2 and S3 shown in FIG. 3B. The sensor units 28-1 through 28-n send synchronized digital data of AC electric values (currents and voltages) of the substation main-circuit component to the merging unit 39. Then, the merging unit 39 performs the time adding Step S4 shown in FIG. 3B.

The protecting-and-controlling unit 23, which is connected to the merging unit 39 via the process bus 29, receives sampling-synchronized and time-added electric values (digital values) from the merging unit 39, and monitors, controls and protects the substation main-circuit component.

In this modification of the seventh embodiment, the point-to-point communication lines 40 between the merging unit 39 and the sensor units 28-1 through 28-n may be alternatively eliminated and all the data may be exchanged through the communication lines 38 of FIG. 19 using the common communication medium (serial bus) instead.

According to this modification of the seventh embodiment, analogue input can be synchronized although the analogue input circuit is separated from the main-circuit control unit and the protecting unit. Thus, protecting relay process which requires high precision can be performed. Since the sensor units with analogue input circuits perform sampling synchronization, stable sampling period would be maintained.

Time adding is performed in the merging unit, and a certain range of time delay may be allowed between the merging unit and the protecting-and-controlling unit. Therefore, communication network for general use where communication speed may be affected by the traffic status, such as Ethernet, can be used for the process bus 29. Then the facility modification including expansion on the process level or on the bay level would be easy. In addition, since time adding is not needed in the numerous sensor units, the process load in the sensor units and the volume of the data transmitted to the merging unit can be remarkably reduced.

Furthermore, since the GPS data are used for standard time signals in a substation or in a group of substations, the same time and the same standard signals can be used, and precise synchronization can be performed in a substation or in a group of substations.

In this embodiment, the GPS data are used for synchronization and time adding as the common standard signals. However, it is to be understood that standard signals and a time generator can be used for a common standard signals instead of the GPS data in a substation or in a group of substations.

Furthermore, the communication lines between the merging unit and the sensor units can be alternatively common serial cables using half-duplex serial communication. In such a case, the volume of the communication cable can be reduced in half compared to the so-called full-duplex communication where sending and receiving of signals are separated. Thus, the cost and cable installation space are reduced.

It is to be understood that the way of synchronization and time adding of this embodiment described above can be applied to any other embodiments of the present invention.

Eighth Embodiment

Figure 22:
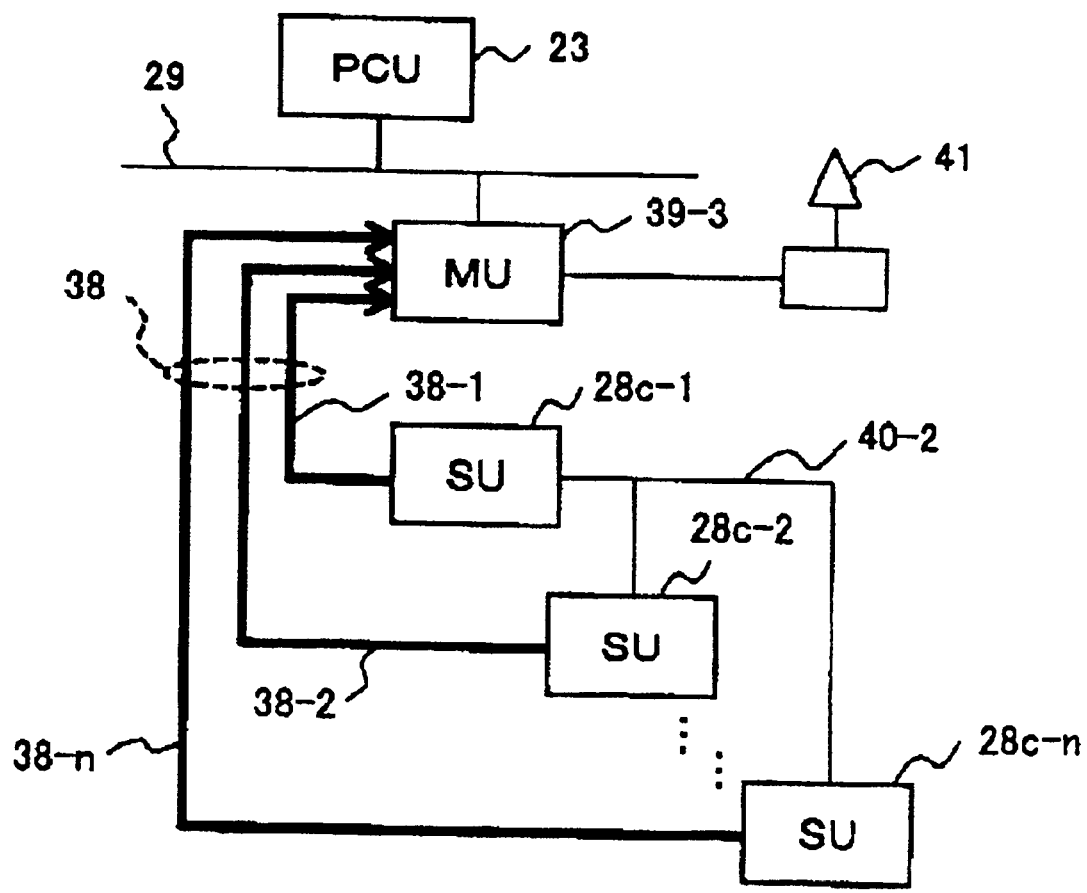
FIG. 22 is a schematic block diagram showing the structure and operation of a merging unit and sensor units of an eighth embodiment of a system for protecting and controlling substation main-circuit components according to the present invention.

An eighth embodiment of a system for protecting and controlling substation main-circuit components according to the present invention is now described with reference to FIG. 22. FIG. 22 is a block diagram of the eighth embodiment, showing the connecting relations between the merging unit and the sensor units. The protecting-and-controlling unit 23, the merging unit (MU) 39-3 and the sensor units (SUs) 28c-1 through 28c-n are similar to the corresponding units of the embodiments described above.

Sampling synchronization and time data adding are now discussed in detail. This embodiment corresponds to Pattern 2 shown in FIG. 3C as noted before.

As shown in FIG. 22, the point-to-point communication lines 40 (See FIGS. 17 and 18) have been eliminated through which the standard signals for synchronization and the time data might be sent from the merging unit 39-3 to the sensor units 28c-1 through 28c-n. Instead, one of the sensor units (the sensor unit 28c-1, for example) distributes the standard signals for synchronization to the other sensor units 28c-2 through 28c-n via a common communication line 40-2.

All the sensor units 28c-1 through 28c-n shear the same standard signals for synchronization (pulse signals with constant period, for example). Then, the synchronizing means 28a shown in FIG. 3A performs Steps S2 and S3 shown in FIG. 3B, using the sampling signals generated by frequency division of oscillating frequency of the clocks disposed in the sensor units. At that time, the communication line 40-2 is used instead of the communication line 40a shown in FIG. 3A. An example of the standard signal for synchronization is shown as a signal "SPT" shown in FIG. 28 and explained in detail later.

The process in the merging unit 39-3 is the same as the time adding Step S4 shown in FIG. 3B. The construction of the merging unit 39-3 is similar to the merging unit 39-2 shown in FIG. 20 except that the communication lines 40-1, the standard signal distribution means 39c-1 and the transmission line 39g have been eliminated, and the internal bus 39f and the standard signal input means 39d are connected each other.

The standard signals for synchronization and the standard time data are picked up from the signals inputted from the GPS receiver 41 processed by the CPU 39b. An example of the signal inputted from the standard signal input means is shown as a signal "WV1" in FIG. 28 which will be described in detail later. The CPU 39b then receives the synchronized digital data of the substation main-circuit AC electric values, and adds time data to the digital data. The method for adding time data is depicted as Step S4 in FIG. 3B. Thus, the sampling synchronization is performed in the sensor units 28c-1 through 28c-n and time adding is performed in the merging unit 39-3.

The protecting-and-controlling unit 23, which is connected to the merging unit 39-3 via the process bus 29, receives the sampled and time-added digital data of the substation main-circuit AC electric values from the merging unit 39-3, and monitors, controls and protects the substation main-circuit components.

In the example described above, the standard signals for sampling synchronization are distributed by one of the sensor units to the other sensor units. However, alternatively, a common signal generator may be introduced in a substation or in a group of substations for sending standard signals for synchronization to the sensor units. It is to be understood that the common signal generator may be a GPS receiver.

According to the present embodiment, analogue input can be synchronized although the analogue input circuit is separated from the main-circuit control unit and the protecting unit. Thus, protecting relay process which requires high precision can be performed. In addition, since the sensor units with analogue input circuits perform sampling synchronization, stable sampling period would be maintained.

Since time addition is performed in the merging unit, time delay for a certain range would be allowed between the merging unit and the protecting-and-controlling unit. Therefore, the commonly used network such as Ethernet, where communication speed would be affected by the traffic status, can be used for the process bus 29. Thus, modification (extension, for example) of the facility on the process level or on the bay level would become easier.

Since the time adding is not needed in the numerous sensor units, the process load in the sensor units and the volume of the data transmitted to the merging unit can be remarkably reduced.

Since the dedicated communication means for distributing the signals required for sampling synchronization from the merging unit to the sensor units becomes unnecessary, many dedicated cables between the sensor units and the merging unit can be reduced.

With this embodiment, as with the seventh embodiment, the time adding in the merging unit is performed using the GPS data as a standard data in a substation or in a group of substations, the same time data and the same standard time signals can be used in the substation or substations. Thus, synchronization and time adding can be performed precisely and easily.

In this embodiment, the GPS data are used for synchronization and time adding as the common standard signals. However, it is to be understood that standard signals and a time generator can be used for a common standard signals for this system or for a group of substations instead of the GPS data.

It is to be understood that the way of synchronization and time adding by the merging unit and the sensor units of this embodiment described above can be applied to any other embodiments of the present invention.

Ninth Embodiment

Figure 23:
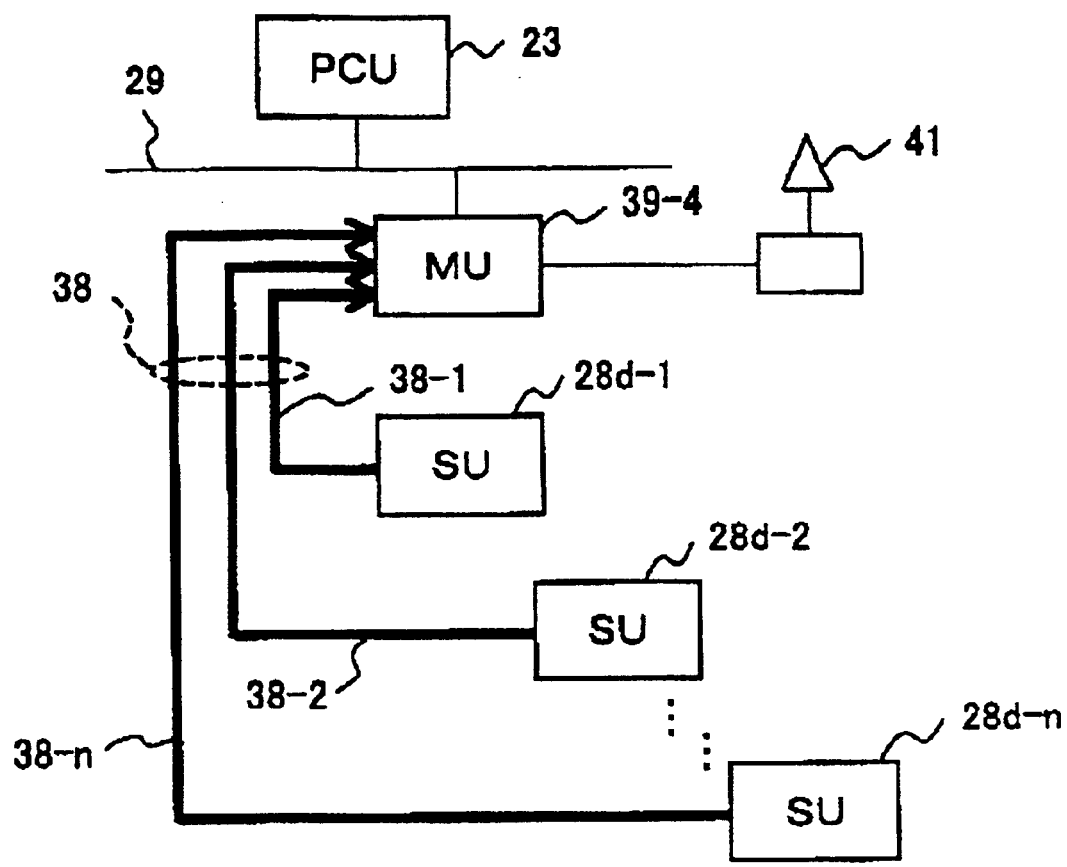
FIG. 23 is a schematic block diagram showing the structure and operation of a merging unit and sensor units of a ninth embodiment of a system for protecting and controlling substation main-circuit components according to the present invention.

A ninth embodiment of a system for protecting and controlling substation main-circuit components according to the present invention is now described with reference to FIGS. 23 through 26. FIG. 23 is a block diagram of the ninth embodiment, showing the connecting relations between the merging unit and the sensor units. The protecting-and-controlling unit 23, the merging unit (MU) 39-4 and the sensor units (SUs) 28d-1 through 28d-n are similar to the corresponding units of the embodiments described above.

Compared to the embodiment shown in FIG. 22, the transmission line 40-2 for sending standard signals for synchronization between the sensors has been eliminated as shown in FIG. 23, The construction of the merging unit 39-4 is shown in FIG. 24, for example. Compared to the merging unit 39-2 shown in FIG. 20, the merging unit 39-4 of this embodiment shown in FIG. 24 has a synchronizing means 39h which is connected to the CPU 39b via the internal bus 39f. In this embodiment, both the sampling synchronization and the time adding are performed in the merging unit 39-4. This embodiment corresponds to Pattern 1 shown in FIG. 3C as noted before.

Thus, the n sensor units 28d-1 through 28d-n are not required to be synchronized each other, The sensor units 28d-1 through 28d-n sample the analogue data of the electric values, convert them to digital data, and send the digital data to the merging unit 39-4 via the point-to-point communication lines 38.

The synchronizing means 28a and the CPU 28f shown in FIG. 3A can be eliminated in the sensor units 28d-1 through 28d-n of this embodiment, because the sensor units 28d-1 through 28d-n are required only to send the digitized data of the substation main-circuit component. Thus, the hardware construction of the sensor units may be remarkably simplified. The CPU 28f with minimum controlling function may be optionally introduced for controlling the sampling synchronizing input circuit 28d and the output means 28g, although high-precision LSI for controlling is not required.

Now, methods for sampling synchronization and time adding in the merging unit 39-4 are described below.

In a first method, standard signals for synchronization are added to the sampled digitized data of the electric values of one of the sensor units 28d-1 through 28d-n and sent to the point-to-point communication lines 38. Then, the digital outputs of the sensor units 28d-1 through 28d-n are adjusted for synchronization based on the standard signals for synchronization.

The merging unit 39-4 receives the standard signals in place of synchronization, and uses the standard signals for the standard signals for synchronization in Steps S2 and S3 shown in FIG. 3B in synchronizing the digital data from the sensor units 28d-1 through 28d-n. It is to be understood that the standard signals for synchronization picked up from the GPS may be used in Step S4.

An example of the standard signal for synchronization and the standard time signal received by the merging unit 39-4 via the GPS receiver is shown as a signal "WV1" in FIG. 28 which will be described in detail later. Since the digital data sampled in the sensor units are not synchronized, the interpolation process S1 shown in FIG. 3B may be performed if necessary.

The first method described above is characterized in adding standard signals for synchronization to the digital data of the electric values transmitted from the sensor units 28d-1 through 28d-n to the merging unit 39-4. The standard signals for synchronization may be sine waves or rectangular waves, for example, with an arbitrary frequency.

A particular example of the standard signals for synchronization may be the basic wave corresponding to the analogue electric values of the current or voltage of the substation main-circuit components as follows:

A port for a channel dedicated for inputting the basic wave is added to the analogue input means 28b shown in FIG. 3A. This basic wave is processed in the sampling synchronization input circuit 28d and sent to the point-to-point communication lines 38 through the output means 28g, similarly as the other analogue electric values. In this embodiment, the synchronizing means 28a shown in FIG. 3A may be eliminated.

Figure 25:
FIG. 25 is a schematic time chart showing the structure of the output data of the sensor units shown in FIG. 23.

When the point-to-point communication lines are connected in serial links, a series of digital data of each channel (CH1 through CHn) may be outputted as shown in FIG. 25. The n-th channel CHn may be the channel for the basic wave. The merging unit 39-4 receives those data and performs synchronization of the digital electric values of the all channels from the sensor units 28d-1 through 28d-n using the basic wave as the standard.

Figure 26:
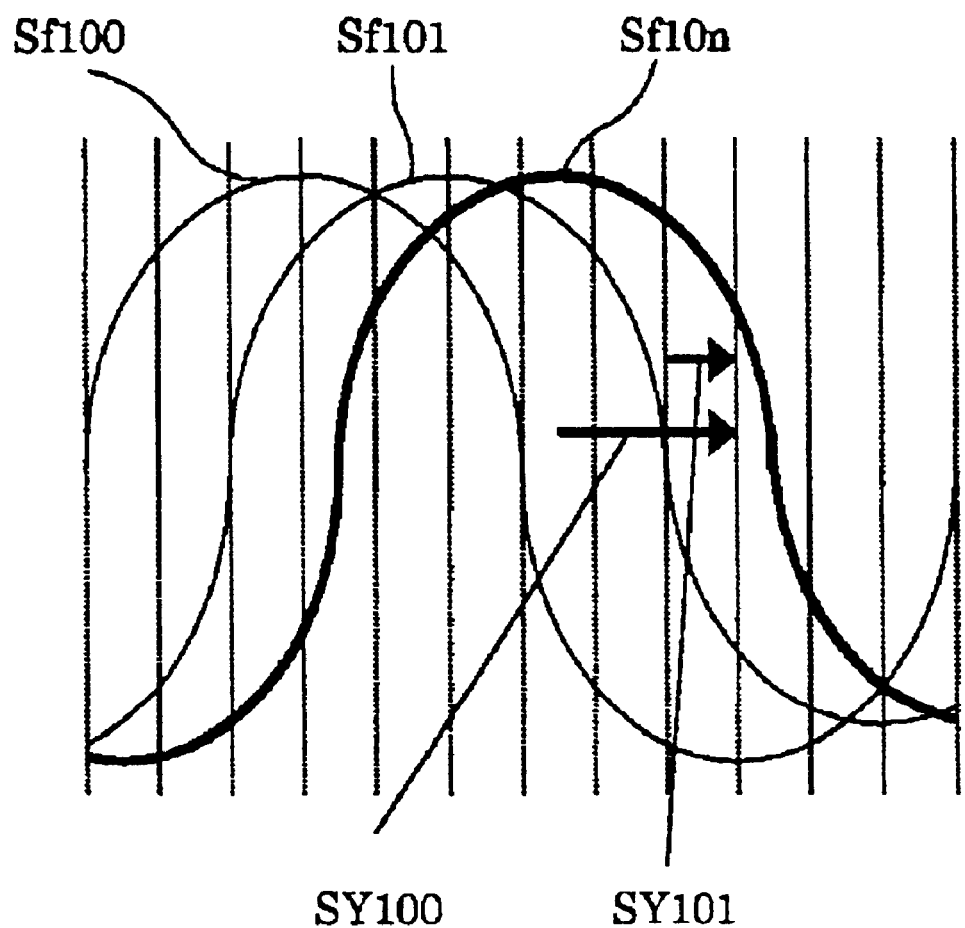
FIG. 26 is a time chart of the output of the sensor units shown in FIG. 23.

FIG. 26 shows the waves of the electric values of the channels of the merging unit 39-4 received from the sensor units. The wave form Sf100 shows an electric value on a channel of the sensor unit 28d-1, the wave form Sf101 shows an electric value on a channel of the sensor unit 28d-2, and the wave form Sf10n shows an electric value (the standard signal for synchronization) on the basic wave channel of the sensor unit 28d-n.

The electric value data of the wave forms Sf100 and Sf101 are adjusted by adjusting the phases of the wave forms Sf100 and Sf101 to match the phase of the wave form Sf10n of the standard signal for synchronization. Arrows SY100 and SY101 of FIG. 26 show phase-shift adjustments of the wave forms Sf100 and Sf101, respectively. Then, the adjusted electric values are added time data in Step S4 shown in FIG. 3B.

In the first method described above, the standard signals for synchronization are added by a particular sensor unit.

The standard signals for synchronization can be added by a plurality of sensor units. In that case, even if the particular sensor unit had a failure, the standard signal for synchronization of the other sensor unit can be used for re-adjustment in phase.

In a second method, the wave form of electric value with largest phase delay may be chosen as a standard, and the other electric values are adjusted in phase to match the standard. Then, the sampling synchronization is performed in the examples described above, and time adding is performed in Step S4 of FIG. 3B based on the standard signal for synchronization and the standard time data which may have been picked up from the GPS signals.

The protecting-and-controlling unit 23, which is connected to the merging unit 39-4 via the process bus 29, receives the sampled and synchronized electric digital values with the time data, and monitors, controls, and protects the substation main-circuit components.

According to the present embodiment, analogue input can be synchronized although the analogue input circuit is separated from the main-circuit control unit and the protecting unit. Thus, protecting relay process which requires high precision can be performed.

Since time addition is performed in the merging unit, time delay for a certain range would be allowed between the merging unit and the protecting-and-controlling unit. Therefore, the commonly used network such as Ethernet, where communication speed would be affected by the traffic status, can be used for the process bus 29. Thus, modification (extension, for example) of the facility on the process level or on the bay level would become easier.

Since sampling synchronization is performed in the merging unit, the circuits for sampling synchronization and CPUs for high speed processing can be eliminated from the sensor units. Thus, the hardware volume of the sensor units can be reduced with remained means for analogue-to-digital converting and for sending out the digital data to the merging unit.

Since each one of the protecting-and-controlling unit or the merging unit are typically connected to a number of sensor units, the reduction in hardware volume of the sensor units may result in remarkable reduction in system failure rate and total cost.

In addition, since the numerous sensor units do not perform time adding, the process load of the sensor units and the volume of transmission to the merging unit can be reduced. In addition, with this embodiment, the GPS data is used as a standard data in a substation or in a group of substations, the same time data and the same standard time signals can be used in the substation or substations. Thus, synchronization and time adding can be performed precisely and easily.

In this embodiment, the GPS data are used for synchronization and time adding as the common standard signals. However, it is to be understood that standard signals and a time generator can be used for a common standard signals for this system or for a group of substations instead of the GPS data.

It is to be understood that the way of synchronization and time adding by the merging unit and the sensor units of this embodiment described above can be applied to any other embodiments of the present invention.

Tenth Embodiment

Figure 27:
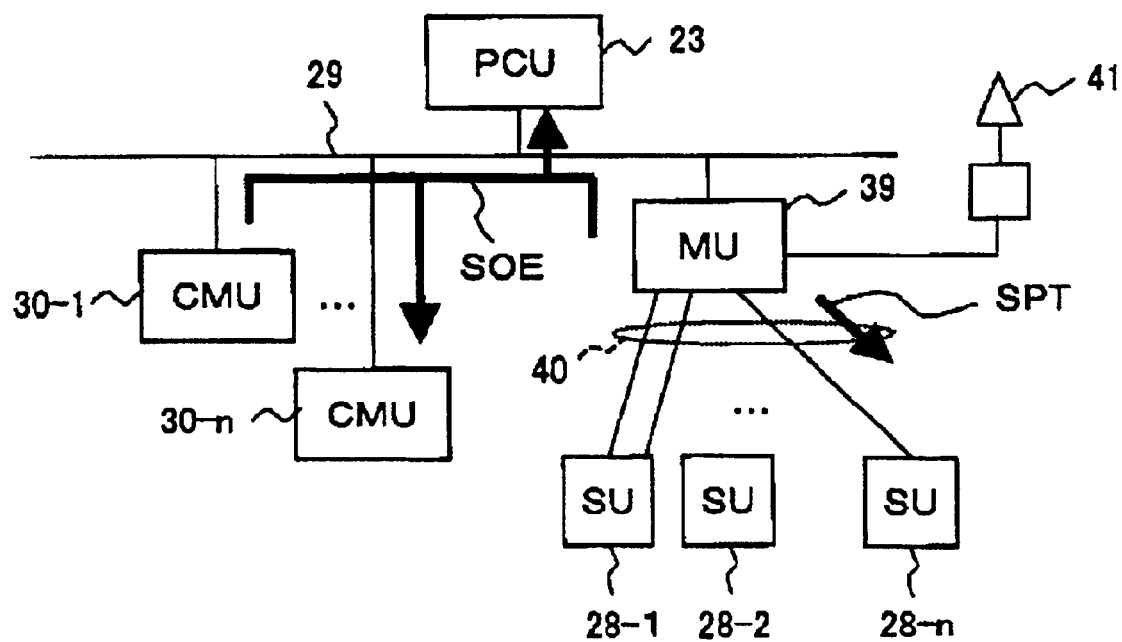
FIG. 27 is a schematic block diagram of a main part of a tenth embodiment of a system for protecting and controlling substation main-circuit components according to the present invention.

A tenth embodiment of a system for protecting and controlling substation main-circuit components according to the present invention is now described with reference to FIGS. 27 and 28. FIG. 27 is a block diagram of the tenth embodiment. The protecting-and-controlling unit 23, the merging unit (MU) 39, the sensor units (SUs) 28-1 through 28-n and the component controlling-and-monitoring units (CMUs) 30-1 through 30-n are similar to the corresponding units of the embodiments described above.

As shown in FIG. 27, the merging unit 39 receives the standard signals for synchronization from the GPS receiver 41, and distributes a signal "SPT" which is a signal for time synchronization of AC electric values of the substation main-circuit components and for high precision (microsecond order) time adding to the sensor units 28-1 through 28-n. The merging unit 39 also distributes a time-adding standard signal "SOE" from the standard signals of the GPS receiver 41 to the protecting-and-controlling unit 23 and the component controlling-and-monitoring units 30-1 through 30-n via the process bus 29. The signal "SOE" corresponds to state events of the substation main-circuit components.

The state events of the substation main-circuit components for a gas-insulated switchgear, for example, include gas pressure, temperature, oil pressure, open-close status or motion of switchgears, and failure of components (such as alarm of oil-pressure pumps). Although those events are included in the items for monitoring and controlling, those events or the state for monitoring and controlling may not require precise time adding compared to the protecting function where faults are diagnosed based on the electric values of the substation main-circuit components.

For the protecting function where faults are diagnosed, synchronization and time adding of the electric values typically requires precision of microsecond order. On the other hand, for the state events for monitoring and controlling of the substation main-circuit components (main component operating status, for example), lower precision of millisecond order may be sufficient. If the process bus 29 is bilateral such as a LAN, the communication time may fluctuate and a certain time period cannot be assured depending on the traffic status of the process bus 29, because the protecting-and-controlling unit 23, the merging unit 39 and the component controlling-and-monitoring unit 30-1 through 30-n are connected to the process bus 29. Therefore, bilateral process bus cannot be applied to the protecting function including the failure diagnosis requiring time data transmission of microsecond order, but can be applied to the state event transmission of millisecond order considering the delay and fluctuation of the transmission.

The signal "SOE", which is a standard signal for time adding of millisecond order, is sent from the merging unit 39 to the component controlling-and-monitoring unit 30-1 through 30-n via the process bus 29. The component controlling-and-monitoring unit 30-1 through 30-n add time data of the state events of the substation main-circuit components based on the standard signal "SOE".

FIG. 28 shows an example of correlation between the standard data for time synchronization and the time data. The standard signal WV1 transmitted from the GPS receiver 41 to the merging unit 39 may be a sum of a pulse signal with one-second intervals and a time data "TIME", for example. The pulse interval TI1 (from the trigger TP1 to TP1-1 as illustrated) is precisely 1(one) second, for example. Time data "TIME" such as the GPS absolute time are added between the intervals of the pulses. The merging unit 39 generates precise one-second interruptions based on the standard signal "WV1", and picks up the time serial data "TIME".

In the seventh embodiment described above, the standard signal "WV1" itself may be distributed to the sensor units 28-1 through 28-n, while in the modification of the seventh embodiment described above, only the high-precision one-second interruption signal (standard signal) "SPT" without its time data "TIME" may be distributed to the sensor units 28-1 through 28-n.

If the signals are transmitted from the merging unit 39 to the sensor units 28-1 through 28-n by point-to-point serial transmission lines, the standard signal "SPT" can be distributed in high speed with no collisions and with small fluctuations in distribution time.

In such a case, the time delay in serial communication (fixed time) TD2 (=TD2–1) is less than 1 microsecond and it is sufficiently short for time adding and for standard signals for sampling synchronization.

The standard signal "SOE" is now explained. If the process bus 29 is a duplex serial bus for packet transmission such as a LAN, the packet signal with time data "SOE" is distributed from the merging unit 39 to the component controlling-and-monitoring units 30-1 through 30-n at the times of "TP1" and "TP1–1".

Since packet data collisions may occur in packet transmission such as a LAN, the distribution time of the packets with time data "SOE" may have delay or fluctuation.

In such a case, the time delay in the distribution on the process bus 29 may cause the fluctuation of "TD3" which is the delay time of the receiving time of the packet "SOE1" from the time of "TP1". As shown in FIG. 28, "TD3–1" which is the delay time of the receiving time of the packet "SOE1–1" from the time of "TP1–1" may not equal to "TD3". If there are frequent data collisions, the "one-second" period "TI1" and the "one-second" period "TI3" received by the component controlling-and-monitoring units 30-1 through 30-n may deviate hundreds of microseconds. However such a level of precision deterioration may be allowable for adding time to the state events.

According to this embodiment, time adding on the state events can be performed even in a case where the process bus uses a duplex serial bus such as a LAN. In addition, when the time standard signals for the state events are distributed from the merging unit to a plurality of component controlling-and-monitoring units, a plurality of communication cables for distribution are not necessary to be installed. Thus, the state event can be time-added at low cost.

It is to be understood that the technique of distributing the standard signals for state events from the merging unit to the component controlling-and-monitoring units and of adding time in the component controlling-and-monitoring units, described above, can be applied to the merging units and the component controlling-and-monitoring units of the other embodiments.

Eleventh Embodiment

Figure 29:
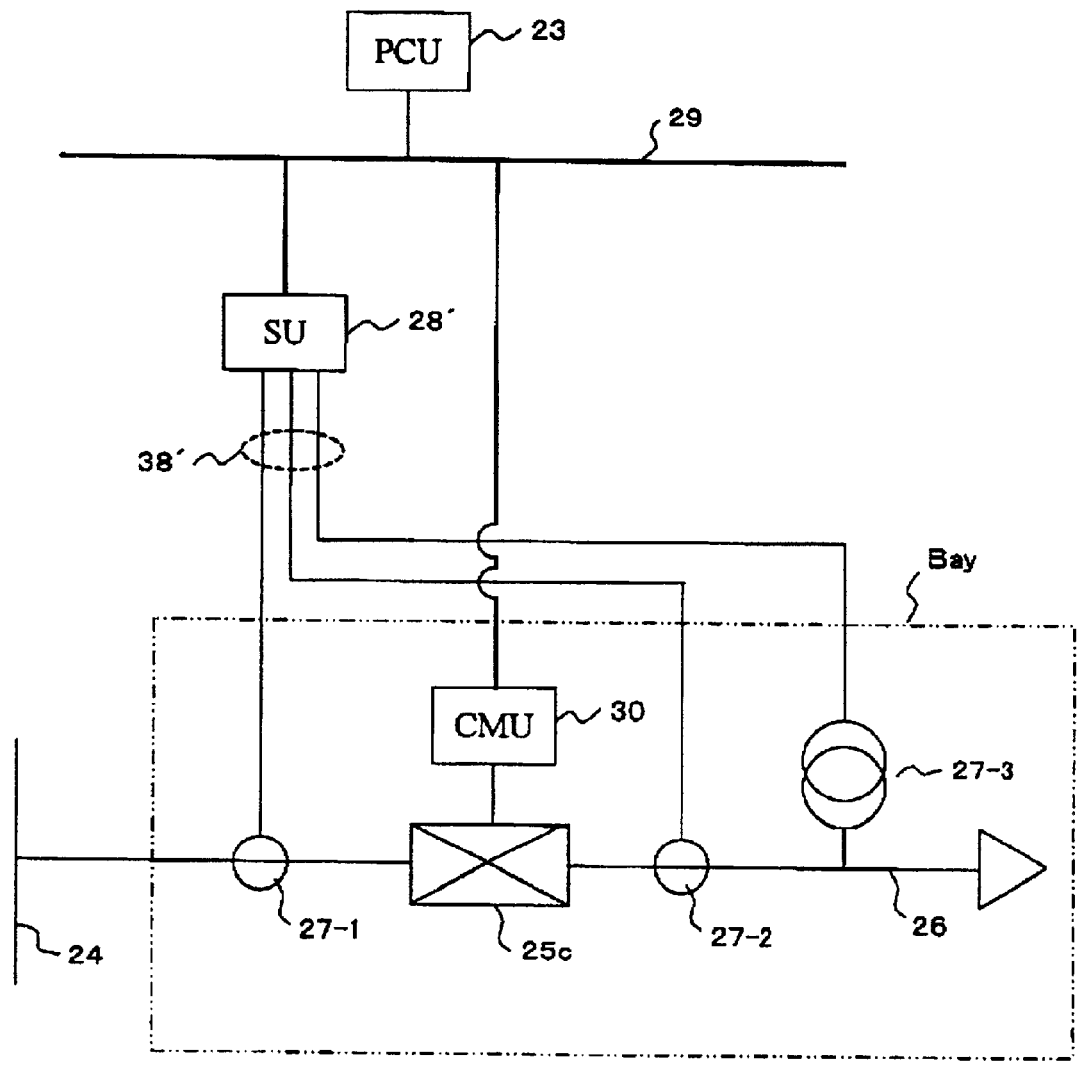
FIG. 29 is a schematic block diagram of a main part of an eleventh embodiment of a system for protecting and controlling substation main-circuit components according to the present invention.

An eleventh embodiment of a system for protecting and controlling substation main-circuit components according to the present invention is now described with reference to FIG. 29. FIG. 29 is a block diagram of the eleventh embodiment, especially showing relation between the substation main-circuit component and the sensor units. This embodiment is similar to the sixth embodiment shown in FIG. 16 except that the merging unit 39 for merging the outputs of a plurality of sensor units 28 has been eliminated and has a common sensor unit (SU) 28'. The common sensor unit (SU) 28' receives the analogue data from the current detecting means 27-1 and 27-2, and voltage detecting means 27-3 via the analogue circuit 38'. The common sensor unit (SU) 28' then converts the analogue data to digital data, and send them to the process bus 29.

The sensor unit 28' may be contained in the process control box 31 with the protecting-and-controlling unit 23, for example. Each of the current detecting means and the voltage detecting means are connected to the sensor unit 28' by the analogue circuits 38' as noted above. The sensor unit 28' is connected to the protecting-and-controlling unit 23 and the component controlling-and-monitoring unit 30 via the process bus 29.

Operation of the eleventh embodiment is now described. The outputs of the current detecting means 27-1 and 27-2 and voltage detecting means 27-3 are sent as analogue signals to the sensor unit 28' which is disposed near the protecting-and-controlling unit 23.

The sensor unit 28' converts the analogue electric signals of the currents and the voltage into digital values, and merges them into transmission frames corresponding to the zones of protection and control. The sensor unit 28' also adds time data to the merged data, and then sends them to the protecting-and-controlling unit 23 via the process bus 29. In addition, the digitized current and voltage information can be processed for sensitivity adjustment or phase adjustment by optionally incorporating an operational CPU in the sensor unit.

It is to be understood that the merging of data into a transmission frame in the sensor unit is not limited to the merging of data corresponding to a particular single zone of protection and control, as noted in the description of the sixth embodiment for merging data in the merging unit (MU).

According to the eleventh embodiment described above, following advantage is obtained:

This construction is preferably applied to cases where secondary outputs of current detecting means and voltage detecting means are comparatively large, such as a case where a current transformer with an iron-core coil is used, and relatively long distance transmission of analogue electric value can be realized without severe influence of noise. A single sensor unit may be typically sufficient for a bay-zone for protection and control in an electric power installation. More than one sensor units may be preferable for transformer circuits, for example.

According to this embodiment of the invention, the number of nodes can be minimized on the process bus which connects the sensor unit, the protecting-and-controlling unit and the component controlling-and-monitoring unit. Thus, the system will be less expensive compared to the system using the merging unit. Since a plurality of electric values in a bay are sent in a minimum number of transmission frames, the process bus is efficiently used as in the sixth embodiment.

Twelfth Embodiment

Figure 30:
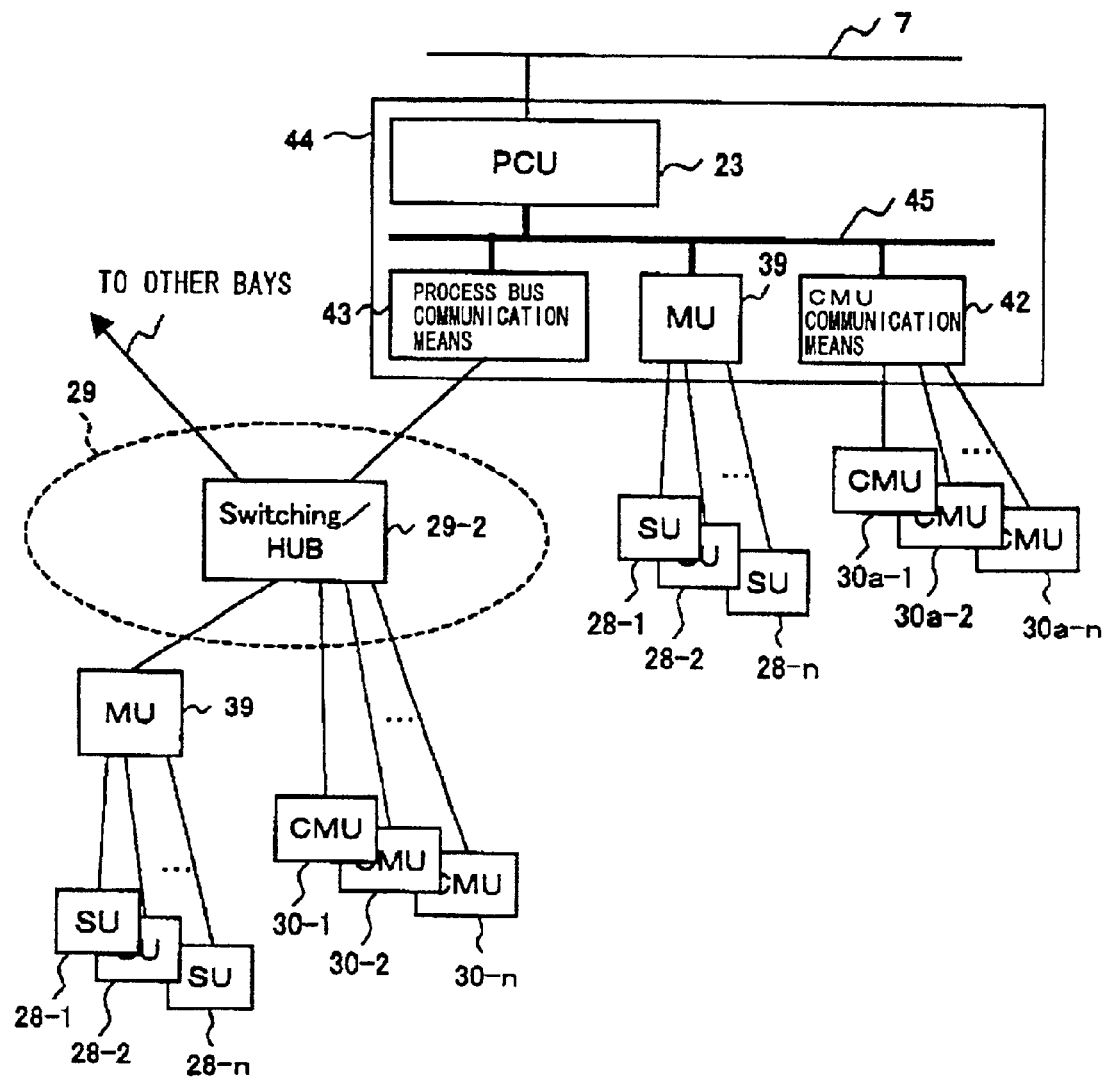
FIG. 30 is a schematic block diagram of a main part of a twelfth embodiment of a system for protecting and controlling substation main-circuit components according to the present invention.

A twelfth embodiment of a system for protecting and controlling substation main-circuit components according to the present invention is now described with reference to FIGS. 30 and 31. FIG. 30 is a block diagram of the twelfth embodiment. The protecting-and-controlling unit (PCU) 23 and the merging unit (MU) 39 are similar to the corresponding units of the above-described embodiments, and are formed in print circuit boards contained in a collective case 44. The collective case 44 also contains a component controlling-and-monitoring unit (CMU) communication means 42 and a process bus communication means 43 which are also formed in print circuit boards. Those print circuit boards are connected to a parallel bus (also called "internal bus") 45 disposed at the back in the collective case 44 as a backboard.

FIG. 31 is a perspective view of this embodiment with the print circuit boards of the protecting-and-controlling unit (PCU) 23, the merging unit (MU) 39, the component controlling-and-monitoring unit (CMU) communication means 42 and the process bus communication means 43, arranged in the collective case 44. The collective case 44 may be disposed in the process control box 31 (See FIG. 2), or alternatively, the process control box 31 itself may be used as the collective case 44.

Referring again to FIG. 30, the component controlling-and-monitoring unit (CMU) communication means 42 transmits upstream signals from the component controlling-and-monitoring unit (CMU) 30a-1 through 30a-n to the protecting-and-controlling unit (PCU) 23, and downstream signals from the protecting-and-controlling unit 23 to the component controlling-and-monitoring unit (CMU) 30a-1 through 30a-n. The upstream signals are the component controlling-and-monitoring data such as electric value data of the system which is controlled and monitored by the component controlling-and-monitoring unit, the operation status data of the controlled and monitored components, and output signals of the sensors attached to the controlled and monitored components. The downstream signals are the control signals such as circuit trip commands for the circuit breakers.

The merging unit (MU) 39 merges the electric values from the sensor units (SUs) 28-1 through 28-n into transmission frames corresponding to the bay-zones of protection and control within an electric power installation, for example. The merging unit 39 then sends the merged data to the parallel bus 45.

The process bus communication means 43 connects the communication between the parallel bus 45 and the process bus 29, and converts the protocols. In addition, the process bus communication means 43 may be optionally connected to the merging unit 39 and the component controlling-and-monitoring unit 30-1 through 30-n at the lower level, via a bus arbitration unit such as a switching hub, if necessary. Furthermore, the process bus communication means 43 may be connected to merging units, component controlling-and-monitoring units or protecting-and-controlling units of the other bay (not shown). When the power bus line protection is performed, electric values of the other bays are necessary, and the data is transmitted between the bays via the process bus 29.

The addresses, which are required to be designated for transmitting data to and from the protecting-and-controlling units, the merging units, the component controlling-and-monitoring units, etc., can be designated by the flag bits of the transmitted data. The transmission to and from the component controlling-and-monitoring units 30a-1 through 30a-n is controlled by the component controlling-and-monitoring unit communication means 42.

As described above, according to this embodiment of the present invention, the protecting-and-controlling unit (PCU) 23, the merging unit (MU) 39, the component controlling-and-monitoring unit communication means 42 and the process bus communication means 43 are contained in the collective case 44, and they are connected to the parallel bus 45 by the backboard in the collective case 44. Then, the construction of the process bus system can be designed contained in a compact collective case 44, and it will be easy to obtain space for installing the collective case 44. Thus, the collective case 44 can be attached to the substation main-circuit component or installed near the substation main-circuit component.

In addition, if the protecting-and-controlling unit 23, the merging unit 39 the component controlling-and-monitoring unit communication means 42 and the process bus communication means 43 are formed in print circuit boards, the system can be easily repaired by replacing the boards when the boards have a failure. If a plurality of unit functions are loaded in a same board, the number of boards and the number of circuit parts can be reduced, which might result in reduction in failure rates, cost and the size of the system.

Furthermore, when the protecting-and-controlling unit (PCU) 23 receives the digital data from the merging unit (MU) 39 for monitoring, controlling and protecting, only the parallel bus 45 but not the process bus 29 is used, because the protecting-and-controlling unit 23, the merging unit 39, the component controlling-and-monitoring unit communication means 42 and the process bus communication means 43 are connected to the parallel bus 45. Thus, the communication traffic load on the process bus 29 can be remarkably reduced.

If a process bus (bilateral bus such as CSMA/CD (Carrier-Sense Multiple-Access with Collision Detection)-type LAN serial transmission system) were used for communication between the merging unit 39 and the protecting-and-controlling unit 23, instead of the parallel bus, the process bus traffic load might become excessively heavy. In such a case, the circuit breaker could not be tripped within a specified time period due to excessively heavy traffic load of the process bus, when the protecting-and-controlling unit 23 sends out a circuit breaker trip command to the component controlling-and-monitoring unit via the process bus 29 in response to a failure in the substation main-circuit component.

According to the present embodiment of this invention, the protecting-and-controlling unit 23 and the component controlling-and-monitoring unit 30-1 through 30-n are communicated via the parallel bus 45 and the component controlling-and-monitoring unit communication means 42, instead of the process bus 29. Thus, real time communication is secured especially for required communication protection functions, such as of circuit breaker trip commands.

The component controlling-and-monitoring unit communication means 42 and the component controlling-and-monitoring units 30-1 through 30-n may be connected with point-to-point lines, for example, and data collisions among the component controlling-and-monitoring unit 30-1 through 30-n may be evaded. The volume of the cables can be reduced by using serial links for these connections.

In the embodiment described above, it may not be necessary to have all of the process bus communication means 43, the merging unit (MU) 39 and the component controlling-and-monitoring unit communication means 42 in the collective case 44. For example, the merging unit (MU) 39, the process bus communication means 43 or the component controlling-and-monitoring unit communication means 42 may be eliminated.

Furthermore, in the embodiment described above, the units or print circuit boards of the protecting-and-controlling unit, the merging unit, the component controlling-and-monitoring unit communication means and the process bus communication means are connected to the internal parallel bus (such as backboard or cables) 45. However, the parallel bus connection may be in electric or electronic circuit levels instead of unit levels.

Furthermore, each one of the protecting-and-controlling unit 23, the merging unit 39, the component controlling-and-monitoring unit communication means 42 and the process bus communication means 43 can be formed in a single print circuit board (unit). However, any combinations of the units or functions, or portions of the units or functions can be formed in the print circuit boards.

It is to be understood that the method of communication using the parallel bus of this embodiment described above can be applied to any other embodiments of the present invention.

Thirteenth Embodiment

Figure 32:
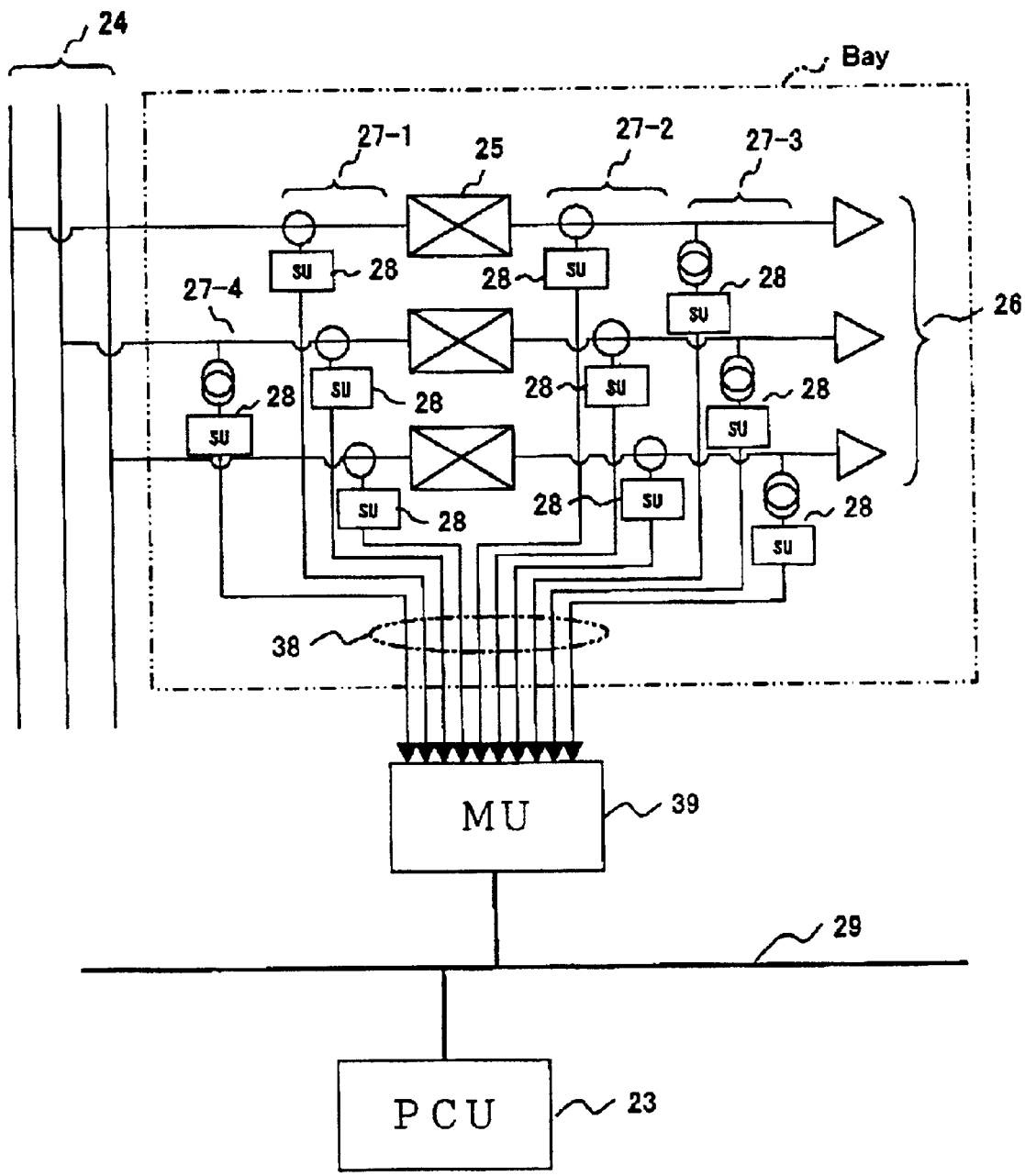
FIG. 32 is a schematic block diagram of a main part of a thirteenth embodiment of a system for protecting and controlling substation main-circuit components according to the present invention.

A thirteenth embodiment of a system for protecting and controlling substation main-circuit components according to the present invention is now described with reference to FIG. 32. FIG. 32 shows main part of the thirteenth embodiment. The station bus 7, the remote controlling-and-monitoring equipment 2 and the collective controlling-and-monitoring equipment 3 (See FIG. 1, for example) are not shown here.

Referring to FIG. 32, "Bay" is a bay zone of protection and control within a certain electric power installation. The electric power installation shown in FIG. 32 has a single busbar scheme, which is shown in a three-phase diagram. The electric power transmission lines 26 are branched from the bus lines 24 via circuit breakers (CBs) 25 and disconnecting/earthening switches (not shown).

At the bus line 24 side of the circuit breaker 25, at least one core of current detecting means 27-1 for each phase, and at least one core of voltage detecting means 27-4 for one phase are disposed. At the electric power transmission line side of the circuit breaker 25, at least one core of current detecting means 27-2 and at least one core of voltage detecting means 27-3 for each phase are disposed.

The sensor units 28 are disposed near the corresponding current or voltage detecting means, and the sensor units 28 and the merging unit 39 are connected with point-to-point communication means 38. They are typically connected by optical fibers for noise resistance capability. The merging unit 39, the protecting-and-controlling unit 23 and the component controlling-and-monitoring unit (not shown) are connected to the process bus 29.

Furthermore, an integrated unit may be optionally introduced which may include a protecting-and-controlling unit, a merging unit and a component controlling-and-monitoring unit communication means connected each other via parallel transmission lines. Then, the outputs of the current and voltage detecting means may be received at a merging unit in the integrated unit.

Alternatively, the merging unit may be eliminated, and the outputs of the current and voltage detecting means may be received in a single sensor unit. Then, the sensor unit, the protecting-and-controlling unit and the component controlling-and-monitoring unit may be connected by a process bus.

Furthermore, another integrated unit may be optionally introduced which may include a protecting-and-controlling unit, a sensor unit and component controlling-and-monitoring unit communication means connected each other via parallel transmission lines. Then, the outputs of the current and voltage detecting means may be received at a sensor unit in the integrated unit, and the merging unit may not be used.

According to the thirteenth embodiment of the present invention described above, all the electric values required for line protection, for bus protection and for synchronous control switching of the circuit breakers can be obtained bay by bay, and those electric values can be transmitted to the component controlling-and-monitoring unit and the protecting-and-controlling unit via the process bus 29. Since busbar voltage can be measured bay by bay using the voltage detecting means disposed on the bus line side, the busbar voltage detecting means does not have to be distributed to each of the bays. For double busbar scheme electric power installation, it is not necessary that either of busbar voltages, such as Bus-A and Bus-B shown in FIG. 55, are selected and distributed to each of the bays.

Fourteenth Embodiment

Figure 33:
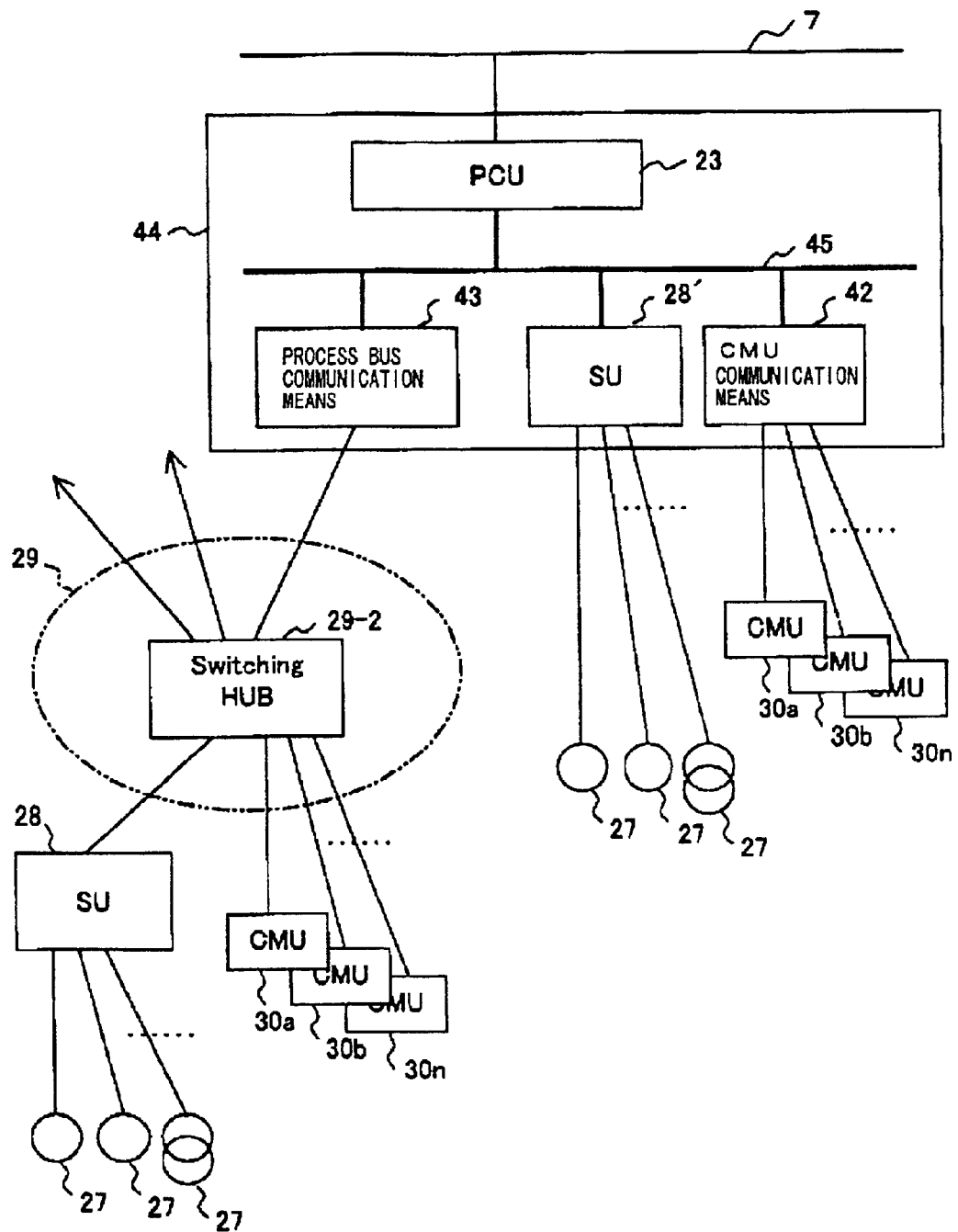
FIG. 33 is a schematic block diagram of a main part of a fourteenth embodiment of a system for protecting and controlling substation main-circuit components according to the present invention.

A fourteenth embodiment of a system for protecting and controlling substation main-circuit components according to the present invention is now described with reference to FIG. 33. As shown in FIG. 33, the fourteenth embodiment is similar to the twelfth embodiment shown in FIG. 30, except that the merging unit 39 has been replaced by the sensor unit 28' shown in FIG. 29, which is connected to the process bus 45.

Referring to FIG. 33, the protecting-and-controlling unit 23 for protecting and controlling the substation main-circuit component and the sensor unit 28' are contained in the collective case and connected to each other via the parallel bus 45. The component controlling-and-monitoring unit communication means 42 for communicating with the component controlling-and-monitoring units (CMUs) 30a through 30n, and the process bus communication means 43 for communicating with the process bus described in the description of the first embodiment are also contained in the collective case and connected to each other via the parallel bus 45.

The parallel bus 45 may be of any type of parallel bus such as VME (Versa Module Europa) bus, PCI (Peripheral Component Interconnect) bus or compact PCI bus, for example.

This construction is preferably applied to cases where secondary outputs of current detecting means and voltage detecting means are comparatively large and relatively long distance transmission of analogue electric value can be realized without severe influence of noise. A single sensor unit may be sufficient for a bay-zone for protection and control in an electric power installation. The merging unit may not be needed.

In addition, by the process bus connecting function, data can be exchanged with the protecting-and-controlling unit, the sensor unit and the component controlling-and-monitoring units through the process bus.

Fifteenth Embodiment

A fifteenth embodiment of a system for protecting and controlling substation main-circuit components according to the present invention is now described with reference to FIG. 34. Referring to FIG. 34, a repeater 46 is connected between the station bus 7 and the process bus 29 of each one of the main-circuit units 20-1 through 20-n. The merging unit 39 transmits data of the currents and the voltages to the process bus 29, and then, to the whole substation via the repeater 46.

The protecting-and-controlling unit 23 receives the data of the currents and the voltages from the process bus (internal bus) 29 and the station bus (inter-component bus) 7, and perform protection and control. When a circuit trip is needed, the protecting-and-controlling unit 23 sends a circuit trip command to the component controlling-and-monitoring unit 30, so that the circuit breaker is activated.

This embodiment of the present invention may be advantageously applied especially to cases when the substation main-circuit components are disposed far away from the control main building and the signals may have severe attenuation, because the signals transmitted from the process bus can be amplified by the repeaters.

Sixteenth Embodiment

A sixteenth embodiment of a system for protecting and controlling substation main-circuit components according to the present invention is now described with reference to FIG. 35. This embodiment shown in FIG. 35 is similar to the fifteenth embodiment shown in FIG. 34, except that the repeaters 46 of FIG. 34 have been replaced by routers 47 here. The routers 47 decide the destination of the communication data, based on the destination address of the communication data. Then, the routers 47 transmit the communication data to the network to which the destination device is connected.

Referring to FIG. 35, the merging unit 39 sends the data of the currents and voltages to the internal bus 29, and then to the whole substation. The router 47 does not send out the data which is related only to the specific component to the inter-component bus 7. Thus, only minimum required data are transmitted to the inter-component bus 7 and to the internal buses of the other components.

Seventeenth Embodiment

Figure 36:
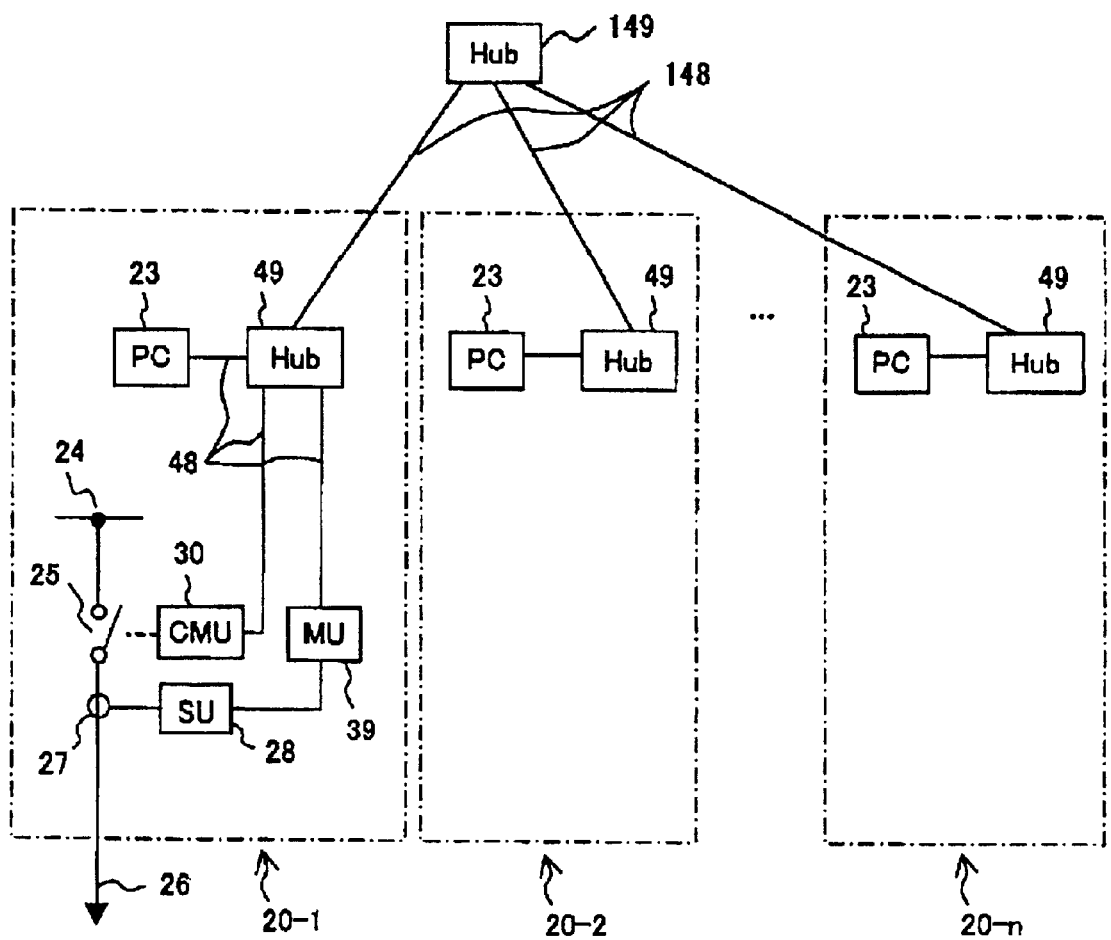
FIG. 36 is a schematic block diagram of a main part of a seventeenth embodiment of a system for protecting and controlling substation main-circuit components according to the present invention.

A seventeenth embodiment of a system for protecting and controlling substation main-circuit components according to the present invention is now described with reference to FIG. 36. As shown in FIG. 36, the merging unit 39, the component controlling-and-monitoring unit 30 and the protecting-and-controlling units 23 are connected to a hub 49 via optic fibers 48, and then, an internal bus is formed, in every one of the main-circuit units 20-1 through 20-n. The hubs 49 of the main-circuit units 20-1 through 20-n are connected to an inter-component hub 149 via optic fibers 148, and thus, an inter-component bus is formed.

The inter-component hub 149 is connected to a protecting-and-controlling unit. The hubs 49 and 149 transmit optical signals from optical fibers to other optical fibers.

Since the units are connected by optical fibers, internal and inter-component buses are not affected by electro-magnetic noise.

Eighteenth Embodiment

Figure 37:
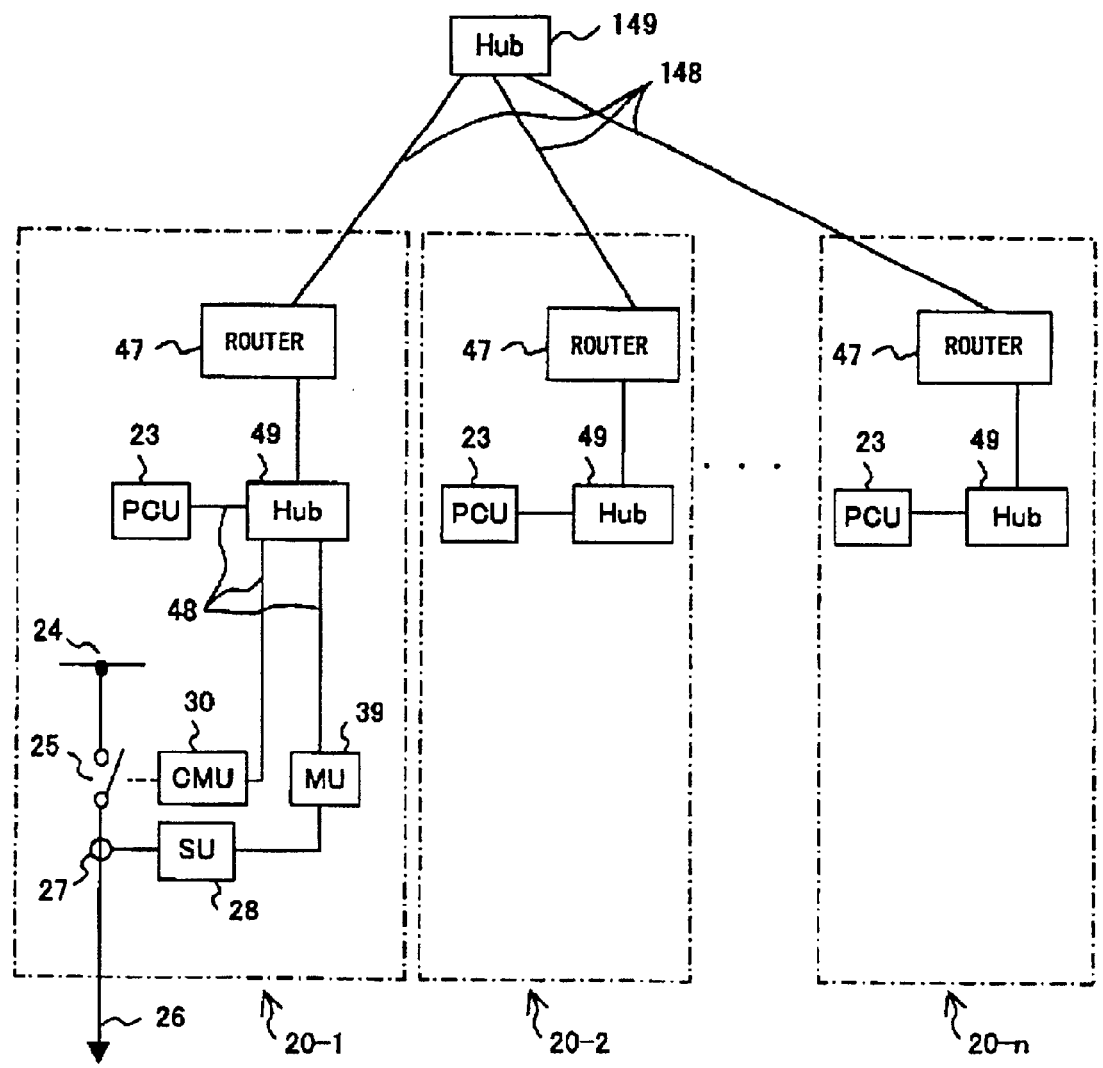
FIG. 37 is a schematic block diagram of a main part of a eighteenth embodiment of a system for protecting and controlling substation main-circuit components according to the present invention.

An eighteenth embodiment of a system for protecting and controlling substation main-circuit components according to the present invention is now described with reference to FIG. 37. As shown in FIG. 37, the merging unit 39, the component controlling-and-monitoring unit 30 and the protecting-and-controlling units 23 are connected to a hub 49 via optic fibers 48, and then, an internal bus is formed, in every one of the main-circuit units 20-1 through 20-n. The hubs 49 of the main-circuit units 20-1 through 20-n are connected to an inter-component hub 149 via routers 47 and optic fibers 148, and thus, an inter-component bus is formed. The inter-component hub 149 is connected to a protecting-and-controlling unit.

Since the units are connected by optical fibers, internal and inter-component buses are not affected by electro-magnetic noise. In addition, since the routers 47 are connected between the internal and inter-component buses, the data only relating to a particular internal bus are not sent out of the internal bus, and only minimum required data are transmitted through the inter-component bus.

Nineteenth Embodiment

Figure 38:
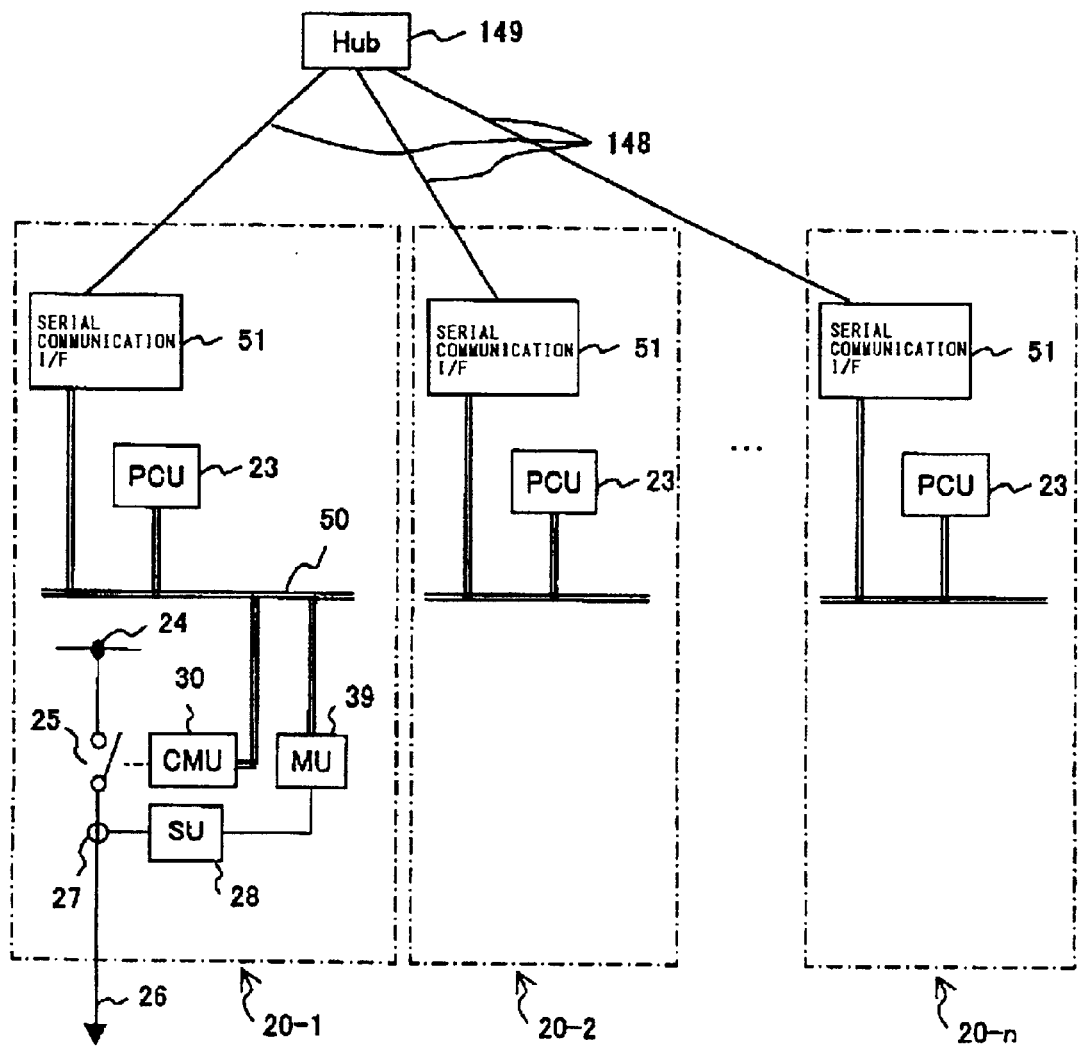
FIG. 38 is a schematic block diagram of a main part of a nineteenth embodiment of a system for protecting and controlling substation main-circuit components according to the present invention.

A nineteenth embodiment of a system for protecting and controlling substation main-circuit components according to the present invention is now described with reference to FIG. 38. As shown in FIG. 38, as for the internal bus for connecting the merging unit 39, the component controlling-and-monitoring unit 30 and the protecting-and-controlling unit 23, a parallel bus 50 is used instead of a process bus of serial transmission. The parallel bus 50 can transmit a plurality of bits simultaneously.

The parallel buses 50 of the main-circuit units 20-1 through 20-n are connected to an inter-component hub 149 via serial communication interfaces 51 and optic fibers 148, and thus, an inter-component bus is formed.

According to this embodiment of the present invention, the merging unit 39, the component controlling-and-monitoring unit 30 and the protecting-and-controlling units 23 are connected with a parallel bus 50, and then, a high speed internal bus can be formed easily. Since the units are connected by optical fibers, this system is not affected by electro-magnetic noise.

Twentieth Embodiment

Figure 39:
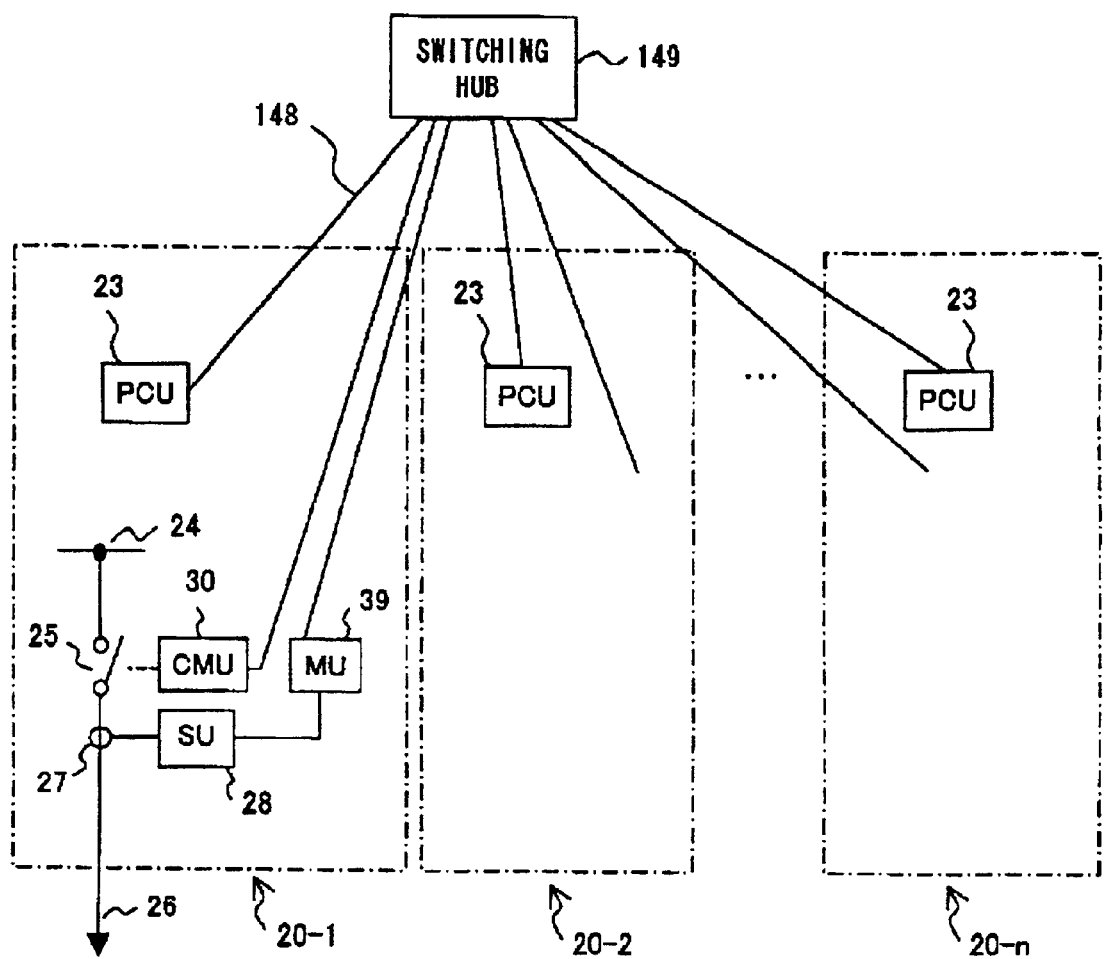
FIG. 39 is a schematic block diagram of a main part of a twentieth embodiment of a system for protecting and controlling substation main-circuit components according to the present invention.

A twentieth embodiment of a system for protecting and controlling substation main-circuit components according to the present invention is now described with reference to FIG. 39. As shown in FIG. 39, the merging units 39, the component controlling-and-monitoring unit 30 and the protecting-and-controlling unit 23 of the main-circuit units 20-1 through 20-n are connected to an inter-component switching hub 149 which connects a plurality of bays.

The switching hub decides the destination of the communication data based on the destination address of the communication data, and outputs the communication data only to the optical fibers which are connected to units of the destination.

In this embodiment, individual communication bands are secured for communication among the merging units, the protecting-and-controlling units by exchanging data by the switching hub 149, although numerous main-circuit units may be connected. In addition, the switching hub 149 and the protecting-and-controlling units 23 can be disposed in control rooms under good environmental condition (low noise level, appropriate temperature and humidity, and low vibration level, for example), and maintenance work would be easy.

Furthermore, since the protecting-and-controlling units, the merging units and the component controlling-and-monitoring units are connected with only one switching hub, high speed communication is performed.

Twenty-First Embodiment

Figure 40:
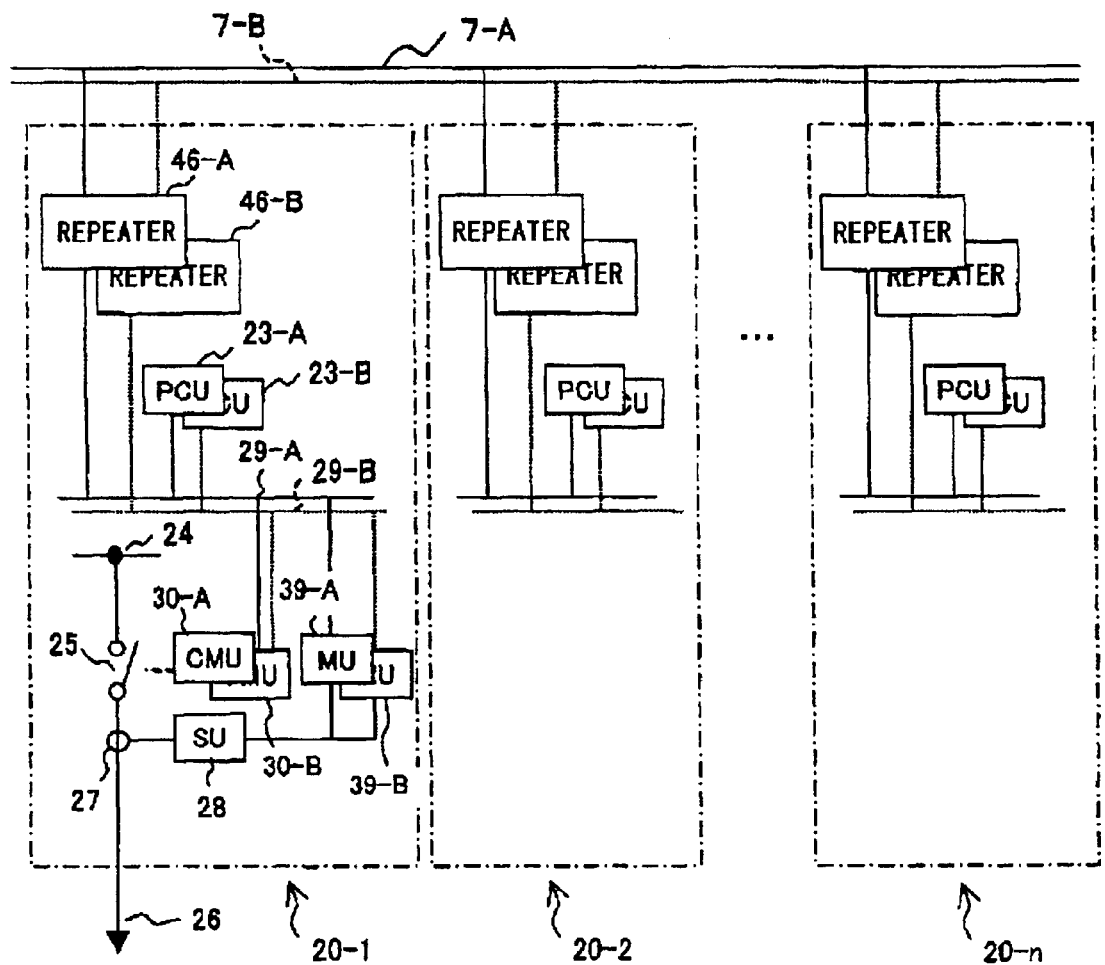
FIG. 40 is a schematic block diagram of a main part of a twenty-first embodiment of a system for protecting and controlling substation main-circuit components according to the present invention.

A twenty-first embodiment of a system for protecting and controlling substation main-circuit components according to the present invention is now described with reference to FIG. 40. As shown in FIG. 40, each one of the main-circuit units 20-1 through 20-n has two systems—Systems "A" and "B", and each system has a merging unit 39A or 39B, a component controlling-and-monitoring unit 30A or 30B, a protecting-and-controlling unit 23A or 23B, a repeater 46A or 46B (or alternatively, a router 47A or 47B (not shown)) and an internal bus 29A or 29B. The station bus (inter-component bus) also comprises Systems "A" and "B" 7A and 7B.

Systems "A" and "B" can be independently operated from the merging units which transmit instantaneous data to the component controlling-and-monitoring units which drive the trip coil. Therefore, even if one of the two systems has a failure, the trip coil can be activated by the other intact system.

In addition, when a sensor unit 28 is disposed in a severe environment for electronic devices—when the sensor unit 28 is disposed near a measurement current transducer 27, for example—the sensor unit 28 may be optionally duplicated in order to enhance liability.

Twenty-Second Embodiment

Figure 41:
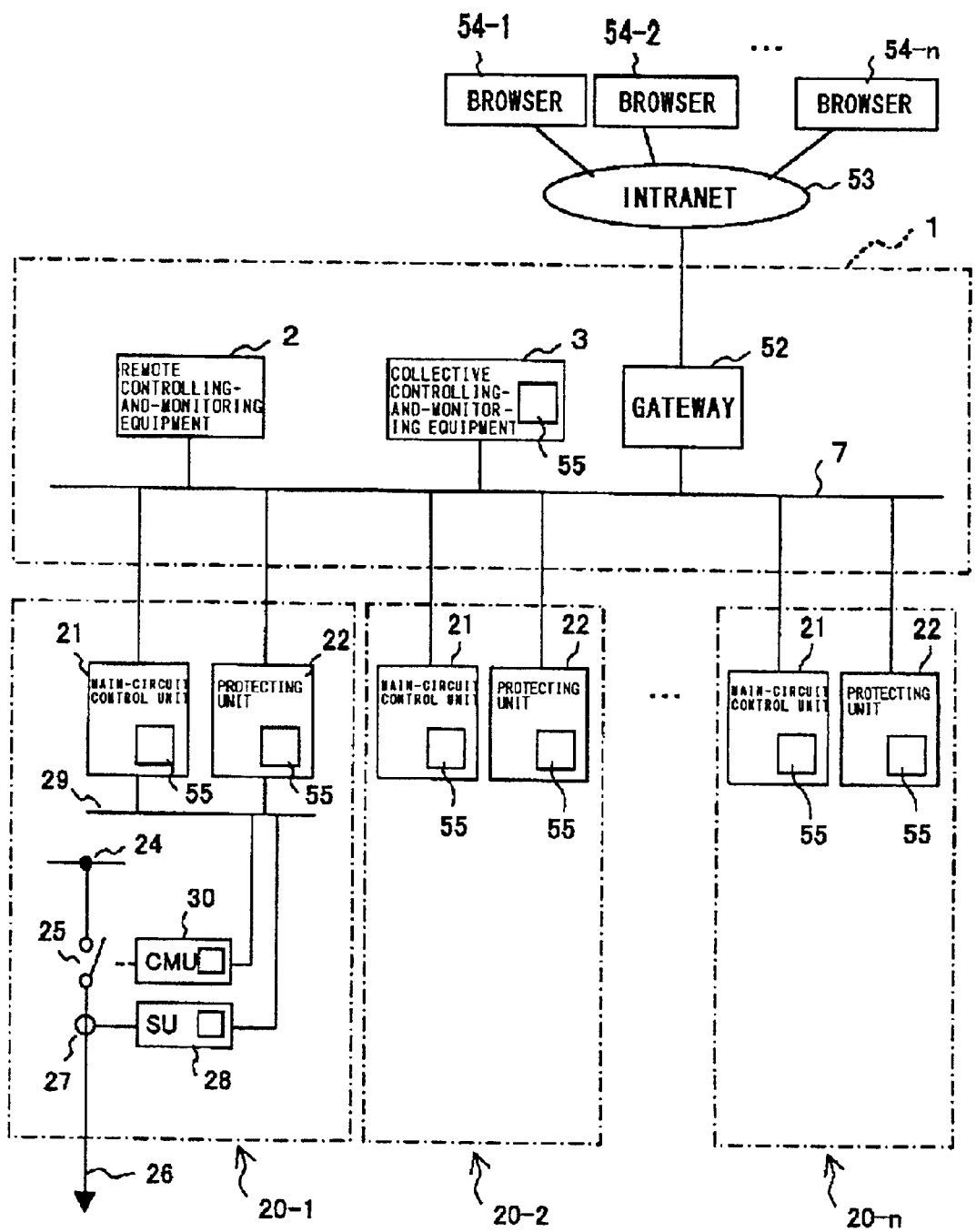
FIG. 41 is a schematic block diagram of a main part of a twenty-second embodiment of a system for protecting and controlling substation main-circuit components according to the present invention.

A twenty-second embodiment of a system for protecting and controlling substation main-circuit components according to the present invention is now described with reference to FIG. 41. In this embodiment, the station bus 7 is connected to an intranet 53 via a gateway 52, as shown in FIG. 41. The intranet 53 is connected to browsers 54-1 through 54-n. The collective controlling-and-monitoring equipment 3, the main-circuit control units 21-1 through 21-n, the protecting units 22-1 through 22-n, the sensor units (SU) 28 and the component controlling-and-monitoring unit (CMU) 30 have their own web servers 55 therein.

In this embodiment, the web servers 55 of the collective controlling-and-monitoring equipment 3, the main-circuit control units 21-1 through 21-n, the protecting units 22-1 through 22-n collect their monitoring information, and transmit the control commands. Thus, the main-circuit components can be monitored and controlled from the remote browsers 54-1 through 54-n connected to the intranet 53.

The sensor units 28 and the component controlling-and-monitoring units 30 are also connected to the intranet 53 via the process buses 29, the main-circuit control units 21-1 through 21-n, the protecting units 22-1 through 22-n, the station bus 7 and the gateway 52. Therefore, the sensor units 28 and the component controlling-and-monitoring units 30 can also be monitored and controlled by the remote browsers 54-1 through 54-n connected to the intranet 53.

In addition, the collective controlling-and-monitoring equipment 3, the main-circuit control units 21-1 through 21-n, the protecting units 22-1 through 22-n, the sensor units 28 and the component controlling-and-monitoring units 30 can be collectively monitored and controlled by more than one remote browsers 54-1 through 54-n connected to the intranet 53. For example, normally the browser 54-1 may monitor the whole substation, and in abnormal cases, detail information about the concerned main-circuit control unit 21-1 through 21-n, protecting unit 22-1 through 22-n, sensor unit 28 and component controlling-and-monitoring unit 30 may be monitored.

Twenty-Third Embodiment

Figure 42:
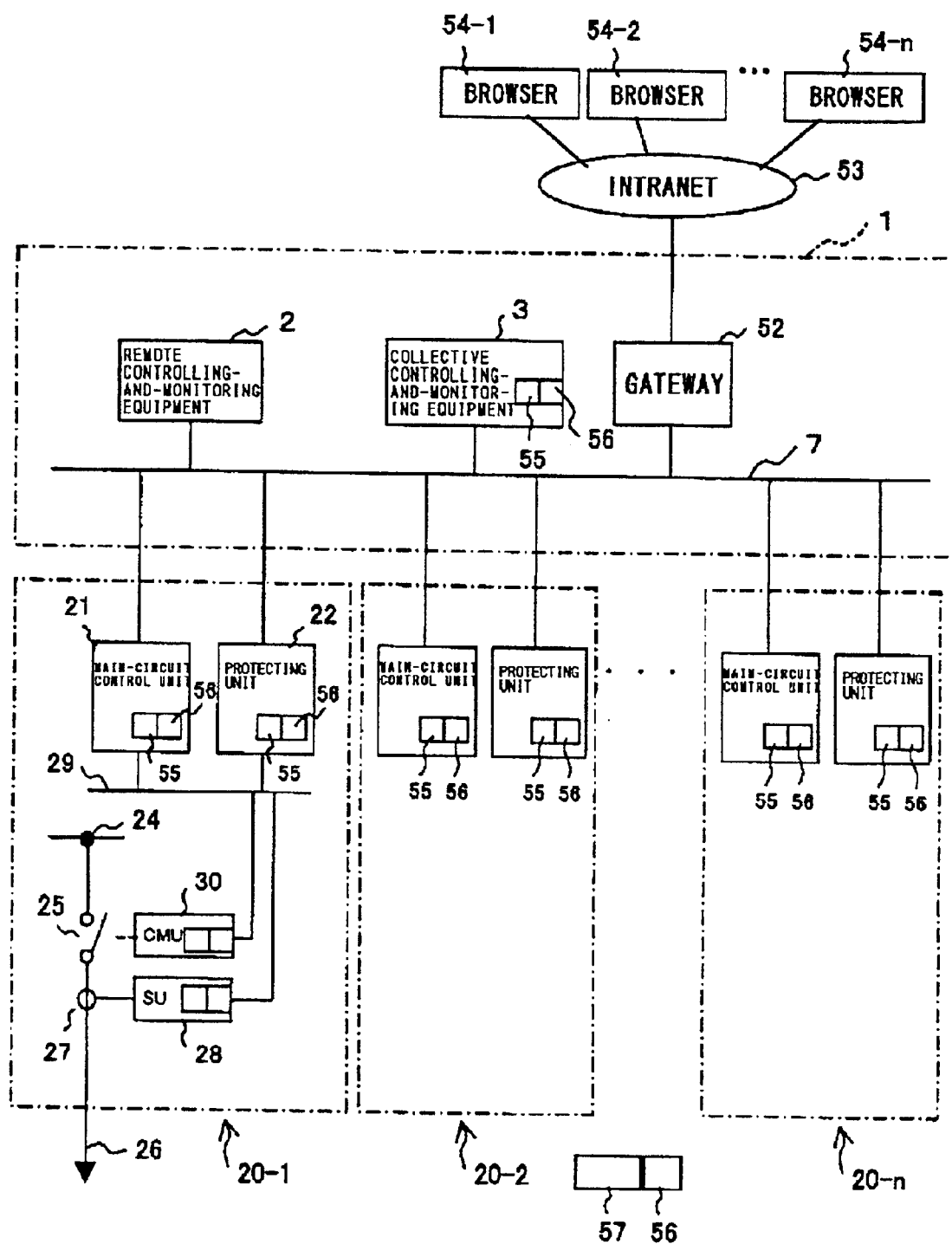
FIG. 42 is a schematic block diagram of a main part of a twenty-third embodiment of a system for protecting and controlling substation main-circuit components according to the present invention.

A twenty-third embodiment of a system for protecting and controlling substation main-circuit components according to the present invention is now described with reference to FIG. 42. In this embodiment, the collective controlling-and-monitoring equipment 3, the main-circuit control units 21-1 through 21-n, the protecting units 22-1 through 22-n are connected to the intranet 53 via the station bus 7 and the gateway 52. The intranet 53 is connected to browsers 54-1 through 54-n.

The collective controlling-and-monitoring equipment 3, the main-circuit control units 21-1 through 21-n, the protecting units 22-1 through 22-n, the sensor units (SU) 28 and the component controlling-and-monitoring unit (CMU) 30 have their own web servers 55 therein. The web servers 55 have wireless communication means 56 for wireless communication with the gateway 52 or a personal computer 57. Thus, the web servers 55 can transmit the web server data to the gateway 52 or the personal computer 57.

In operation of this embodiment, the collective controlling-and-monitoring equipment 3, the main-circuit control units 21-1 through 21-n and the protecting units 22-1 through 22-n may collect their respective monitoring information in their respective web servers 55. Then, the component can be monitored and controlled from the remote browsers 54-1 through 54-n connected to the intranet 53 by transmitting control commands from the remote browsers 54-1 through 54-n to the gateway 52 via the wireless communication means 56 connected to the web servers 55.

The sensor units 28 and the component controlling-and-monitoring unit 30 also can transmit control commands to the gateway 52 via the wireless communication means 56 connected to the web servers 55. Thus, the sensor units 28 and the component controlling-and-monitoring unit 30 are connected to the intranet 53 via the gateway 52, and they can be monitored and controlled from the remote browsers 54-1 through 54-n connected to the intranet 53.

In addition, if the web servers 55 are cooperated, the collective controlling-and-monitoring equipment 3, the main-circuit control units 21-1 through 21-n, the protecting units 22-1 through 22-n, the sensor units 28 and the component controlling-and-monitoring units 30 can be collectively monitored and controlled.

For example, normally the browser 54-1 may monitor the whole substation, and in the case of abnormal condition, detail information about the concerned main-circuit control unit 21-1, protecting unit 22-1, sensor unit 28 and component controlling-and-monitoring unit 30 may be monitored.

Twenty-Fourth Embodiment

Figure 43:
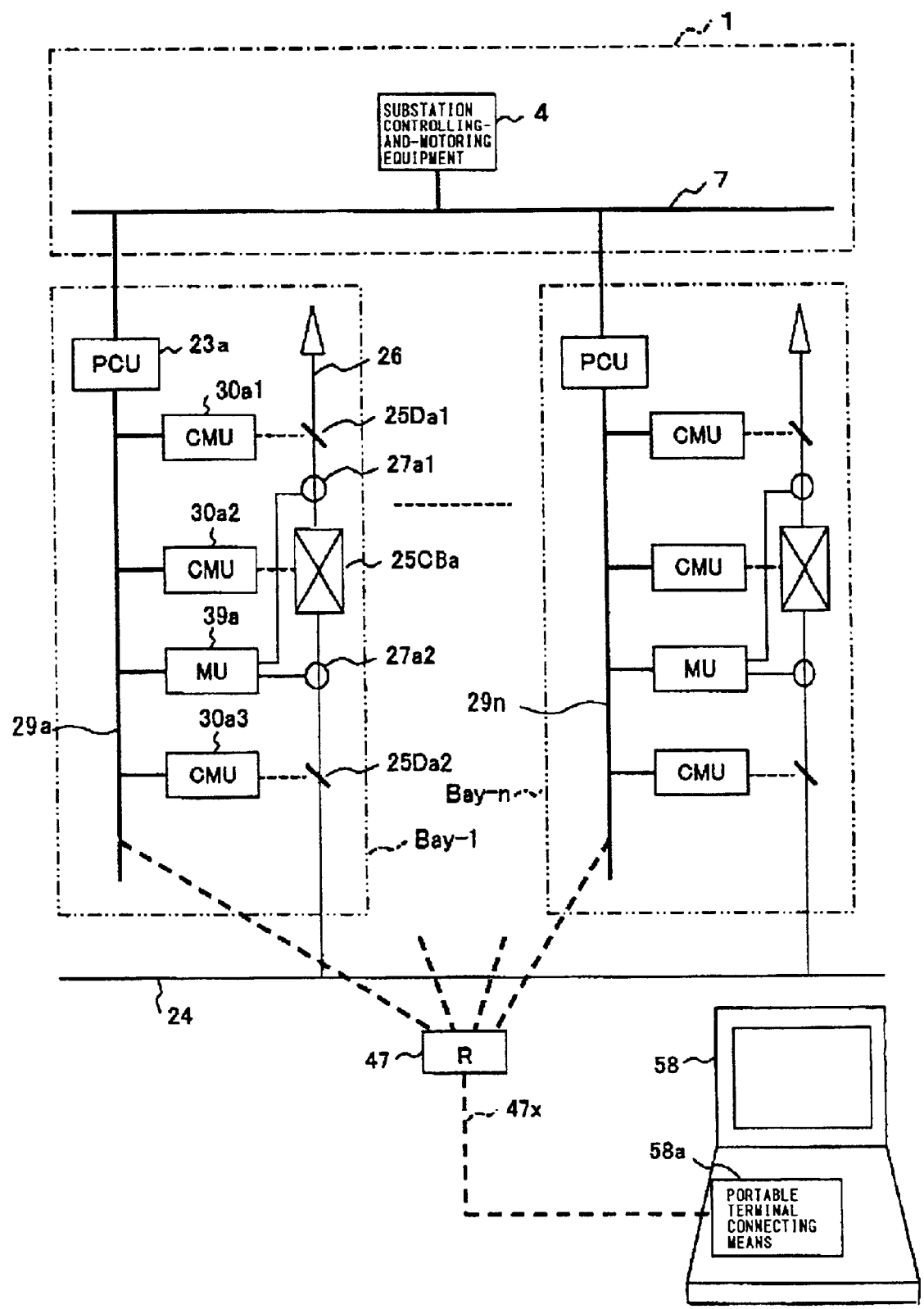
FIG. 43 is a schematic block diagram of a main part of a twenty-fourth embodiment of a system for protecting and controlling substation main-circuit components according to the present invention.

A twenty-fourth embodiment of a system for protecting and controlling substation main-circuit components according to the present invention is now described with reference to FIG. 43. Referring to FIG. 43, the substation controlling-and-monitoring equipment 4 includes the remote controlling-and-monitoring equipment 2 and the collective controlling-and-monitoring equipment 3 as shown in FIG. 1.

FIG. 43 shows main portions of Bay-1 through Bay-n which are bay zones of protection and control within a certain electric power installation where the electric power installation has a single busbar scheme.

Now, Bay-1 is described in detail. A power transmission line 26 branched from the bus line 24 has a circuit breaker 25CBa, a disconnecting switch and an earthening switch 25Da1 and 25Da2 and, current and voltage detecting means 27a1 and 27a2. Sensor units (not shown) are disposed near the current and voltage detecting means 27a1 and 27a2, and the sensor units and a merging unit 39a are connected by point-to-point communication lines.

Component controlling-and-monitoring units 30a1, 30a2 and 30a3 are disposed near the circuit breaker 25CBa, the disconnecting switch 25Da1, and the earthening switch 25Da2, respectively. The component controlling-and-monitoring units 30a1, 30a2 and 30a3, the protecting-and-controlling units 23a and the merging unit 39a are connected with the process bus 29a.

The other bays (including transformer bays, feeder bays, bus coupler bays, and bus section bays) have similar constructions as Bay 1 including the component controlling-and-monitoring units, the merging units, the protecting-and-controlling units and the process buses.

The protecting-and-controlling units 23a through 23n individually corresponding to Bay-1 through Bay-n are connected to the substation controlling-and-monitoring equipment 4 via a station bus 7.

Bay-1 through Bay-n communicate to each other by connecting the process buses 29a through 29n with a router 47. The router 47 is connected to a portable terminal 58 via communication means 47x. The portable terminal 58 has portable terminal connecting means 58a therein. The portable terminal connecting means 58a may be integrated in the portable terminal 58 or may be detachable from the portable terminal 58.

Thus, the portable terminal 58 is connected to the process buses 29a through 29n of the bays via the router 47, and can access to the component controlling-and-monitoring units 30a through 30n and the protecting-and-controlling units 23a through 23n. Then, the portable terminal 58 are connected to the process buses 29a through 29n of the bays via the portable terminal connecting means 58a, communication means 47x and the router 47, and can access to the component controlling-and-monitoring units 30a through 30n and the protecting-and-controlling units 23a through 23n.

As described above, according to this embodiment, the portable terminal 58 is connected to the process buses via the router 47. Therefore, even at a remote place from the component to be accessed in a substation, the information of the component can be easily obtained via the process bus. The connection between the router and the portable terminal may alternatively use wireless system instead of wired system shown in FIG. 43.

As for the portable terminal 58, a portable personal computer, a personal digital assistant (PDA) or a dedicated terminal may be used. As for the communication means 47x, RS232C or GPIB (general-purpose interface bus) or LAN can be used. The communication means 47x may use wired (with electric wires or optical fibers) or wireless system.

Twenty-Fifth Embodiment

Figure 44:
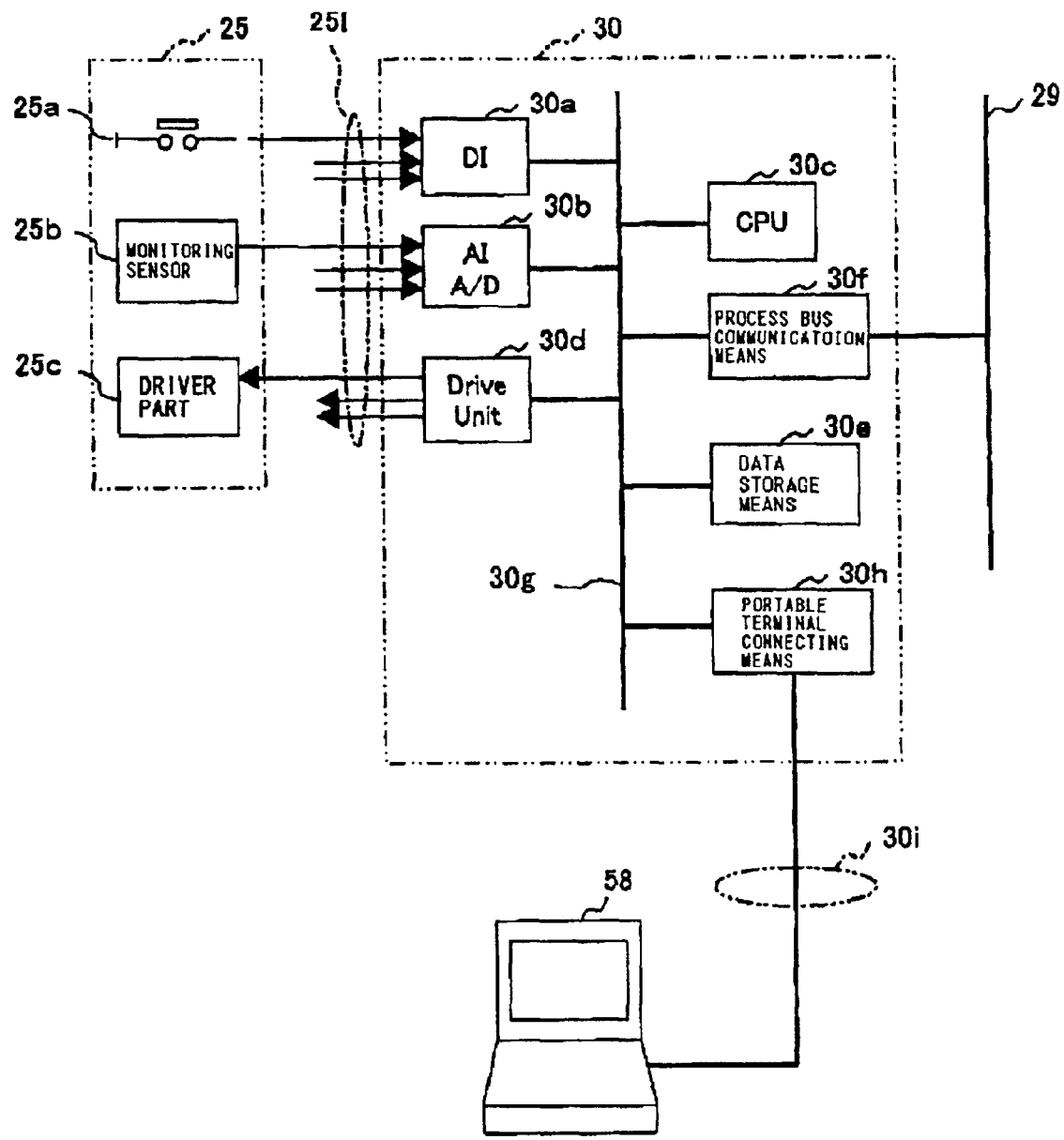
FIG. 44 is a schematic block diagram of a main part of a twenty-fifth embodiment of a system for protecting and controlling substation main-circuit components according to the present invention.

A twenty-fifth embodiment of a system for protecting and controlling substation main-circuit components according to the present invention is now described with reference to FIGS. 44 and 45. Referring to FIG. 44, in this embodiment, a portable terminal connecting means 30h is connected to the internal bus 30g of the component controlling-and-monitoring units 30 shown in FIG. 5. The portable terminal 58 such as a portable personal computer, a personal digital assistant (PDA) or a dedicated terminal may be detachably connected.

When the component controlling-and-monitoring unit 30 has received a command requiring data from the protecting-and-controlling unit or the controlling-and-monitoring equipment, or when the substation main-circuit has an abnormality, a certain group of the component controlling-and-monitoring data are immediately sent to the protecting-and-controlling unit or the controlling-and-monitoring equipment. The other component controlling-and-monitoring data are sent to the protecting-and-controlling unit or the controlling-and-monitoring equipment periodically with stipulated time periods.

When the component controlling-and-monitoring unit 30 has received a command requiring data on controlling and monitoring of the component from the portable terminal 58, the component controlling-and-monitoring unit 30 reads out the required data on controlling and monitoring of the component from the data storage means 30e, and sends the data to the portable terminal 58. When the required information is related to controlling and status display of the component, the information may be displayed on the portable terminal 58.

When the information is related to the monitoring of the component, not only the information about the wave form but also the calculated results of the monitoring data, such as the switchgear operation time, and the daignositic results may be sent out simultaneously. The portable terminal 58 may require not only the real-time information of the component at the time of the request but also the data stored in the data storage means 30e.

The portable terminal 58 can request the information stored as a database in the protecting-and-controlling units 23 and the substation controlling-and-monitoring equipment 4, and the information displayed at the protecting-and-controlling units 23 and the substation controlling-and-monitoring equipment 4. Such information can be displayed on the portable terminal 58.

When the component controlling-and-monitoring unit 30 has received a command about driving of the substation main-circuit component 25, the component controlling-and-monitoring unit 30 compares and diagnoses the interlock conditions and the control commands from the protecting-and-controlling units 23 and the substation controlling-and-monitoring equipment 4. Then, the component controlling-and-monitoring unit 30 outputs the driving signal from the driving circuit 30d based on that diagnosis. Thus, the substation main-circuit component 25 can be controlled by operating the portable terminal 58.

The auxiliary work accompanying the tests and the inspections such as diagnosis of feasibility of the test results and generating the test reports may be optionally automated using appropriate computer programs at the portable terminal 58.

According to the embodiment described above, control and display of the substation main-circuit component can be performed at the installed site using the portable terminal, without installing local control panels, and the information on the protecting-and-controlling units and on the substation controlling-and-monitoring equipment can be monitored at the site.

In addition, the sensors disposed for the component controlling-and-monitoring unit can be used as sensors or measuring instruments dedicated to the factory tests or on-site installation tests. Furthermore, a portable terminal may be used as an interface terminal of the component controlling-and-monitoring unit, and the data may be received under the control of the command from the portable terminal, and the substation main-circuit components may be operated by the portable terminal. Then, automatic testing, automatic inspection and automatic recording can be performed.

Figure 46:
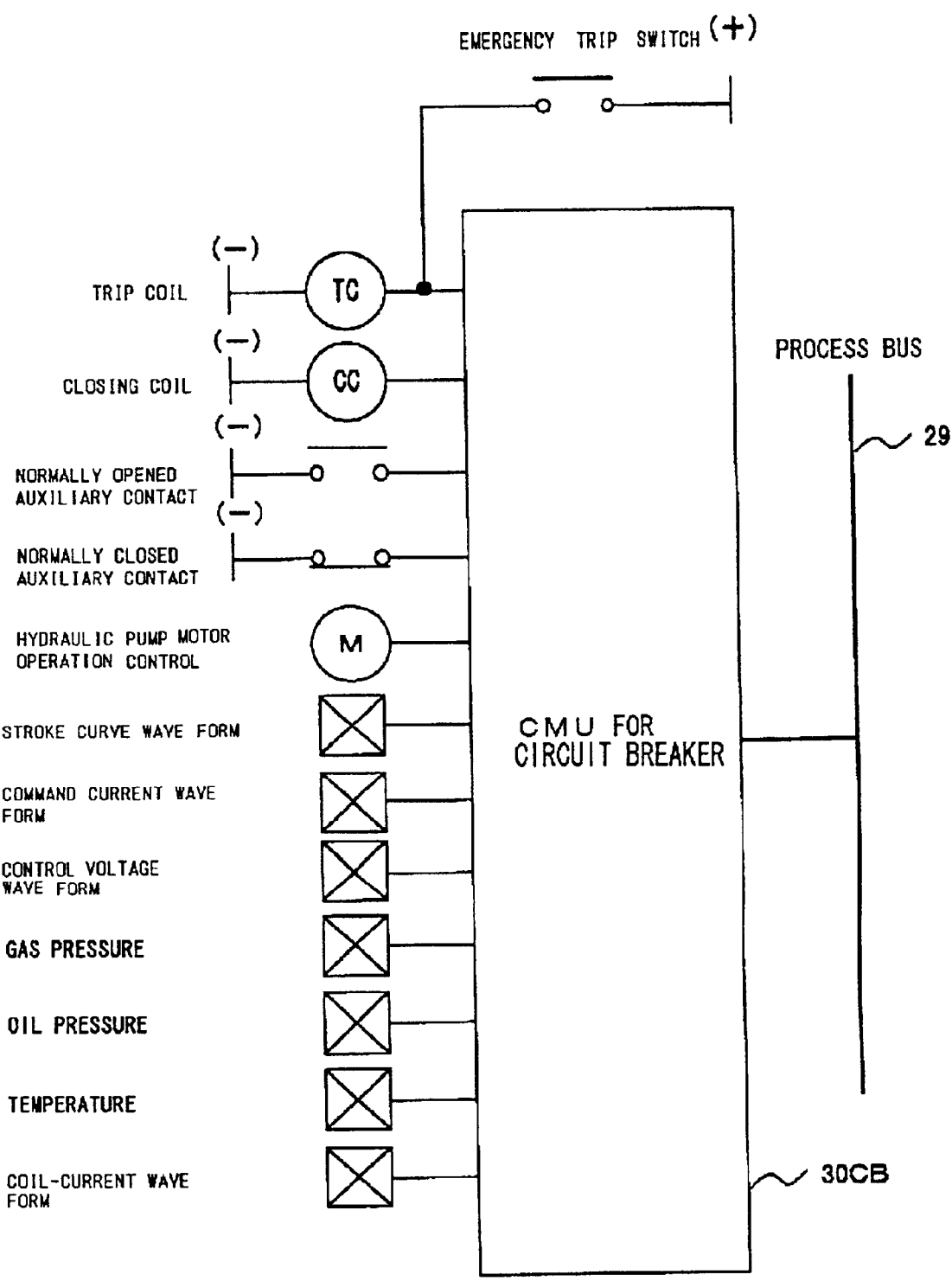
FIG. 46 is a schematic block diagram of a component controlling-and-monitoring unit for a circuit breaker used in a twenty-sixth embodiment of a system for protecting and controlling substation main-circuit components according to the present invention.

For example, for a circuit breaker, the inputs and outputs of the component controlling-and-monitoring unit may be as shown in FIG. 46 described in detail later, and then, CB operation tests (specifically, measuring of command current, closing and opening time, stroke wave form, control voltage, oil pressure and gas pressure), interlocking tests, etc. can be automated.

Thus, manpower and cost for tests in the factories and at the installation sites can be reduced. Especially, when the portable terminal is used and connected to the component controlling-and-monitoring unit via wireless communication system, the cables between the component controlling-and-monitoring unit and the portable terminal may be eliminated, which results in further reduction in manpower and cost for the tests.

In addition, the data obtained in the factory tests and in the on-site tests, and the controlling-and-monitoring data obtained during operation are stored as databases in the component controlling-and-monitoring unit, and those databases can be looked up at the portable terminal. Therefore, the current status of the component can be easily compared to the status at the shipment, at the on-site tests and at operation in the past, which may result in more effective maintenance and inspection.

Figure 45:
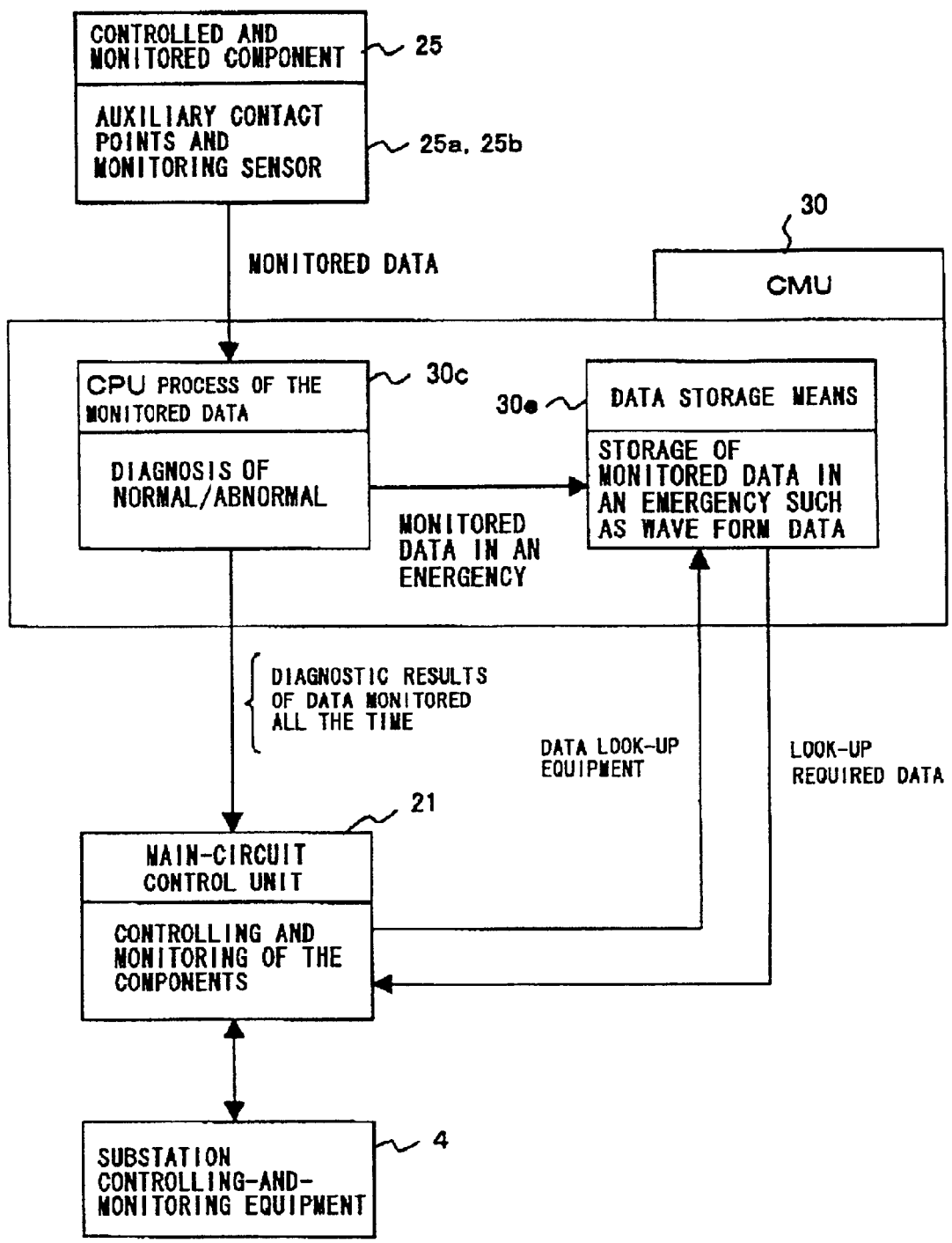
FIG. 45 is a schematic block diagram of the embodiment shown in FIG. 44 showing the software.

Now, software flow is explained referring to FIG. 45. The component controlling-and-monitoring unit (CMU) 30 receives monitoring data from the auxiliary contact positions 25a and monitoring sensors 25b which are attached to the substation main-circuit component such as a circuit breaker, a disconnecting/earthening switch. Then, the CPU 30c processes the monitoring data and diagnoses whether the substation main-circuit component is in normal condition or not.

The monitoring data which the component controlling-and-monitoring unit (CMU) 30 receives may consist of two groups—a first group of data must be monitored all the time by the electric power system monitoring system, and a second group of data may not be monitored all the time but are required when the upstream system requests, when an abnormal incident has occurred or when the component status history is to be known.

The first group of data is immediately received at the main-circuit control unit 21 in the protecting-and-controlling unit. The second group of data is received and temporarily stored at the data storage means 30e, and is sent to the upstream system such as the main-circuit control unit 21 in response to the upstream system's request.

For the circuit breaker 25, for example, the first group of data which must be monitored all the time, are the data required for switching control and for interlocking control of the circuit breaker, and must be transmitted to the upstream system such as the main-circuit control unit in every relatively short period of time. The first group of data may include, for example, auxiliary contact position of the circuit breaker, abnormality of the oil pressure (diagnosis of the CPU) and abnormality of the gas pressure (diagnosis of the CPU).

The second group of data which may not be monitored all the time, may include the stroke curve wave form at the circuit breaker open-close operations, command current wave form, analogue value of the oil pressure and gas pressure. The second group of data are used as clues for cause of abnormality when an abnormal incident occurred in the circuit breaker. The data may also be used to know the trend of the change of the condition monitoring and the inspection period of the components, and may also be used for prediction of the life span of the components.

The first group of data are transmitted periodically in relatively short period. The second group of data are not to be transmitted periodically, and it would be inefficient and uneconomical to transmit them periodically, because the second group of data are so large in volume. The second group of data is stored in the data storage means in the component controlling-and-monitoring unit. When there is a request for looking up data from the upstream system, the requested data is sent out.

Twenty-Sixth Embodiment

Figure 47:
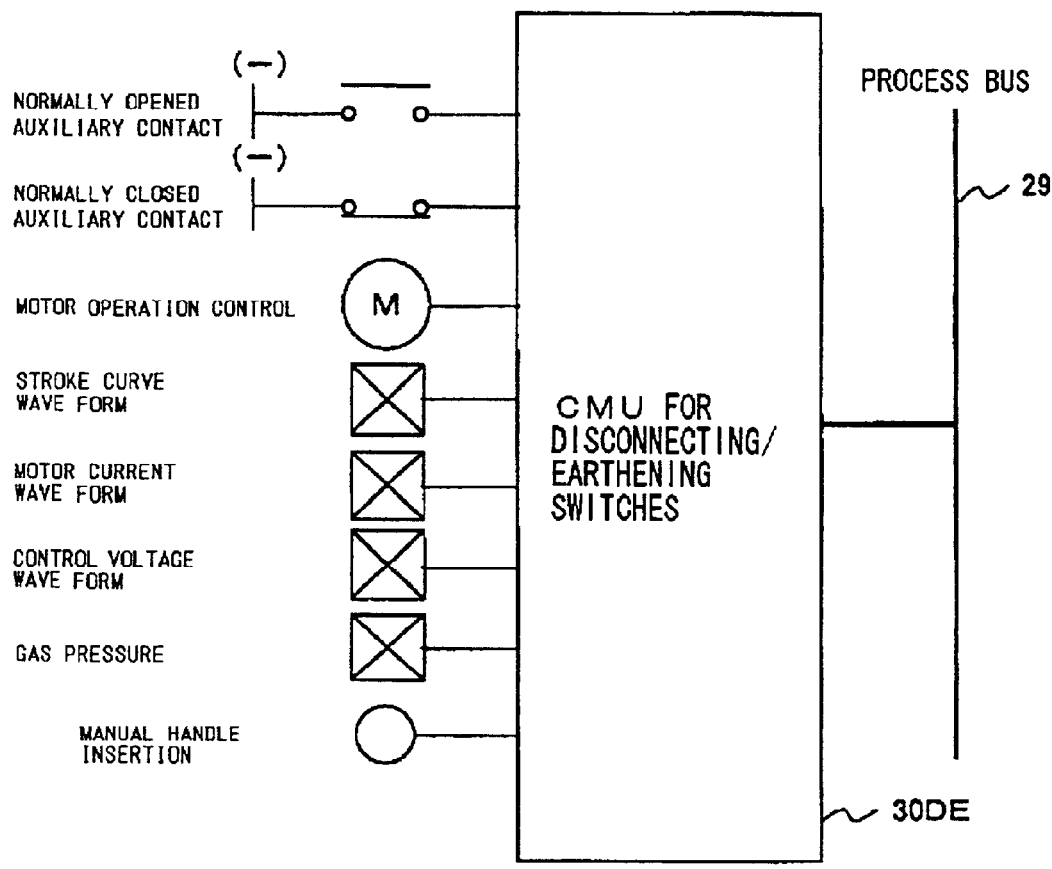
FIG. 47 is a schematic block diagram of a component controlling-and-monitoring unit for a disconnecting/earthening switch used in a twenty-sixth embodiment of a system for protecting and controlling substation main-circuit components according to the present invention.
Figure 48:
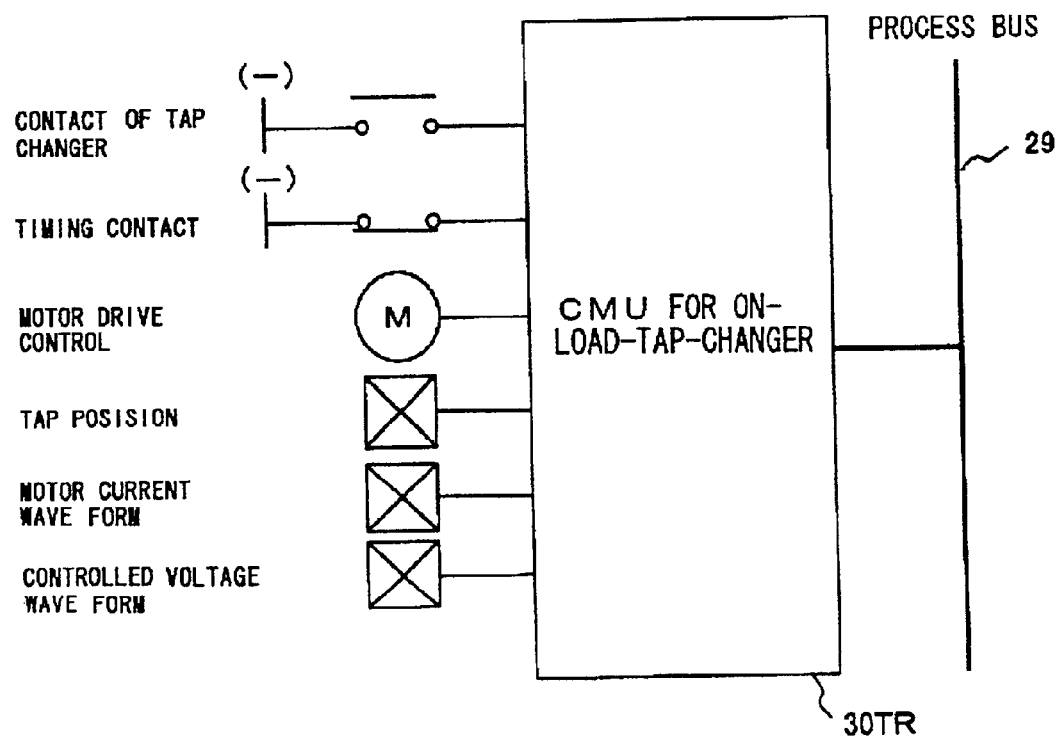
FIG. 48 is a schematic block diagram of a component controlling-and-monitoring unit for an on-load tap-changer used in a twenty-sixth embodiment of a system for protecting and controlling substation main-circuit components according to the present invention.
Figure 49:
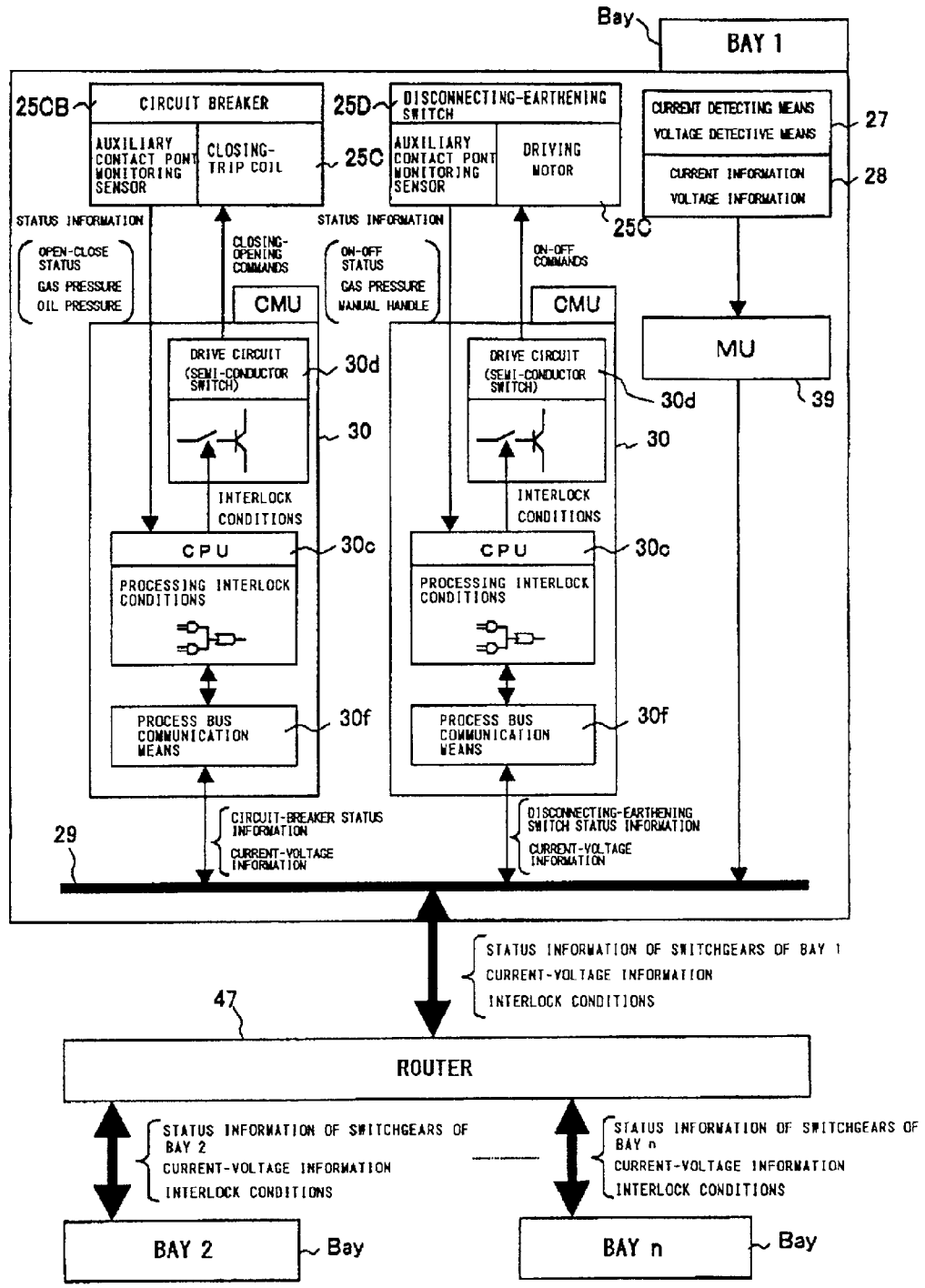
FIG. 49 is a schematic block diagram showing interlock conditions of the switchgears shown in FIGS. 46 through 48.

A twenty-sixth embodiment of a system for protecting and controlling substation main-circuit components according to the present invention is now described with reference to FIGS. 46 through 49. FIGS. 46, 47 and 48 show component controlling-and-monitoring units applied to a circuit breaker, a disconnecting/earthening switch and an on-load tap-changer. FIG. 49 shows schematic diagram of interlocking of the circuit breaker and the disconnecting/earthening switch.

FIG. 46 shows input and output signals of the component controlling-and-monitoring unit for a circuit breaker 30CB. FIG. 46 shows "trip coil (TC)", "closing coil (CC)", "normally opened auxiliary contact", "normally closed auxiliary contact", "hydraulic pump motor operation control", "stroke curve wave form", "command current wave form", "control voltage wave form", "gas pressure", "oil pressure", "temperature" and "coil current wave form". Those data are received at the monitoring sensors, and they are important monitoring data for diagnosing the switching operation characteristics of the circuit breaker.

The component controlling-and-monitoring unit for circuit breaker 30CB has an "emergency trip switch" which can directly drive the trip coil in an emergency. The "emergency trip switch" may be disposed within the component controlling-and-monitoring unit, or may be alternatively disposed near the driver part of the circuit breaker.

FIG. 47 shows input and output signals of the component controlling-and-monitoring unit for a disconnecting/earthening switch 30DE. FIG. 47 shows "normally opened auxiliary contact", "normally closed auxiliary contact", "motor-operation control", "stroke wave form", "motor current wave form", "control voltage wave form", "gas pressure" and "manual handle insertion". Those data are received at the monitoring sensors, and they are important monitoring data for diagnosing the on-off characteristics of the disconnecting/earthening switch.

FIG. 48 shows input and output signals of the component controlling-and-monitoring unit for an on-load tap-changer 30TR. FIG. 48 shows "contact", "timing contact", "motor-drive control", "tap position", "motor current wave form" and "control voltage wave form". Those data are received at the monitoring sensors, and they are important monitoring data for diagnosis of the changing operation characteristics of the on-load tap-changer.

In operation of the twenty-sixth embodiment, the fault current or voltage information is detected by the current or voltage detecting means 27, and is transmitted to the protecting-and-controlling units 23 via the merging unit 39 and the process bus 29. The protecting-and-controlling unit 23 performs the protection processes, and sends a circuit trip command to the component controlling-and-monitoring unit 30 of the circuit breaker 25CB of the main circuit, via the process bus 29. The component controlling-and-monitoring unit 30 diagnoses the circuit trip command received at the CPU 30c, and has the driving circuit 30d send a driving signal to the trip coil 25c of the circuit breaker, based on the result of the diagnosis.

Similarly for controlling the substation main-circuit component 25, the CPU 30c compares and diagnoses the control signals from the protecting-and-controlling units 23 or from the substation controlling-and-monitoring equipment 4, with operation condition data of the component and the interlock conditions, etc. The control signals may be an open-close command for a circuit breaker, an on-off command for a disconnecting/earthening switch and a tap-change command for an on-load tap-changer, for example. Then, based on the diagnosis, the driving signal is transmitted from the driving circuit 30*d* to the driver part 25*c* of the substation main-circuit component 25.

The controlled items which the CPU 30*c* of the component controlling-and-monitoring unit 30 processes may include, in a case where the substation main-circuit component 25 is a circuit breaker CB, for example: (1) close/trip coil drive control, (2) anti-pumping control, (3) operation locking control, (4) pole discrepancy prevention control, (5) hydraulic pump operation control, (6) interlocking control, and (7) time adding of events. Furthermore, a controlled item of "(8) synchronous control switching" may be added by modification of the software.

A first group of data which must be monitored and controlled all the time by the protecting-and-controlling unit 23 or the substation controlling-and-monitoring equipment 4 are sent to the protecting-and-controlling unit 23 or the substation controlling-and-monitoring equipment 4 periodically via the process bus 29. The first group of data may include open-close condition, gas pressure alarm and oil pressure alarm. The diagnosis of abnormality of gas and oil pressures, for example, may be performed by the CPU 30*c* and the only results may be transmitted all the time.

A second group of data which may not be monitored all the time such as stroke wave form of the circuit breaker are sent out only when the protecting-and-controlling unit 23 or the substation controlling-and-monitoring equipment 4 has requested. In such a case, the wave form data can be stored in the data storage means 30*e*, and can be read out in response to requests. Therefore, the data of the tests in the factories and on the construction sites can be stored in the component controlling-and-monitoring unit 30 as a database.

The electric values (currents and voltages) which the component controlling-and-monitoring unit 30 requires for controlling the substation main-circuit component 25 can be looked up via the process bus 29.

The one component controlling-and-monitoring unit 30 looks up the status data of the other component controlling-and-monitoring units in the same bay and in other bays, and processes the interlock conditions by the CPU 30*c*, then, constitutes interlocks within its corresponding bay or in its corresponding relating bays.

When the "manual handle" is inserted in the substation main-circuit component 25 and the substation main-circuit component 25 can be handled manually, interlocks for blocking the control and operation from the protecting-and-controlling unit 23 or the substation controlling-and-monitoring equipment 4 are formed.

The twenty-sixth embodiment described above has the following advantages:

In this embodiment, the substation main-circuit components are controlled and monitored through the software which is activated in the CPU 30*c*, and the operational mechanism can be driven by semi-conducter switches in drive unit (CMU) 30*d* of component controlling-and-monitoring unit 30, instead of using auxiliary relays and timer-relays in combination in the local control panels. Therefore, the functions of the local control panel can be realized by one or more circuit boards.

Figure 53:
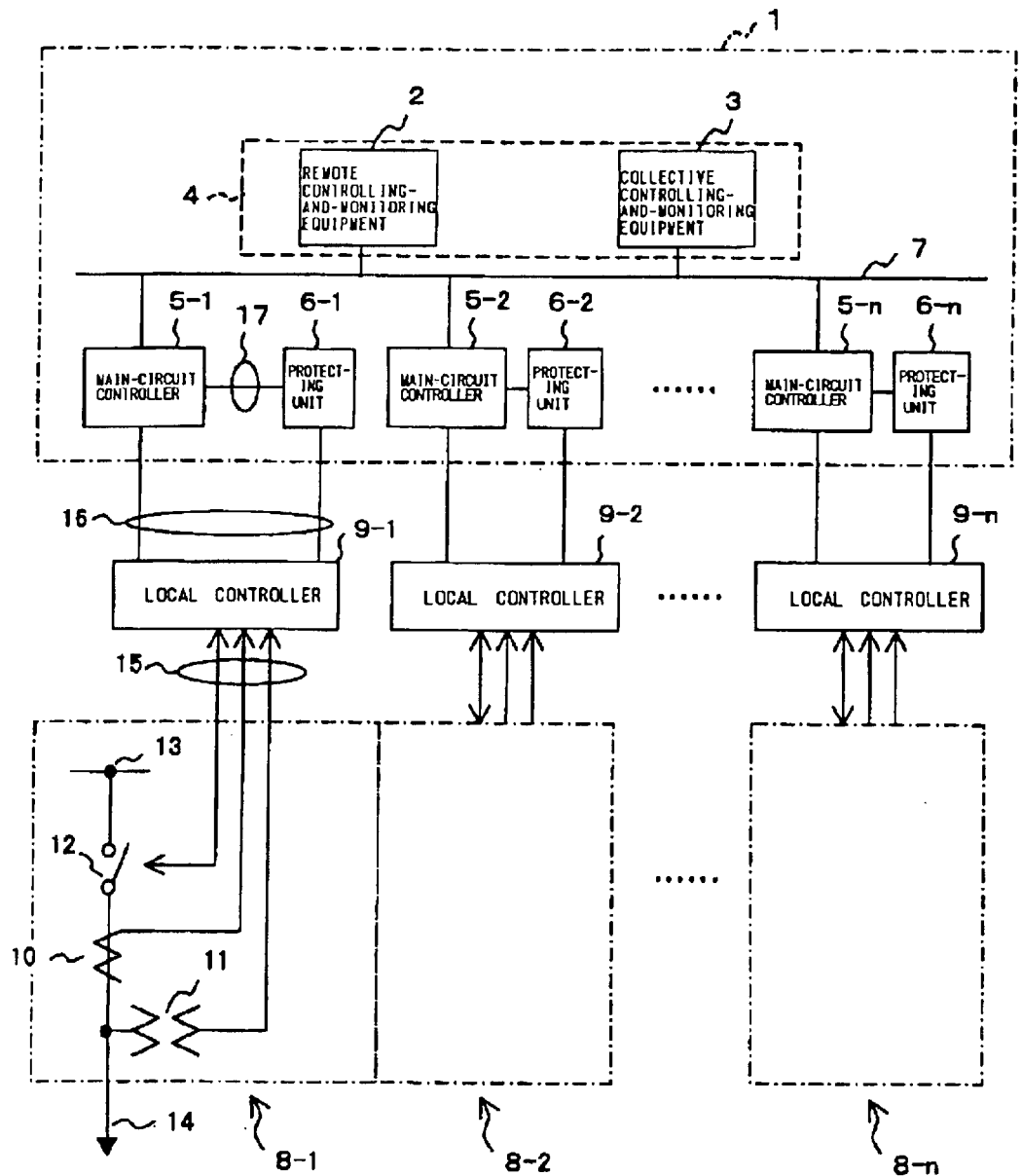
FIG. 53 is a schematic block diagram of a system for protecting and controlling substation main-circuit components of the prior art.
Figure 54:
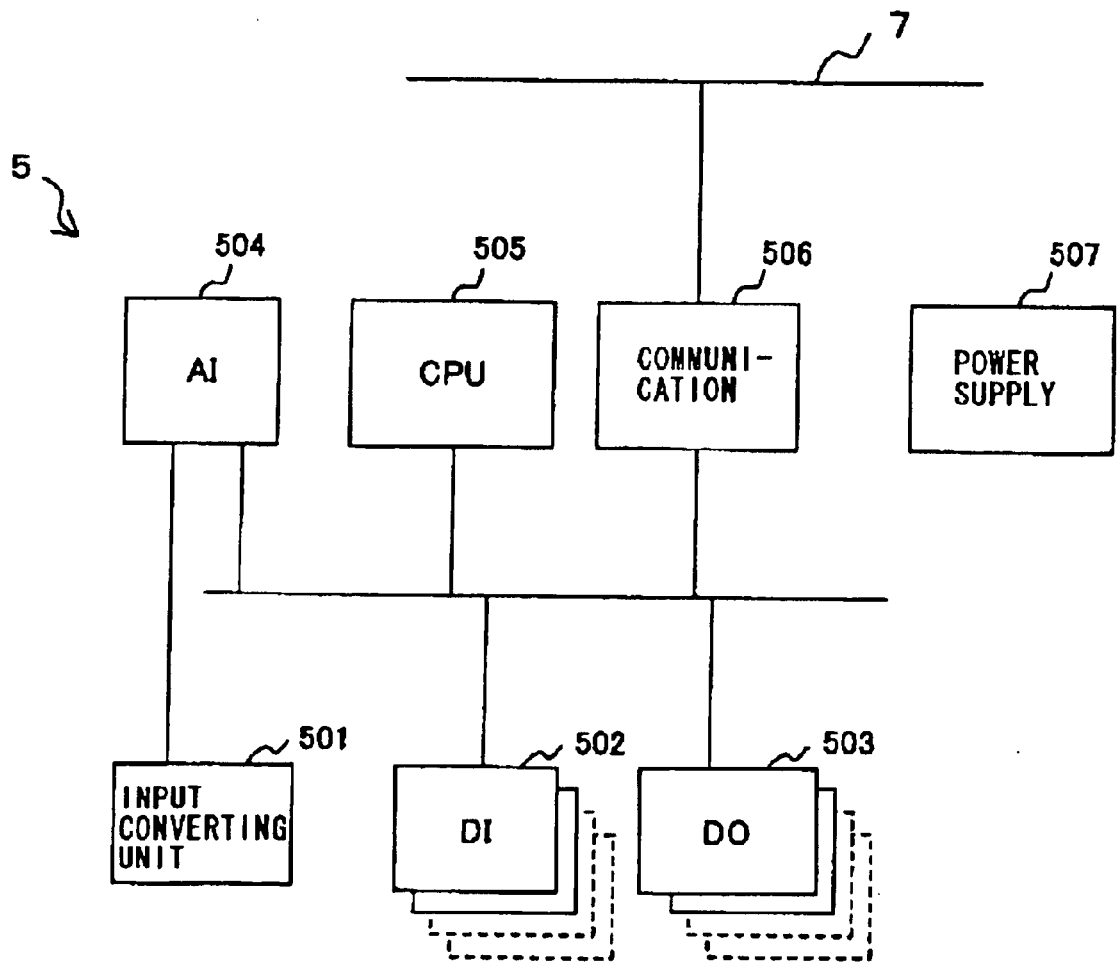
FIG. 54 is a schematic hardware block diagram of a main-circuit controller shown in FIG. 53.

Because the control circuits are formed in circuit boards, manpower for attaching the control parts and for electric wiring can be remarkably reduced, and the component controlling-and-monitoring units can be integrated in the substation main-circuit components, eliminating needs for the local control panels 9 (See FIG. 53). Thus, the substation main-circuit components can be formed more compact, the total cost may be reduced, and the repair and maintenance work of the main-circuit components and the protecting-and-controlling units can be united.

In addition, changes of controlling and monitoring conditions including interlock conditions depending on the types of the systems and on operation modes, and expansion of the controlling and monitoring functions would be easy. That is because the controlling and monitoring of the components are formed by software, and the software changes would be easier than hardware changes.

In addition, the data transmission can be efficient and in high quality, because the first group of data required to be monitored all the time and the second group of data not required to be monitored all the time are separately transmitted. Since large data giving heavy load on the communication means such as stroke wave forms of the circuit breaker are sent only when the substation main-circuit component is in an abnormal condition, those big data can be sent in coordination with the communication condition of the all-time monitored data, and the data quality may be maintained without deterioration considering the volume of the transmitted data on the communication means.

Therefore, various data of the quality level required at tests can be obtained through the component controlling-and-monitoring unit and the communication means. Thus, especially for periodic inspections, remote maintenance including automatic testing, automatic inspection and automatic recording can be realized.

Furthermore, the interlock condition can be monitored and controlled not only by the upstream system such as the substation controlling-and-monitoring equipment but also by the other component controlling-and-monitoring units mutually. Therefore, reliability of the interlock is enhanced. For example, during inspection of a component, erroneous release of interlock by a command from the upstream system can be prevented, and safety in component inspection may be improved.

The component controlling-and-monitoring unit for the circuit breaker has an emergency trip switch, and the circuit breaker can be tripped directly and bypassing the process bus, as a back-up, even if the process bus has a failure.

Detail Description of the Interlock Condition

The interlock conditions have been briefly described above. Now, the interlock conditions for switchgears such as circuit breakers and disconnecting/earthening switches of a plurality of bays are explained in detail referring to FIG. 49.

Referring to FIG. 49, the component controlling-and-monitoring units (CMUs) 30 attached to the switchgears such as the circuit breakers 25CB and the disconnecting/earthening switches 25D of a plurality of bays receive status information of the operation mechanisms of the switchgears.

The status information may include open-close status, gas pressure and oil pressure for the circuit breakers 25CB, on-off status, gas pressure and manual handle insertion status for the disconnecting/earthening switches 25D. The status information of the circuit breakers 25CB and the disconnecting/earthening switches 25D can be obtained at the other component controlling-and-monitoring units (CMUs) 30. In addition, the component controlling-and-monitoring units (CMUs) 30 can obtain the current and voltage information of the main circuit via the sensor units or the merging unit (MU) 39 and the process bus 29.

The component controlling-and-monitoring unit (CMU) 30 of the circuit breaker 25CB, for example, not only directly receives the status data of the operation mechanism of the circuit breaker 25CB but also receives the status information of the disconnecting/earthening switches 25D and the information of the main-circuit current and voltage via process bus 29, and processes the interlock condition by the CPU 30c based on those information.

The component controlling-and-monitoring unit (CMU) 30 may form interlock of the operation mechanism based on the processed interlock condition. The CPU 30c sends the interlock commands or closing/opening commands to the driving circuit (semi-conductor switch) 30d. Likewise, the component controlling-and-monitoring units (CMUs) 30 of the disconnecting/earthening switches 25D process the interlock conditions of their respective operation mechanisms. Thus, "within-a-bay" interlock in the bay can be formed by the component controlling-and-monitoring units (CMUs) 30.

The status information and the current and voltage information of the switchgears in a bay and the "within-a-bay" interlock conditions can be accessed by the component controlling-and-monitoring units of the other bays via the process buses and the routers. Thus, the component controlling-and-monitoring units (CMUs) 30 can process the "inter-bay" interlock conditions relating to a plurality of bays.

Modification of the Twenty-Sixth Embodiment

In this modification, the "within-a-bay" interlock conditions and the "inter-bay" interlock conditions are processed in the protecting-and-controlling units as shown in FIG. 50.

In this modification, the hardware construction of the protecting-and-controlling units and the component controlling-and-monitoring units including the circuit breakers and the disconnecting/earthening switches are similar to the corresponding units of the twenty-sixth embodiment. This modification can be put into practice by changing the installed software.

The protecting-and-controlling unit 23 receives the component controlling-and-monitoring data and the main circuit current and voltage information which are required for interlock process, from the component controlling-and-monitoring units (CMUs) 30 or the merging units (MUs) 39 via the process bus 29 and the router 47. Then, the CPU 30c processes the interlock conditions, and forms the "within-a-bay" interlock or the "inter-bay" interlock. The interlock commands are sent to the component controlling-and-monitoring units (CMUs) 30 of that operation mechanism. Then, the component controlling-and-monitoring units (CMUs) 30 may perform the interlock of that switchgear or operate that switchgear.

Detail Description of the Interlock Condition of the Modification

The "inter-bay" interlock conditions for switchgears such as circuit breakers and disconnecting/earthening switches of a plurality of bays according to the modification describe above are explained in detail referring to FIG. 50. Referring to FIG. 50, the component controlling-and-monitoring units (CMUs) 30 attached to the switchgears such as the circuit breakers and the disconnecting/earthening switches of a plurality of bays receive status information of the operation mechanisms of the switchgears.

The status information may include open-close status, gas pressure and oil pressure for the circuit breakers, on-off status, gas pressure and manual handle insertion status for the disconnecting/earthening switches. The status information of the circuit breakers and the disconnecting/earthening switches can be obtained at the other protecting-and-controlling units (PCUs) 23. In addition, the protecting-and-controlling units (PCUs) 23 can obtain the current and voltage information of the main circuit via the sensor units or the merging units (MUs) 39 and the process buses 29.

The protecting-and-controlling units (PCUs) 23 receive the status information of the circuit breakers and the disconnecting/earthening switches of that operating mechanism and the current and voltage information of the main circuit, via the process bus 29 (the process bus communication means 29c). Then, the CPUs 23a process the interlock conditions. The protecting-and-controlling units (PCUs) 23 form the interlocks of the operation mechanism based on the interlock conditions.

For example, the protecting-and-controlling unit (PCU) 23 sends the interlock conditions to the component controlling-and-monitoring unit (CMU) 30 for the circuit breakers 25CB via the process bus 29. Then, the component controlling-and-monitoring unit (CMU) 30 sends the interlock commands or on-off commands to the driving circuit (semi-conductor switch) based on the received interlock conditions.

Likewise, the protecting-and-controlling unit (PCU) 23 sends the interlock conditions to the component controlling-and-monitoring unit (CMU) 30 for the disconnecting/earthening switches 25D. Thus, the protecting-and-controlling unit processes the interlock conditions, and "within-a-bay" interlock can be formed.

The status information and the current and voltage information of the switchgears in a bay and the "within-a-bay" interlock conditions can be accessed by the component controlling-and-monitoring units of the other bays via the process buses 29 and the routers 47. Thus, the component controlling-and-monitoring units can process the "inter-bay" interlock conditions relating to a plurality of bays, and can form the "inter-bay" interlock.

According to the modification, following advantage is obtained in addition to those of the twenty-sixth embodiment:

A typical bay has a plurality of component controlling-and-monitoring units. In this modification, a single protecting-and-controlling unit instead of the plurality of component controlling-and-monitoring units processes all the interlock in the bay. Thus, separate software for circuit breakers and for disconnecting/earthening switches are not needed to be developed, and then, the software development cost can be reduced.

It is to be understood that the modification of the twenty-sixth embodiment described above can be applied to the system for protecting and controlling substation main-circuit components of the twelfth embodiment shown in FIG. 30, in which the protecting-and-controlling units, component controlling-and-monitoring units and the merging units are connected each other using parallel buses (internal buses), process buses and component controlling-and-monitoring unit (CMU) communication means.

In the system for protecting and controlling substation main-circuit components of the twelfth embodiment, the interlock condition can be processed by a CPU installed in the CMU communication means. The advantages of the present modification of the twenty-sixth embodiment can be likewise obtained in this case.

Furthermore, as another modification of the twenty-sixth embodiment, diagnosis of the component monitoring which is performed by the component controlling-and-monitoring unit (CMU) in the twenty-sixth embodiment can be alternatively performed by the protecting-and-controlling units or by the CPUs of the CMU communication means like interlock processing. It is to be understood that the same advantages of the twenty-sixth embodiment are obtained in this case.

In addition, in such an embodiment, the CPU 30c in the component controlling-and-monitoring unit (CMU) (See FIG. 5) can be eliminated, because the component controlling-and-monitoring unit (CMU) is required to have only functions of sending digitized data of the monitoring information of the substation main-circuit component and on-off controlling of the drive circuits. Thus, the hardware construction of the component controlling-and-monitoring unit can be simplified.

The CPU 30c in the CMU (shown in the FIG. 5) can be eliminated as described above, but it is in a sense that an LSI for controlling comparative to a high-precision CPU is not required, and minimum control means for controlling the process bus communication means and the drive circuits may be required.

Twenty-Seventh Embodiment

A twenty-seventh embodiment of a system for protecting and controlling substation main-circuit components according to the present invention is now described with reference to FIGS. 51 and 52.

Figure 51:
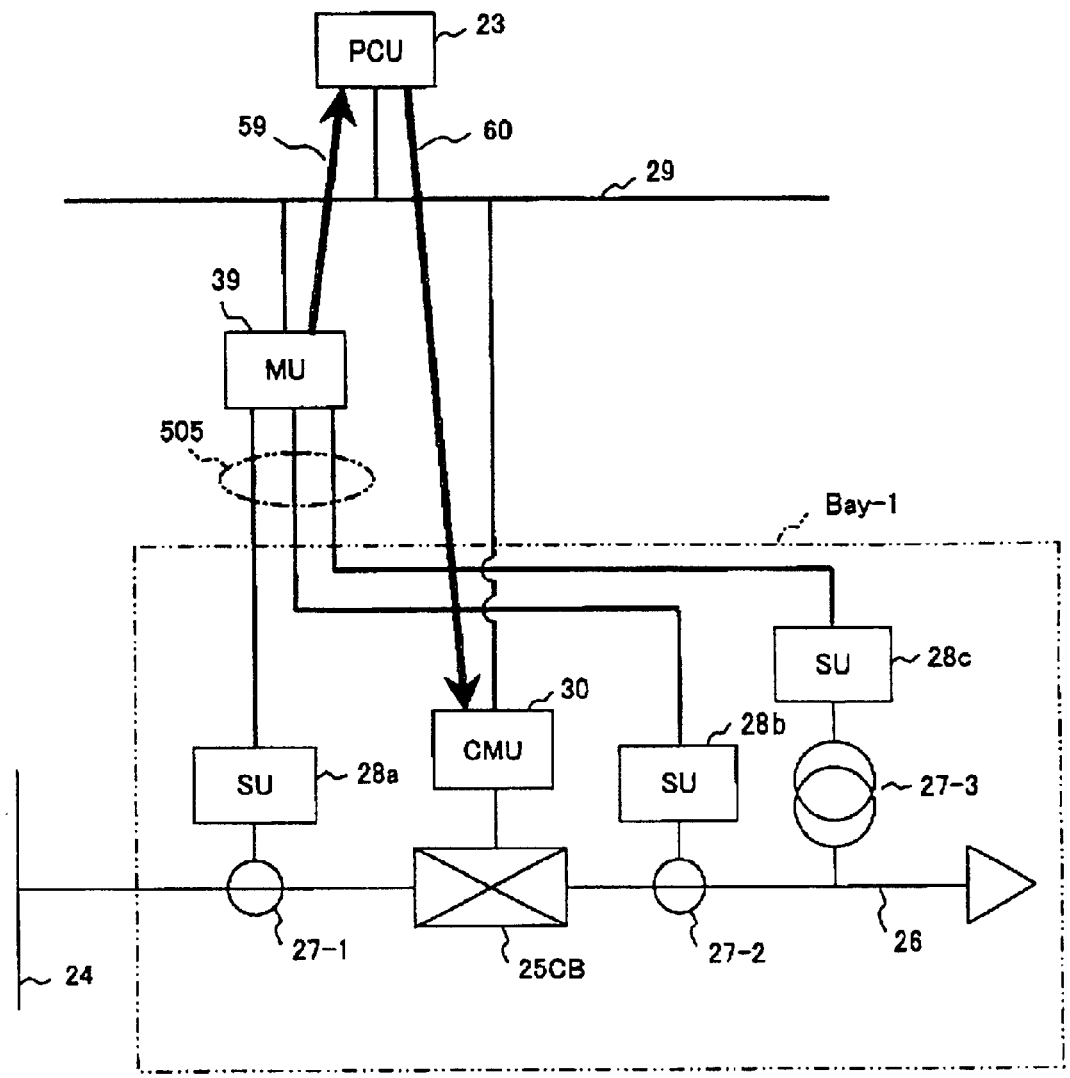
FIG. 51 is a schematic block diagram of a main part of a twenty-seventh embodiment of a system for protecting and controlling substation main-circuit components according to the present invention.

As shown in FIG. 51, this embodiment is similar to the sixth embodiment shown in FIG. 16 except that two point-to-point communication means 59 and 60 have been added. The first point-to-point communication means 59 connects the merging unit (MU) 39 and the protecting-and-controlling unit (PCU) 23, and the second point-to-point communication means 60 connects the protecting-and-controlling unit 23 and the component controlling-and-monitoring unit (CMU) 30. Those two point-to-point communication means 59 and 60 are independent of the process bus 29, and typically use optical communication.

The concept of adding point-to-point communication means as described above can also be applied to the eleventh embodiment shown in FIG. 29. In such a case, the first point-to-point communication means may connect the sensor unit and the protecting-and-controlling unit, and the second point-to-point communication means may connect the protecting-and-controlling unit and the component controlling-and-monitoring unit.

FIG. 52 shows detailed connecting relations between the protecting-and-controlling unit 23 and the component controlling-and-monitoring unit 30 by the communication means 60. The components shown here are similar to those shown in FIG. 5 except that following elements have been added: an interface 30j for the point-to-point communication means 60 between the protecting-and-controlling unit 23 and the component controlling-and-monitoring unit (CMU) 30; a second internal bus 30k connected to the interface 30j; and a second circuit breaker drive circuit 30m. Alternatively, the internal bus 30k may be eliminated and the circuit breaker drive circuit 30m may directly receive the circuit trip command.

Now the operation of the twenty-seventh embodiment of the system for protecting and controlling substation main-circuit components described above is explained.

Outputs of the current detecting means 27-1 and 27-2 and of the voltage detecting means 27-3 are digitized by the sensor units 28a, 28b and 28c disposed near the respective detecting means. Then, the outputs of the sensor units 28a, 28b and 28c are sent to the merging unit 39 via point-to-point communication means 505. The merging unit 39 merges the digital data of the currents and the voltages into transmission frames corresponding to the bay-zones of protection and control within the electric power installation, for example. Then, the merging unit 39 adds time data, and sends the data to the protecting-and-controlling unit 23 via the point-to-point communication means 59 between the merging unit 39 and the protecting-and-controlling unit 23.

The protecting-and-controlling unit 23 processes protection, and sends out circuit trip command to the component controlling-and-monitoring unit (CMU) 30 of the circuit breaker 25CB of the main circuit via the point-to-point communication means 60 between the protecting-and-controlling unit 23 and the component controlling-and-monitoring unit 30. Then, the component controlling-and-monitoring unit 30 sends out drive signals to the trip coil of the circuit breaker via the interface 30j of the point-to-point communication means and the circuit breaker drive circuit 30m.

The current and voltage information outputted from the merging unit is also distributed to the components other than the protecting-and-controlling unit 23 via the process bus 29.

Typically, high speed response and high reliability are required only for trip command to the circuit breaker for protection. Therefore, the point-to-point communication means 60 between the protecting-and-controlling unit 23 and the component controlling-and-monitoring unit 30 is arranged only for the component controlling-and-monitoring unit 30 for circuit breaker. The other control commands to the circuit breakers other than the trip command to the circuit breakers for protection are sent through the process bus 29.

Now the advantages of the twenty-seventh embodiment of the system for protecting and controlling substation main-circuit components are explained.

Since the communication passages for the trip commands are duplicated, the trip command can be sent to the component controlling-and-monitoring unit 30 for circuit breaker via the point-to-point communication means 60 even when the process bus is in trouble. Thus, this system is highly reliable. In addition, when more reliable "fail safe" system is required, the whole transmission system relating to protection may be duplicated from the sensor units (or merging units) to the component controlling-and-monitoring unit for the circuit-breaker. The transmission system relating to protection may include the inner buses in the component controlling-and-monitoring unit and the circuit-breaker drive units. Alternatively, one of the process bus 29 or point-to-point communication means 60 may consist of a main protection system and the other back-up system.

Furthermore, in this embodiment, the process does not have overhead on the communication means between the merging/sensor units, the protecting-and-controlling unit and the component controlling-and-monitoring unit. Therefore, this system can be easily applied to the protection systems requiring high speed response.

Numerous modifications and variations of the present invention are possible in light of the above teachings. It is, therefore, to be understood that, within the scope of the appended claims, the present invention can be practiced in a manner other than as specifically described herein.

It is to be understood that, in addition to the specifically claimed aspects of the present invention, the following aspects may be included in the invention, wherein each one of these aspects further specifies the first or second aspects described in "Brief Summary of the Invention" of this specification:

(a) The system of the first or second aspects of the invention, wherein at least one of the digital data output means comprises a sensor unit for inputting at least one of the analogue AC electric values, for converting the analogue values to digital data and for adding time data to the digital data.

(b) The system of the first or second aspects of the invention, wherein at least one of the digital data output means comprises a sensor unit for inputting a plurality of the analogue AC electric values, for converting the analogue values to digital data and for merging the digital data.

(c) The system of the first or second aspects of the invention, wherein at least part of the communication means is of wireless type.

(d) The system of the first or second aspects of the invention, further comprising:

a power cable, via which electric power from a control power source is supplied to at least part of the digital data output means, the protection-and-controlling means and component controlling-and-monitoring means; and at least one interface for interfacing between the power cable and the at least part of the digital data output means, the protection-and-controlling means and component controlling-and-monitoring means so that the power cable may be used as information transmission medium.

(e) The system of the first or second aspects of the invention, wherein at least one of the protection-and-controlling means comprises:

main-circuit control block control means including a digital processor for monitoring and controlling the substation main-circuit components and also including means for communication for control; and protection means including a digital processor for protection of the substation main-circuit components and also including means for communication for protection, the protection means physically separated from the main-circuit control block control means.

(f) The system of the first or second aspects of the invention, wherein at least one of the protection-and-controlling means comprises:

main-circuit control block control means including a digital processor for monitoring and controlling the substation main-circuit components and also including means for communication for control; and protection means including a digital processor for protection of the substation main-circuit components and also including means for communication for protection; wherein at least part of the processor for monitoring and controlling and the processor for protection comprise a commonly used hardware.

(g) The system of the first or second aspects of the invention, wherein the digital data output means comprises pairs of current detecting means and voltage detecting means disposed on both sides of a circuit breaker.

(h) The system of the first or second aspects of the invention, wherein:

the at least one merging unit comprises means for adding time data corresponding to times of the digital data from the sensor units and means for sending the digital data added with the time data to the communication means; and each one of the sensor units has means for synchronizing in sampling based on standard time signals which are sheared among the sensor units which send the digital data to a common merging unit of the at least one merging unit, and means for sending the sampled data to the common merging unit via an individual transmission passage.

(i) The system of the first or second aspects of the invention, the system comprising:

a plurality of component units, each including at least one of the digital data output means, at least one of the protection-and-controlling means, at least one of the component controlling-and-monitoring means and a unit communication bus; and an inter-unit communication bus connected to the substation controlling-and-monitoring equipment, the inter-unit communication bus also connected to the unit communication buses via repeaters.

(j) The system of the first or second aspects of the invention, the system comprising:

a plurality of component units, each including at least one of the digital data output means, at least one of the protection-and-controlling means, at least one of the component controlling-and-monitoring means and a unit communication bus; and an inter-unit communication bus connected to the substation controlling-and-monitoring equipment, the inter-unit communication bus also connected to the unit communication buses via routers, so that information related only to one of the component units may not be sent out of the component unit through the router.

(k) The system of the first or second aspects of the invention, wherein the communication means comprises an optical fiber and a hub connected to the optical fiber.

(l) The system of the first or second aspects of the invention, wherein the communication means comprises:

a unit communication bus, including copper wires or a backplane multiple-bit-data communication bus formed in a printed board; and an inter-unit communication bus including a hub and an optical fiber connected to the hub for transmitting serial data there through.

(m) The system of the first or second aspects of the invention, comprising means for wireless communication means between the web servers and the gateway.

(n) The system of the first or second aspects of the invention, wherein:

at least one of the component controlling-and-monitoring means sends out a first part of the component controlling-and-monitoring data to the protection-and-controlling means or the substation controlling-and-monitoring equipment, when the component controlling-and-monitoring means has received data request signals from the protection-and-controlling means or the substation controlling-and-monitoring equipment, and when the substation main-circuit component is in abnormal condition;

while the component controlling-and-monitoring means sends out a second part of the component controlling-and-monitoring data to the protection-and-controlling means or the substation controlling-and-monitoring equipment periodically.

(o) The system of the first or second aspects of the invention, wherein at least one of the component controlling-and-monitoring means has interlock means based on information from the data collecting means, from the digital data output means, and from other component controlling-and-monitoring means.

(p) The system of the first or second aspects of the invention, wherein the at least one of the component controlling-and-monitoring means has means for communicating with a portable terminal.

(q) The system of the first or second aspects of the invention, wherein the communication means has means for communicating with a portable terminal.

(r) The system of the first or second aspects of the invention, wherein at least one of the protecting-and-controlling means has an individual transmission passage for communicating with at least one of the digital data output means and an individual transmission passage for communicating with at least one of the component controlling-and-monitoring means, the individual transmission passages being separated from the communication means.

What is claimed is:

1. A system for protecting and controlling at least one substation main-circuit component disposed in one of a plurality of bays in an electric power installation, the system comprising:

at least one substation controlling-and-monitoring equipment for controlling and monitoring the electric power installation as a whole, including at least one substation main-circuit component, and for communicating with at least one remote control station;

a plurality of sensor units for inputting a plurality of analogue AC electric values of a main circuit of the substation main-circuit component, sampling the analogue AC electric values at a predetermined period, converting the sampled analogue AC electric values into sampled digital data, and outputting the sampled digital data corresponding to the analogue AC electric values;

a merging unit for inputting the sampled digital data from the sensor units in each bay, merging the sampled digital data, and outputting at least some of the merged sampled digital data to protection-and-controlling means;

first serial transmitting medium providing a point-to-point link between the merging unit and the plurality of sensor units;

protection-and-controlling means for inputting the merged sampled digital data from the merging unit and for controlling, monitoring, and protecting the substation main-circuit component;

at least one component controlling-and-monitoring means for receiving commands from the protection-and-controlling means or the substation controlling-and-monitoring equipment, and controlling and monitoring the substation main-circuit component; and communication means for transmitting information between means the protection-and-controlling means and the substation controlling-and-monitoring equipment;

parallel transmitting medium connecting at least two of the following:
   the merging unit;
   the protection-and-controlling means;
   component controlling-and-monitoring communication means for sending component controlling-and-monitoring data from the component controlling-and-monitoring means to the protection-and-controlling means, and for sending controlling signals from the protection-and-controlling means to the component controlling-and-monitoring means; and
   process-bus communication means including second serial transmitting medium for sending the merged sampled digital data from the merging unit to a process bus used for bay-to-bay communication and at least sending the merged sampled digital data from the process bus to the protection-and-controlling means, and/or sending the controlling signals from the protection-and-controlling means to the process bus or sending the controlling signals from the process bus to the component controlling-and-monitoring means via the component controlling-and-monitoring communication means.

2. A system according to claim 1, wherein an integrated device of the system comprises:
   the parallel transmitting medium;
   the merging unit;
   the protection-and-controlling-means;
   the component controlling-and-monitoring communication means; and
   the process-bus communication means.

3. A system according to claim 1, wherein at least one of the protection-and-controlling means comprises main-circuit control block control means including a digital processor for monitoring and controlling the substation main-circuit component and also including means for communication for control; and protection means including a digital processor for protection of the substation main-circuit component and means for communication for protection; wherein at least part of the processor for monitoring and controlling and the processor for protection, or the means for communication for control and the means for communication for protection comprise a commonly used hardware.

4. A system according to claim 1, wherein at least one of the protection-and-controlling means comprises main-circuit control block control means including a digital processor for monitoring and controlling the substation main-circuit component and also including control communication means for communicating with the substation controlling-and-monitoring equipment; and protection means including a digital processor for protection of the substation main-circuit components and also including protection communication means for communicating with the substation controlling-and-monitoring equipment;

wherein the digital processor for monitoring and controlling has a protection function, while the digital processor for protection has a function of monitoring and controlling, so that either one of the digital processors can perform at least part of function which the other one of the digital processors would perform when the other one of the digital processors has a failure.

5. A system according to claim 2, wherein:
   the merging unit has means for sending same standard signal for time synchronization and standard time data to the sensor units simultaneously and periodically via first individual transmission passages; and
   each one of the sensor units has means for synchronizing in sampling based on the standard signals, means for adding time data calculated using the standard time data and a count value to sampled data, and means for sending the sampled data with the time data to the merging unit via a second individual transmission passage which is different from the first individual transmission passages.

6. A system according to claim 2, wherein:

the merging unit has means for sending same standard signals for time synchronization to the sensor units simultaneously and periodically via individual transmission passages, means for adding time data calculated using the standard time data and a count value to the digital data sent from the sensor units and means for sending the digital data added with the time data to the communication means; and each one of the sensor units has means for synchronizing in sampling based on the standard signals, and means for sending the sampled data to the merging unit via an individual transmission passage.

7. A system according to claim 2, wherein the merging unit comprises means for synchronizing the digital data from the sensor units, means for adding time data corresponding to times of the digital data, and means for sending the digital data added with the time data to the communication means.

8. A system according to claim 2, wherein:

the merging unit comprises means for sending standard signals for adding time data corresponding to times on state events of the substation main-circuit components to the component controlling-and-monitoring means, means for producing the standard signals based on standard signals for time synchronization and standard time, and means for sending the digital data from the sensor units to the protection-and-controlling means;

the component controlling-and-monitoring means comprises means for inputting the state values of the substation main-circuit component and means for adding time data on the state events of the substation main-circuit components based on the standard signals; and the protection-and-controlling means comprises means for inputting the digital data with the time data from the merging unit, and for inputting the state events of the substation main-circuit components with the time data from the component controlling-and-monitoring means.

9. A system according to claim 1, the system comprising:

a plurality of component units, each including at least one of the sensor units, the protection-and-controlling means and the component controlling-and-monitoring means; and communication lines and at least one switching hub for exchangeably connecting the sensor units, the protection-and-controlling means, and the component controlling-and-monitoring means each other, so that information may be exchanged between the protection-and-controlling means, the component controlling-and-monitoring means and the substation controlling-and-monitoring equipment.

10. A system according to claim 1, the system comprising:

a plurality of component units, each including at least one of the sensor units, at least one of the component controlling-and-monitoring means, at least one of the protection-and-controlling means, and a plurality of unit communication buses, so that the sensor units, the component controlling-and-monitoring means and the protection-and-controlling means of a same component unit may be connected by the unit communication buses of the same component unit; and a plurality of inter-unit communication buses for communicating between the unit communication buses of different component units, so that the protection-and-controlling means have the digital data sent from the sensor units transmitted via the unit communication buses and the inter-unit communication buses.

11. A system according to claim 1, wherein:

the communication means is connected to an internet or an intranet via gateway, the internet or intranet is connected to at least one browser; and at least some of the sensor units, the component controlling-and-monitoring means, the protection-and-controlling means and the substation controlling-and-monitoring equipment have web servers.

12. A system according to claim 1, wherein the component controlling-and-monitoring means comprises:

data collecting means for collecting outputs of the sensor units, the outputs including electric value data and operation status data of the substation main-circuit component;

data storage means for storing the data collected by the data collecting means as component controlling-and-monitoring data;

a digital processor for processing data for controlling and monitoring the substation main-circuit component;

a drive circuit for sending signals to the substation main-circuit component for driving operating means of the substation main-circuit component, the drive circuit including a switch; and communication means;

so that the component controlling-and-monitoring means:

compares, diagnoses and monitors control signals from the protection-and-controlling means or the substation controlling-and-monitoring equipment and the component controlling-and-monitoring data;

sends driving signals to the substation main-circuit component for driving operating means of the substation main-circuit component based on results of the diagnosis; and sends the component controlling-and-monitoring data and the results of the diagnosis to the protection-and-controlling means or the substation controlling-and-monitoring equipment.

13. A system according to claim 1, wherein the protection-and-controlling means has interlock means based on information from the sensor units, from the component controlling-and-monitoring means, and from other protection-and-controlling means.

14. A system according to claim 1, wherein the component controlling-and-monitoring means controls a circuit breaker with a trip coil and comprises a switch for directly operating the trip coil without the component controlling-and-monitoring means.

15. The system according to claim 1, wherein the first serial transmitting medium is a half-duplex serial transmitting medium.

* * * * *